US006624971B1

(12) United States Patent
Sasaki

(10) Patent No.: US 6,624,971 B1
(45) Date of Patent: *Sep. 23, 2003

(54) THIN FILM MAGNETIC HEAD AND METHOD OF MANUFACTURING THE SAME

(75) Inventor: Yoshitaka Sasaki, Tokyo (JP)

(73) Assignee: TDK Corporation, Tokyo (JP)

( * ) Notice: Subject to any disclaimer, the term of this patent is extended or adjusted under 35 U.S.C. 154(b) by 401 days.

This patent is subject to a terminal disclaimer.

(21) Appl. No.: 09/642,226

(22) Filed: Aug. 21, 2000

(30) Foreign Application Priority Data

Aug. 24, 1999 (JP) .......................................... 11-237614

(51) Int. Cl.[7] ............................................. G11B 5/147
(52) U.S. Cl. ....................................................... 360/126
(58) Field of Search ......................................... 360/126

(56) References Cited

U.S. PATENT DOCUMENTS

| 5,438,747 | A |   | 8/1995  | Krounbi et al. | .......... | 29/603.16 |
| 5,600,519 | A |   | 2/1997  | Heim et al.    | ..........  | 360/126   |
| 6,108,167 | A | * | 8/2000  | Tateyama et al.| .......... | 360/126   |
| 6,304,415 | B1| * | 10/2001 | Tateyama et al.| .......... | 360/126   |
| 6,327,116 | B1| * | 12/2001 | Watanabe et al.| .......... | 360/126   |
| 6,414,824 | B1| * | 7/2002  | Sasaki         | .......... | 360/317   |
| 6,459,543 | B1| * | 10/2002 | Sasaki         | .......... | 360/126   |
| 6,490,127 | B1| * | 12/2002 | Sasaki         | .......... | 360/126   |

FOREIGN PATENT DOCUMENTS

| JP | 7-262519 | 10/1995 |
| JP | 8-249614 | 9/1996  |

* cited by examiner

Primary Examiner—David Davis
(74) Attorney, Agent, or Firm—Oliff & Berridge, PLC

(57) ABSTRACT

Disclosed are a thin film magnetic head which realizes an accurate control of a pole width and a sufficient overwrite characteristic even when the pole width is narrowed and a method of manufacturing the same. The throat height zero (TH0) position is defined by an edge face of a top pole tip formed on a flat face. The TH0 position can be accurately determined upon formation of the top pole tip, so that the throat height which contributes to the recording characteristic of a thin film magnetic head can be determined with high precision. The top pole tip and the top pole are magnetically coupled to each other with a sufficient contact area by two connection portions which are separated from each other in the width direction. Thus, a magnetic flux propagation loss caused by a magnetic flux saturation which occurs when a magnetic flux flows from a region of a large magnetic volume into a region of a small magnetic volume can be reduced.

18 Claims, 39 Drawing Sheets

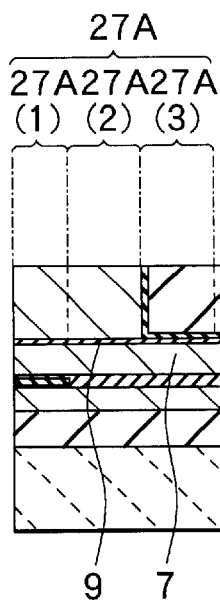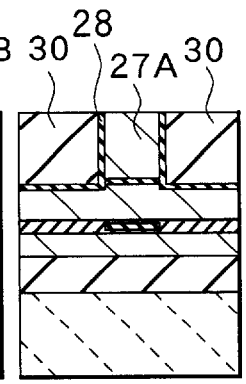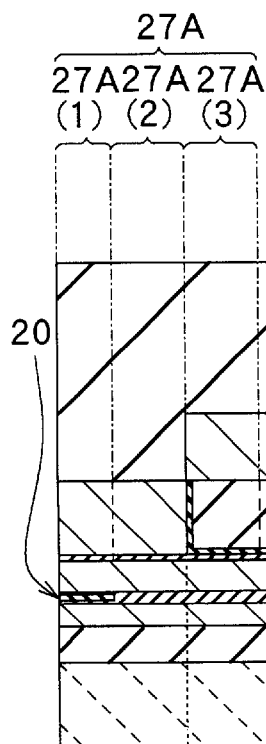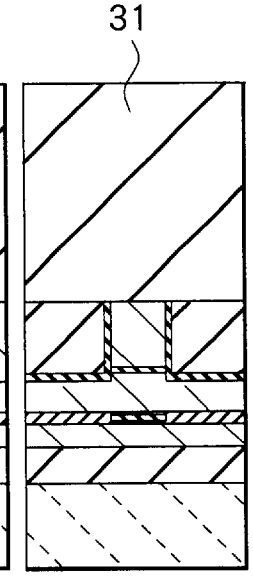
FIG.3A  FIG.3B
FIG.4A  FIG.4B

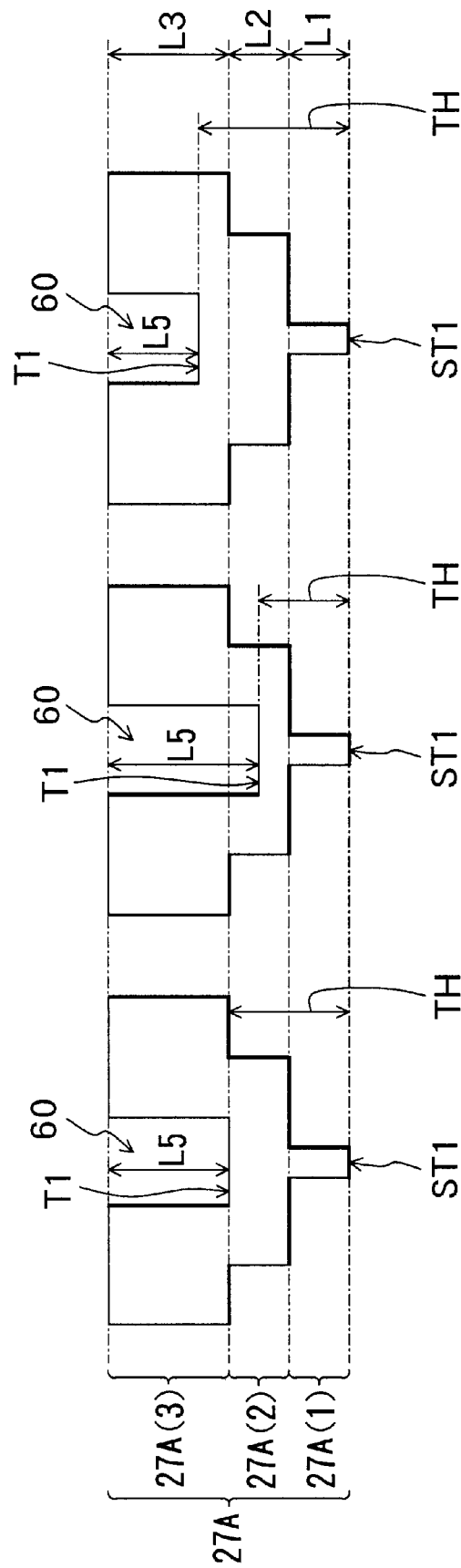

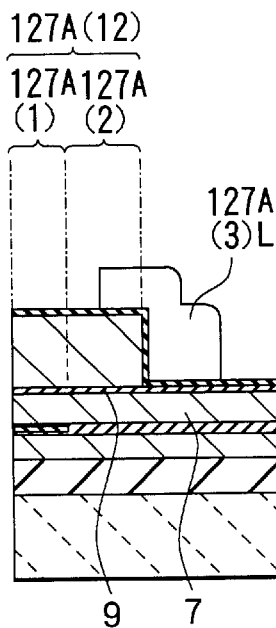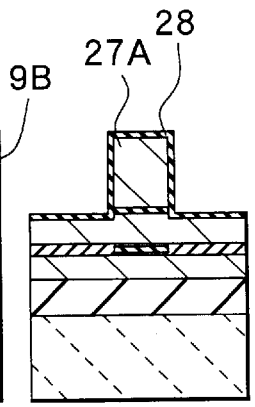
FIG.44A    FIG.44B
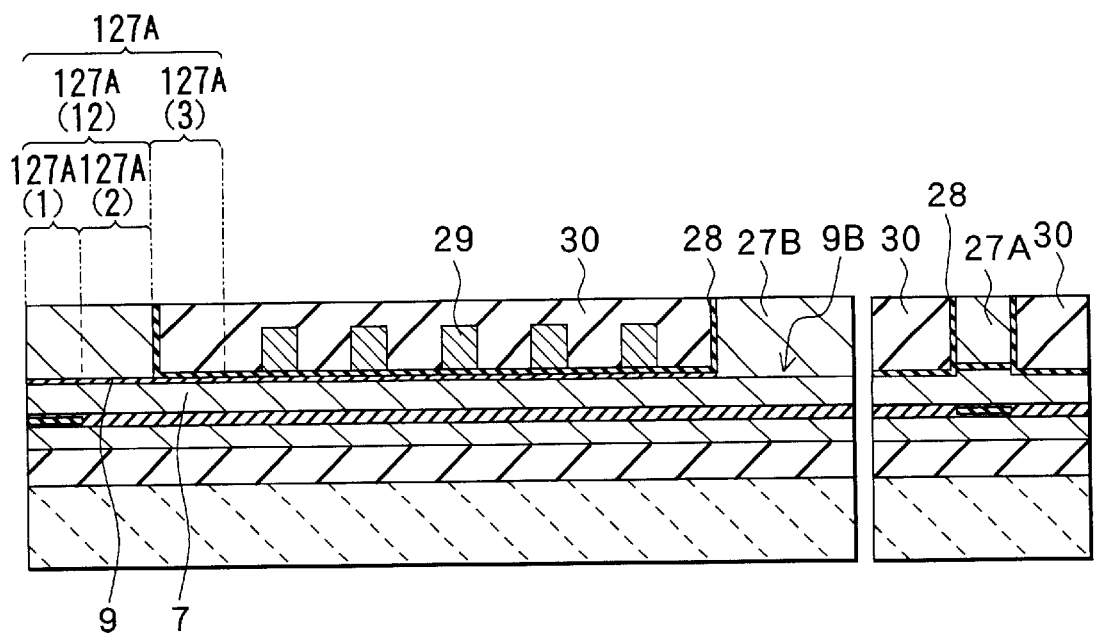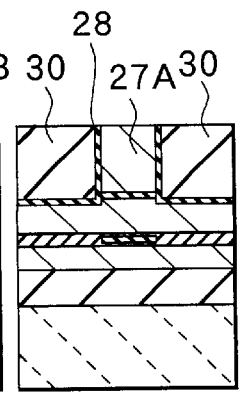
FIG.45A    FIG.45B

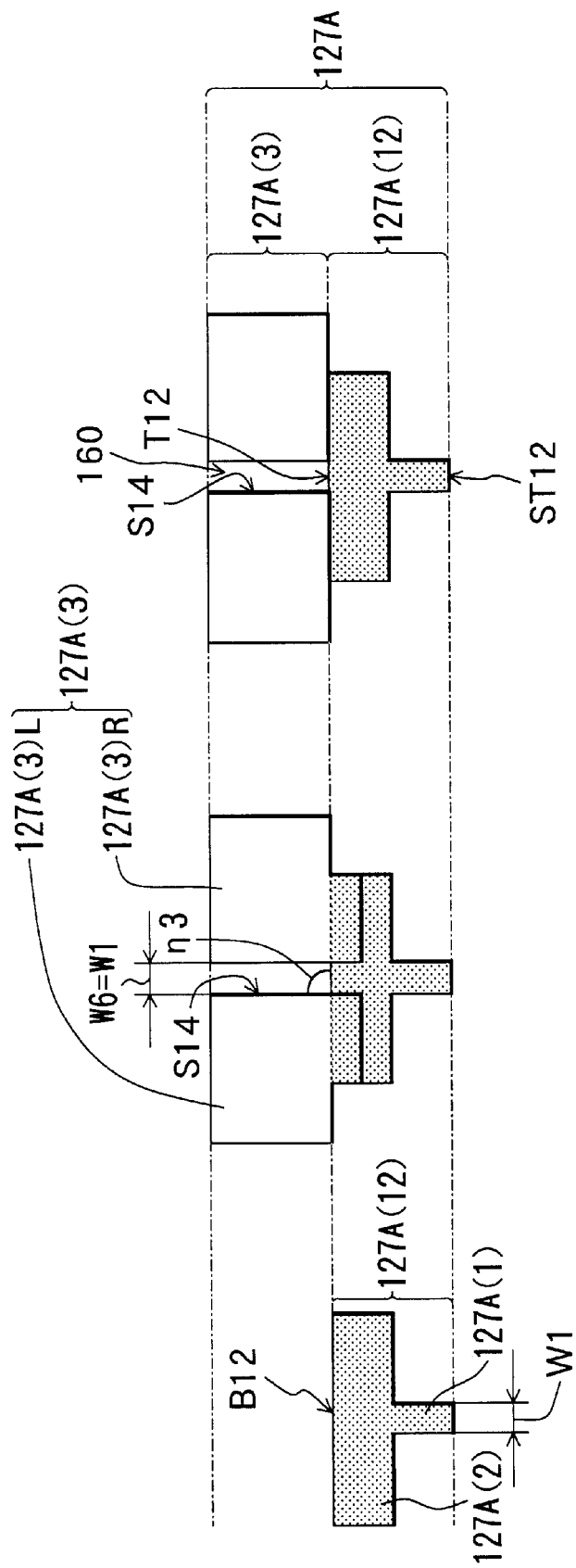

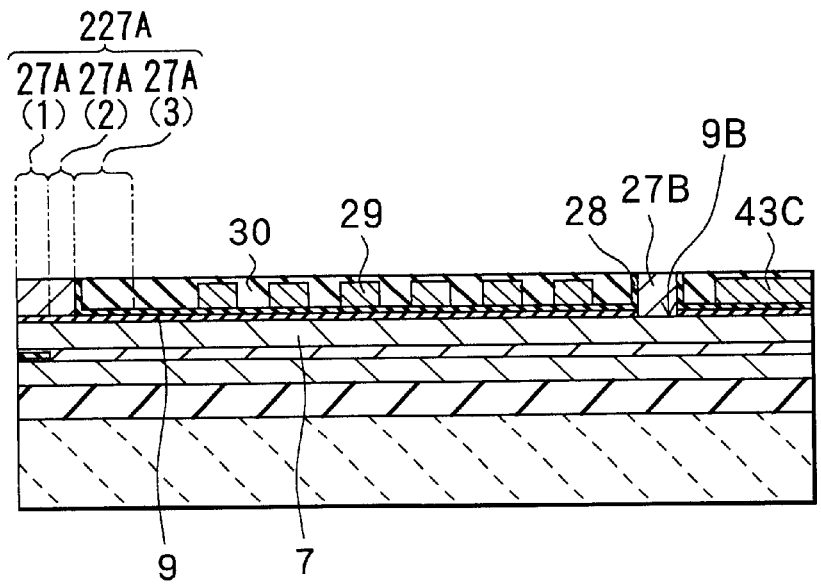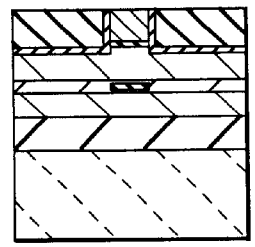
FIG.52A  FIG.52B
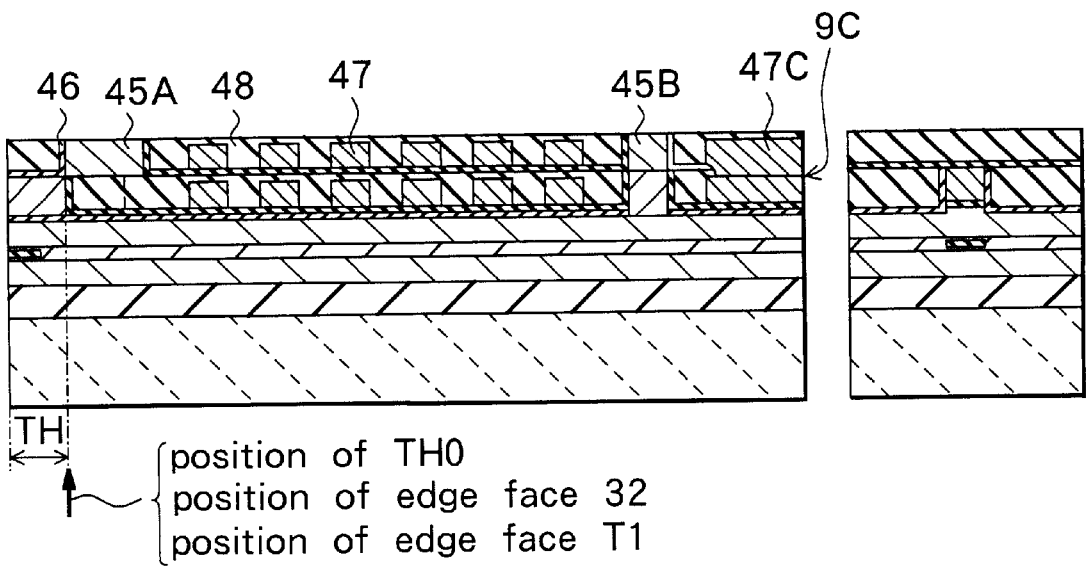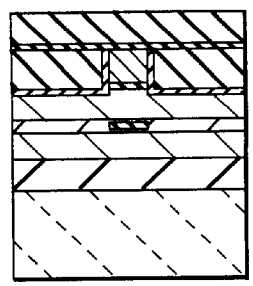
FIG.53A  FIG.53B

THIN FILM MAGNETIC HEAD AND METHOD OF MANUFACTURING THE SAME

BACKGROUND OF THE INVENTION

1. Field of the Invention

The present invention relates to a method of manufacturing a thin film magnetic head having at least an inductive magnetic transducer for writing and a method of manufacturing the head.

2. Description of the Related Art

In recent years, an improvement in performance of a thin film magnetic head is demanded in accordance with an increase in surface recording density of a hard disk drive. As a thin film magnetic head, a composite thin film magnetic head in which a recording head having an inductive-type magnetic transducer for writing and a reproducing head having a magnetoresistive (hereinbelow, referred to as MR) element for reading are stacked is widely used.

One of factors which determine the performances of the recording head is throat height (TH). The throat height is a length (height) from the air bearing surface to the edge of an insulating layer for electrically isolating a thin film coil for generating a magnetic flux. The air bearing surface is a surface of a thin film magnetic head, which faces a magnetic recording medium and is also called a track surface. In order to improve the performances of the recording head, reduction in throat height is desired. The throat height is controlled by a polishing amount at the time of processing the air bearing surface.

In order to improve the recording density in the performances of the recording head, it is necessary to increase track density of a magnetic recording medium. For this purpose, it is necessary to realize a recording head of a narrow track structure in which the width on the air bearing surface of each of a bottom pole and a top pole formed while sandwiching a write gap is reduced to the order of a few microns to submicrons. In order to achieve this, semiconductor processing techniques are used.

Referring to FIGS. 58 to 63, as an example of a method of manufacturing a conventional thin film magnetic head, a method of manufacturing a composite thin film magnetic head will be described.

According to the manufacturing method, first, as shown in FIG. 58, an insulating layer 102 made of, for example, alumina ($Al_2O_3$) is deposited in thickness of about 5 to 10 $\mu$m on a substrate 101 made of altic ($Al_2O_3$. TiC) or the like. Subsequently, a lower shield layer 103 for a reproducing head is formed on the insulating layer 102. For example, alumina is then deposited by sputtering in thickness of 100 to 200 nm on the lower shield layer 103 to form a shield gap film 104. An MR film 105 for constructing an MR device for reproduction is deposited in thickness of tens nm on the shield gap film 104 and is patterned in a desired shape by high-precision photolithography. Then lead layers (not shown) as lead electrode layers which are electrically connected to the MR film 105 are formed on both sides of the MR film 105. After that, a shield gap film 106 is formed on the lead layers, the shield gap film 104, and the MR film 105, and the MR film 105 is buried in the shield gap films 104 and 106. An upper shield-cum-bottom pole (hereinbelow, referred to as a bottom pole) 107 made of a magnetic material such as Permalloy (NiFe) used for both of the reproducing head and the recording head is formed on the shield gap film 106.

As shown in FIG. 59, on the bottom pole 107, a write gap layer 108 made of an insulating material such as alumina is formed. Further, a photoresist layer 109 is formed in a predetermined pattern on the write gap film 108 by high-precision photolithography. On the photoresist layer 109, a first thin film coil 110 for an inductive recording head made of, for example, copper (Cu) is formed by plating or the like. A photoresist layer 111 is formed in a predetermined pattern by high-precision photolithography so as to cover the photoresist layer 109 and the coil 110. In order to flatten the coil 110 and insulate turns of the coil 110 from each other, a heat treatment is performed at, for example, 250° C. A second thin film coil 112 made of copper or the like is formed on the photoresist layer 111 by, for example, plating. A photoresist layer 113 is formed in a predetermined pattern by high-precision photolithography on the photoresist layer 111 and the coil 112. In order to flatten the coil 112 and insulate turns of the coil 112, a heat treatment is performed at, for example, 250° C.

As shown in FIG. 60, in a position rearward of the coils 110 and 112 (right side in FIG. 60), an opening 108A is formed by partially etching the write gap layer 108 in order to form a magnetic path. A top yoke-cum-top magnetic pole (hereinbelow, called top pole) 114 made of a magnetic material such as Permalloy for the recording material is selectively formed on the write gap layer 108 and photoresist layers 109, 111 and 113. The top magnetic pole 114 is in contact with and magnetically coupled to the bottom pole 107 in the opening 108A. The top magnetic pole 114 is used as a mask and the write gap layer 108 and the bottom pole 107 are etched about 0.5 $\mu$m by ion milling. After that, an overcoat layer 115 made of, for example, alumina is formed on the top pole 114. Finally, a slider is machined to thereby form a track surface (air bearing surface) 120 of the recording head and the reproducing head. In such a manner, a thin film magnetic head is completed.

FIGS. 61 to 63 show the structure of the thin film magnetic head in a completed state. FIG. 61 is a cross section of the thin film magnetic head perpendicular to the air bearing surface 120. FIG. 62 is an enlarged cross section parallel to the air bearing surface 120 of the pole part. FIG. 63 is a plan view. Each of FIGS. 58 to 61 is a cross section taken along line A–AA of FIG. 63. In FIGS. 61 to 63, the overcoat layer 115 is not shown.

In order to improve the performances of the thin film magnetic head, it is important to form the head with accurate throat height TH, apex angle θ, pole width P2W and pole length P2L shown in FIGS. 61 and 62. The apex angle θ is an angle formed between a straight line connecting corners of side faces on the track face side of the photoresist layers 109, 111 and 113 and the top face of the top pole 114. The pole width P2W defines the width of a recording track on a recording medium. The pole length P2L indicates the thickness of the pole. In FIGS. 61 and 63, "TH0 position" denotes the edge on the track face side of the photoresist layer 109 as an insulating layer which electrically isolates the thin film coils 110 and 112, that is, a reference position 0 of the throat height TH.

As shown in FIG. 62, a structure in which side walls of the top pole 114, the write gap layer 108 and a part of the bottom pole 107 are formed vertically in a self-aligned manner is called a trim structure. According to the trim structure, an increase in the effective track width due to expansion of the magnetic flux which occurs at the time of writing data to a narrow track can be prevented. As shown in FIG. 62, lead layers 121 as a lead electrode layer electrically connected to the MR film 105 are provided on both sides of the MR film 105. In FIGS. 58 to 61, the lead layers 121 are omitted.

FIG. 64 shows the structure in plan view of the top pole 114. As shown in the diagram, the top pole 114 has a yoke 114A which occupies a major part of the top pole 114 and a pole tip 114B having an almost constant width W1 as the pole width P2W. In the connecting portion between the yoke 114A and the pole tip 114B, the outer periphery of the yoke 114A forms an angle α to a plane parallel to the air bearing surface 120. In the coupling portion, the outer periphery of the pole tip 114B forms an angle β to a plane parallel to the air bearing surface 120. For example, β is about 45 degrees and β is about 90 degrees. The width of the pole tip 114B specifies the width of a recording track on a recording medium. The pole tip 114B includes a portion F on the front side (the air bearing surface 120 side) with respect to the position TH0 and a portion R on the rear side (on the yoke 114A side) with respect to the position TH0. As understood from FIG. 61, the portion F extends on the flat write gap layer 108, and the portion R and the yoke 114A extend on a coil portion which is covered with the photoresist layers 109, 111 and 113 and is raised like a mountain (hereinbelow, called an apex portion).

The shape of the top pole is described in, for example, Japanese Unexamined Patent Application No. 8-249614.

Since the pole width P2W determines the track width of the recording head, accurate formation is required. Especially, in recent years, in order to realize high surface density recording, that is, to form a recording head of a narrow track structure, a microprocess of setting the width P2W of the top pole to 1.0 μm or less is requested.

As a method of forming the top pole, for example, as disclosed in Japanese Unexamined Patent Application No. 7-262519, a frame plating method is used. In the case of forming the top pole 114 by using the frame plating method, first, a thin electrode film made of, for example, Permalloy is deposited on the whole apex portion by sputtering or the like. A photoresist is then applied on the electrode film and is patterned by a photolithography process to form a frame (outer frame) for plating. By using the electrode film formed before as a seed layer, the top pole 114 is formed by plating.

There is a level difference of, for example, about 7 to 10 μm between the apex portion and the other portion. A photoresist is applied on the apex portion in thickness of 3 to 4 μm. When it is assumed that at least 3 μm of thickness of the photoresist on the apex portion is necessary, since the photoresist having fluidity gathers in the lower part, a photoresist film in thickness of about 8 to 10 μm is formed below the apex portion.

In order to form a narrow track as described above, it is necessary to form a frame pattern having a width of about 1.0 μm by a photoresist film. That is, a fine pattern having a width of 1.0 μm or less has to be formed by a photoresist film having a thickness of 8 to 10 μm or more. It is, however, extremely difficult to form such a thick photoresist pattern in width of the narrower pattern in a manufacturing process.

Moreover, at the exposure time of photolithography, light for exposure is reflected by an electrode underlayer as a seed layer. The photoresist also senses the reflection light, so that a deformation or the like occurs in the photoresist pattern and a sharp and accurate photoresist pattern cannot be obtained. As a result, the top pole cannot be formed in a desired shape in such a manner that the shape of the side walls of the top pole is rounded or the like. Particularly, when the pole width P2W is further reduced to W1A as shown in FIG. 65, it becomes more difficult to obtain the desired width W1A for the following reason. In the portion R extending over the apex portion of the pole tip 114B, the light reflected by the electrode underlayer includes not only reflection light in the vertical direction but also reflection light in the oblique or lateral direction from an inclined face of the apex portion. The reflection light exerts an influence on photosensitivity of the photoresist layer. As a result, the width of the photoresist pattern which defines the pole width P2W becomes wider than an expected value and the shape becomes as shown by broken lines in FIG. 65. In the pole tip 114B, the width of the front portion F with respect to the TH0 position is an extremely important factor of defining the track width on a recording medium. When the width of the portion F becomes wider than W1A, a target fine track width cannot be obtained.

The above-mentioned magnetic head disclosed in Japanese Unexamined Patent Application No. 8-249614 also has a similar problem. In the magnetic head disclosed in the publication, the width of the magnetic pole changes gently from the TH0 position toward the yoke. Consequently, due to an influence of reflection light in the oblique or lateral direction from the inclined face of the apex portion exerted on the photosensitivity of the photoresist layer, the width of the front portion with respect to the TH0 position cannot be accurately controlled.

As shown in FIG. 65, since the portion R from the TH0 position to the connection with the yoke 114A in the pole tip 114B has almost the same width as that of the front portion F with respect to the TH0 position and the cross sectional area of the portion R is small, the magnetic flux from the yoke 114A is saturated in the portion R and cannot sufficiently reach the portion F which defines the track width. As a result, the overwrite characteristic, that is, a characteristic in the case of overwriting data on a recording medium on which data has been already written becomes as low as about 10 to 20 dB. There is a problem such that a sufficient overwrite characteristic cannot be assured.

SUMMARY OF THE INVENTION

The invention has been achieved in consideration of the problems and its object is to provide a thin film magnetic head in which the pole width can be accurately controlled and a sufficient overwrite characteristic can be obtained even when the pole width is reduced and to provide a method of manufacturing the head.

According to the invention, there is provided a thin film magnetic head including: two magnetic layers magnetically coupled to each other and two magnetic poles which face each other with a gap layer in between in part close to a recording-medium-facing surface facing a recording medium; a thin film coil provided between the two magnetic layers; and an insulating layer for insulating the thin film coil from the two magnetic layers, wherein at least one of the two magnetic layers includes: a first magnetic portion for propagating a magnetic flux generated in response to a current passing through the thin film coil, and a second magnetic portion magnetically coupled to the first magnetic portion, and the second magnetic portion includes: a track width defining portion extending with a constant width in the longitudinal direction so as to be apart from a recording-medium-facing surface and defines a recording track width of the recording medium; two or more connection portions magnetically coupled to the first magnetic portion and arranged so as to be separated from each other in the direction of the recording track width; and an intermediate coupling portion having an edge that defines the edge on the recording-medium-facing surface side of the insulating layer and magnetically coupling the track width defining portion and the two or more connection portions.

According to the invention, there is provided a method of manufacturing a thin film magnetic head including: two magnetic layers magnetically coupled to each other and having two magnetic poles which face each other with a gap layer in between in part close to a recording-medium-facing surface facing a recording medium; a thin film coil provided between the two magnetic layers; and an insulating layers for insulating the thin film coil from the two magnetic layers, the method comprising the steps of forming at least one of the two magnetic layers so as to include a first magnetic portion for propagating a magnetic flux generated in response to a current passing through the thin film coil, and a second magnetic portion magnetically coupled to the first magnetic portion; wherein the step of forming the second magnetic portion includes a track width defining portion which extends in constant width in the longitudinal direction so as to be apart from a recording-medium-facing surface which faces a recording medium and defines a recording tack width of the recording medium, two connection portions which are magnetically coupled to the first magnetic portion and are disposed so as to be separated from each other in the direction of the recording track width, and an intermediate coupling portion which has an edge portion that defines the edge on the recording-medium-facing surface side of the insulating layer and magnetically couples the track width defining portion and the two or more connection portions.

In the thin film magnetic head of the invention, in the second magnetic portion, the recording track width of a recording medium is defined by the track width defining portion, the edge on the side of a recording-medium-facing surface of the insulating layer is defined by an edge of the intermediate coupling portion, and the first magnetic portion is magnetically coupled to the second magnetic portion via the two or more connection portions which are disposed so as to be separated from each other in the track width direction. A magnetic flux generated by the thin film coil passes from the first magnetic portion to the intermediate coupling portion via the two or more connection portions in the second magnetic portion and further to the track width defining portion and reaches the front end portion.

In the thin film magnetic head of the invention, at least one of the two magnetic layers is formed so as to have the first magnetic portion for propagating the magnetic flux generated in response to a current passing through the thin film coil, and the second magnetic portion magnetically coupled to the first magnetic portion. The second magnetic portion is formed so as to include: the track width defining portion extending with a constant width in the longitudinal direction so as to be apart from a recording-medium-facing surface and defines a recording track width of the recording medium; two or more connection portions magnetically coupled to the first magnetic portion and so as to be separated from each other in the direction of the recording track width; and an intermediate coupling portion having an edge that defines the edge on the recording-medium-facing surface side of the insulating layer and magnetically coupling the track width defining portion and the two or more connection portions.

In the thin film magnetic head of the invention or the method manufacturing the same, preferably, a magnetic flux permissible volume of the intermediate coupling portion is smaller than that of the two or more connection portions and a magnetic flux permissible volume of the track width defining portion is smaller than that of the intermediate coupling portion in the second magnetic portion.

In the thin film magnetic head of the invention or the method of manufacturing the same, length in the longitudinal direction of the two or more connection portions of the second magnetic portion may be longer than that of the track width defining portion or the intermediate coupling portion.

In the thin film magnetic head of the invention or the method of manufacturing the same, preferably, the width of the intermediate coupling portion in the position where the intermediate coupling portion in the second magnetic portion and the two or more connection portions are coupled to each other is narrower than the width of a connection region defined by the two or more connection portions.

In the thin film magnetic head of the invention or the method of manufacturing the same, the intermediate coupling portion in the second magnetic portion may include at least one of a portion having a constant width irrespective of positions and a portion having a width which varies according to positions. The two or more connection portions in the second magnetic portion may include at least one of a constant width portion and a varying width portion, the constant width portion having a constant width irrespective of positions, and the varying width portion having a width which varies according to positions.

In the thin film magnetic head of the invention or the method of manufacturing the same, a step in the width direction may be formed in a position where the track width defining portion and the intermediate coupling portion in the second magnetic portion are coupled to each other in such a manner that the width of the track width defining portion is narrower than the width of the intermediate coupling portion in the coupling position. In this case, a step face of the intermediate coupling portion in the step may be substantially perpendicular to the extending direction of the track width defining portion.

In the thin film magnetic head of the invention or the method of manufacturing the same, it is preferable that the width of a region surrounded by the edge portion of the intermediate coupling portion and the two or more connection portions in the second magnetic portion is equal to or wider than the width of the track width defining portion.

In the thin film magnetic head of the invention or the method of manufacturing the same, the edge portion may have an edge face sandwiched by the two or more connection portions and the two or more connection portions may have notches recessed in the width direction at both ends of the edge face.

In the thin film magnetic head of the invention or the method of manufacturing the same, the second magnetic portion may have notches recessed in the longitudinal direction in the position where the track width defining portion and the intermediate coupling portion are coupled to each other.

In the thin film magnetic head of the invention or the method of manufacturing the same, the first magnetic portion may includes a portion having a plane outline corresponding to that of at least either the intermediate coupling portion or the two or more connection portions of the second magnetic portion.

In the thin film magnetic head of the invention or the method of manufacturing the same, a part of the first magnetic portion a part of the second magnetic portion overlap one another.

In the thin film magnetic head of the invention or the method of manufacturing the same, the first magnetic portion may have: a constant width portion which extends from an edge thereof close to the recording-medium-facing surface in a direction of going away from the recording-medium-facing surface with an almost constant width irrespective of positions; and a portion which is coupled to the constant width portion and expands in the width direction as going away from the recording-medium-facing surface.

In the thin film magnetic head of the invention or the method of manufacturing the same, the first magnetic portion may have a portion which extends from an edge thereof close to the recording-medium-facing surface in a direction of going away from the recording-medium-facing surface and expands in the width direction as going away from the recording-medium-facing surface.

In the thin film magnetic head or the method of manufacturing the same, the one of the magnetic layers may further comprise: a third magnetic portion sandwiched between the first and second magnetic portions to make the first and second magnetic portions be magnetically coupled to each other. In this case, it is preferable that the third magnetic portion is arranged so as to overlap with both a part of the first magnetic portion and a part of the second magnetic portion.

In the thin film magnetic head of the invention or the method of manufacturing the same, an edge close to the recording-medium-facing surface of the third magnetic portion may be closer to the side of the recording-medium-facing surface rather than to an edge closer to the recording-medium-facing surface of the first magnetic portion.

In the method of manufacturing a thin film magnetic head of the invention, the track width defining portion, the intermediate coupling portion and the two or more connection portions in the second magnetic portion can be integrally formed by the same process.

In the method of manufacturing a thin film magnetic head of the invention, the track width defining portion and the intermediate coupling portion may be integrally formed by the same process and, subsequently, the two or more connection portions may be formed by a process different from the process of forming the track width defining portion and the intermediate coupling portion.

In the method of manufacturing a thin film magnetic head of the invention, the first magnetic portion may be formed separately from the first magnetic portion by a process different from the process of forming the second magnetic portion.

In the method of manufacturing a thin film magnetic head of the invention, a third magnetic portion may be formed separately from the first and second magnetic portion by a process different from the process of forming the first and second magnetic portions.

Other and further objects, features and advantages of the invention will appear more fully from the following description.

BRIEF DESCRIPTION OF THE DRAWINGS

FIGS. 3A and 3B are cross sections for explaining a process subsequent to FIGS. 2A and 2B, respectively.

FIGS. 4A and 4B are cross sections for explaining a process subsequent to FIGS. 3A and 3B, respectively.

FIG. 28 is a plan view showing further another modification of the top pole tip illustrated in FIG. 9.

FIGS. 44A and 44B are cross sections for explaining a process in a process of manufacturing a thin film magnetic head according to a second embodiment of the invention.

FIGS. 45A and 45B are cross sections for explaining a process subsequent to FIGS. 44A and 44B, respectively.

FIGS. 46A, 46B and 46C are plan views showing a process of forming a top pole tip in the thin film magnetic head according to the second embodiment of the invention.

FIGS. 52A and 52B are cross sections for explaining a process in a method of manufacturing a thin film magnetic head according to a third embodiment of the invention.

FIGS. 53A and 53B are cross sections for explaining a process subsequent to FIGS. 52A and 52B, respectively.

DETAILED DESCRIPTION OF THE PREFERRED EMBODIMENTS

Figures 1A, 1B:
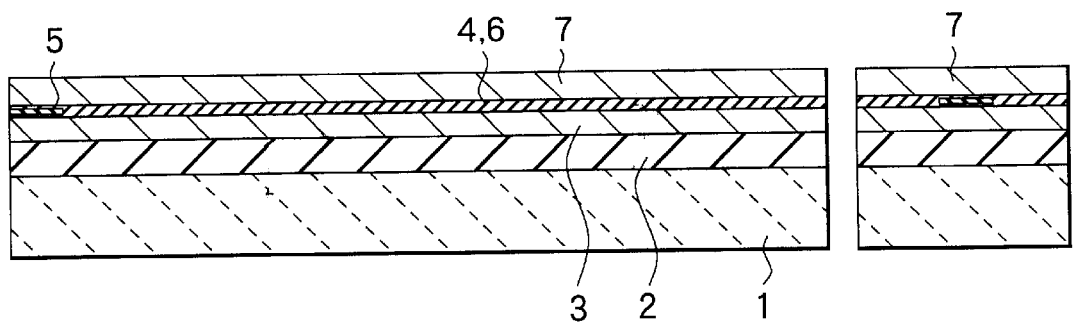
FIGS. 1A and 1B are cross sections for explaining a process in a method of manufacturing a thin film magnetic head according to a first embodiment of the invention.

Embodiments of the invention will be described in detail hereinbelow by referring to the drawings.

First Embodiment

<<Method of Manufacturing Thin Film Magnetic head>>

Figure 5:
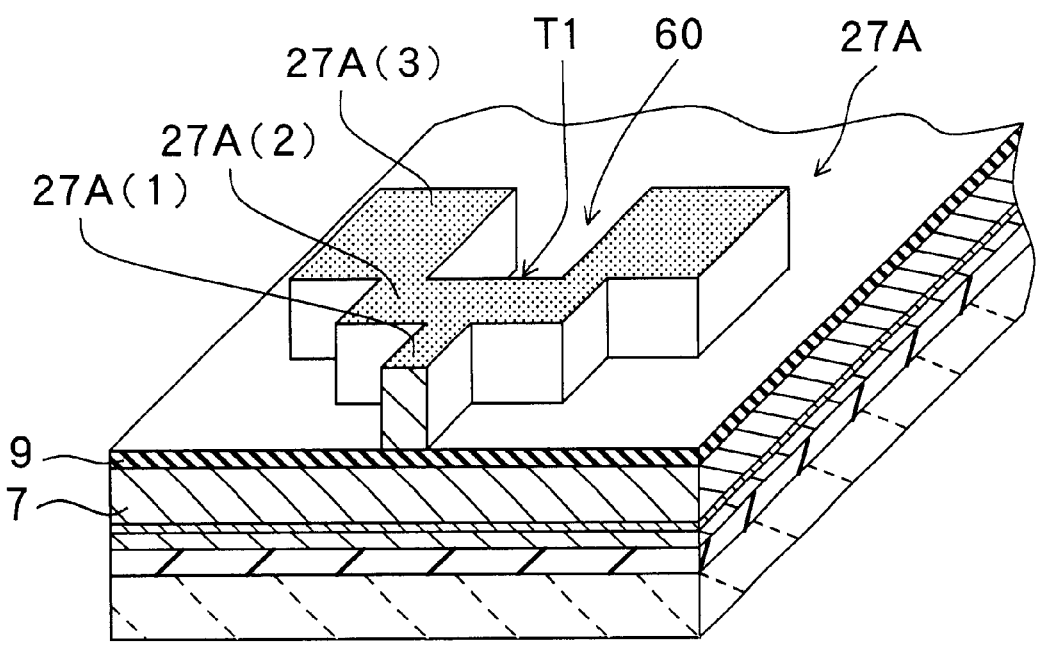
FIG. 5 is a perspective view corresponding to the cross sections of FIGS. 2A and 2B.
Figure 6:
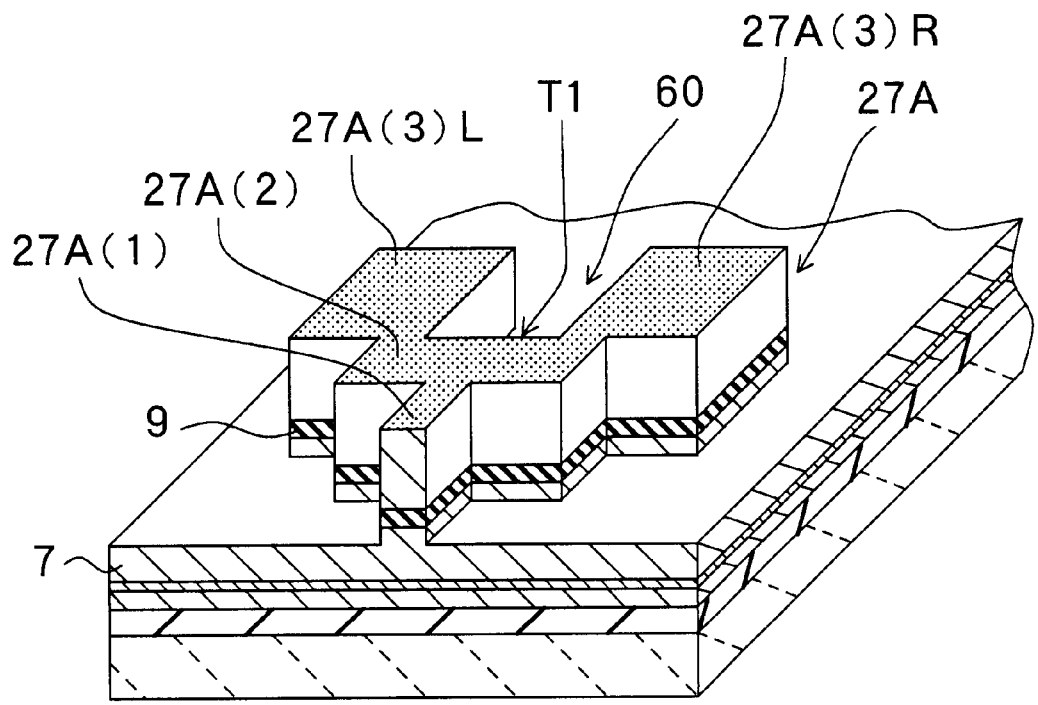
FIG. 6 is a perspective view corresponding to the cross sections of FIGS. 2A and 2B.

Referring to FIGS. 1A and 1B to FIG. 6, a method of manufacturing a composite thin film magnetic head as a method of manufacturing a thin film magnetic head according to the first embodiment of the invention will be described. Since a thin film magnetic head according to the embodiment will be embodied by the method of manufacturing the thin film magnetic head according to the embodiment, the schematic construction of the thin film magnetic head will be also described hereinbelow. FIGS. 1A to 4A are cross sections each of which is perpendicular to the air bearing surface and FIGS. 1B to 4B are cross sections each of which is parallel to the air bearing surface of the pole portion. FIGS. 5 and 6 are perspective views showing processes in an intermediate stage between the process illustrated in FIGS. 1A and 1B and the process illustrated in FIGS. 2A and 2B.

In the manufacturing method according to the embodiment, first, as shown in FIGS. 1A and 1B, an insulating layer 2 made of, for example, alumina ($Al_2O_3$) is deposited in thickness of about 3 to 5 $\mu$m on a substrate 1 made of, for example, altic ($Al_2O_3 \cdot TiC$). Then, a bottom shield layer 3 for the reproducing head is formed by selectively depositing, for example, Permalloy (NiFe) in thickness of about 3 $\mu$m on the insulating layer 2 by plating by using the photoresist film as a mask.

Subsequently, a shield gap film 4 is formed by depositing alumina or the like in thickness of about 100 to 200 nm by sputtering on the bottom shield layer 3. An MR film 5 for constructing an MR device for reproducing is formed in thickness of few tens nm on the shield gap film 4 in a desired shape by high-precision photolithography. Lead layers (not shown) as a lead electrode layer to be electrically connected to the MR film 5 are formed on both sides of the MR film 5 and, after that, a shield gap film 6 is formed on the lead layers, the shield gap film 4, and the MR film 5, thereby burying the MR film 5 in the shield gap films 4 and 6. Then, an upper shield-cum-bottom pole (hereinbelow, referred to as a bottom pole) 7 made of, for example, Permalloy is selectively deposited in thickness of about 3 to 4 $\mu$m on the shield gap film 6. The bottom pole 7 corresponds to an example of one of "at least two magnetic layers" in the invention.

Figures 2A, 2B:
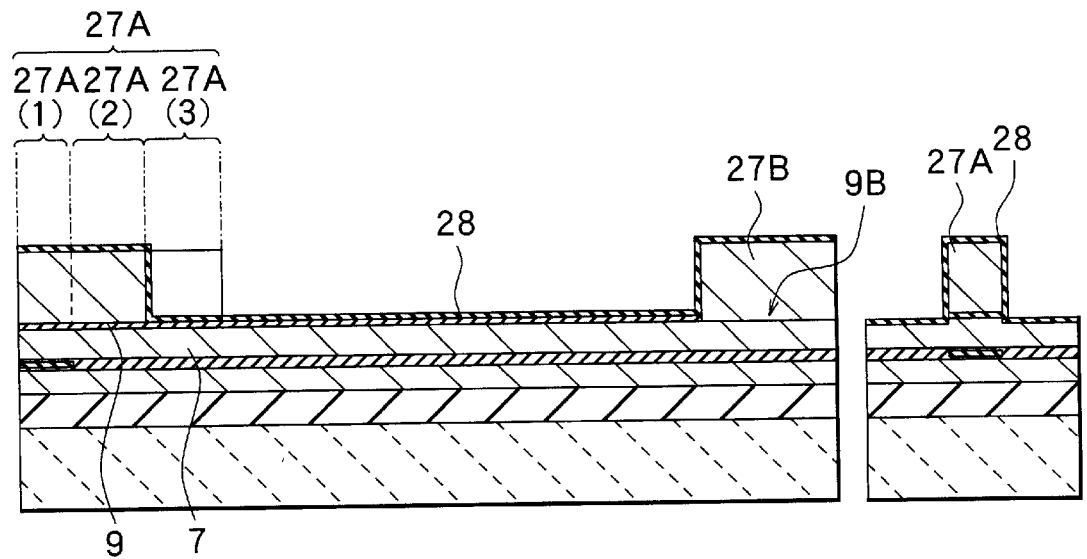
FIGS. 2A and 2B are cross sections for explaining a process subsequent to FIGS. 1A and 1B, respectively.

As shown in FIGS. 2A and 2B, on the bottom pole 7, a write gap layer 9 which is, for example, an alumina film is formed in thickness of about 0.15 to 0.3 µm. After that, in a position rearward of a region for forming the thin film coil 29 in a post process (right side in FIG. 2A), an opening 9B is formed by partially etching the write gap layer 9 in order to form a magnetic path. Subsequently, as shown in FIGS. 2A and 2B, in a position forward of a region in which the thin film coil 29 is formed in a post process (left side in FIG. 2A), a top pole tip 27A as a part of the top pole is selectively formed on the write gap layer 9 by, for example, electrolytic plating. Simultaneously, a magnetic path forming pattern 27B is also formed in the opening 9B. FIG. 5 shows the state at this time.

Figure 7:
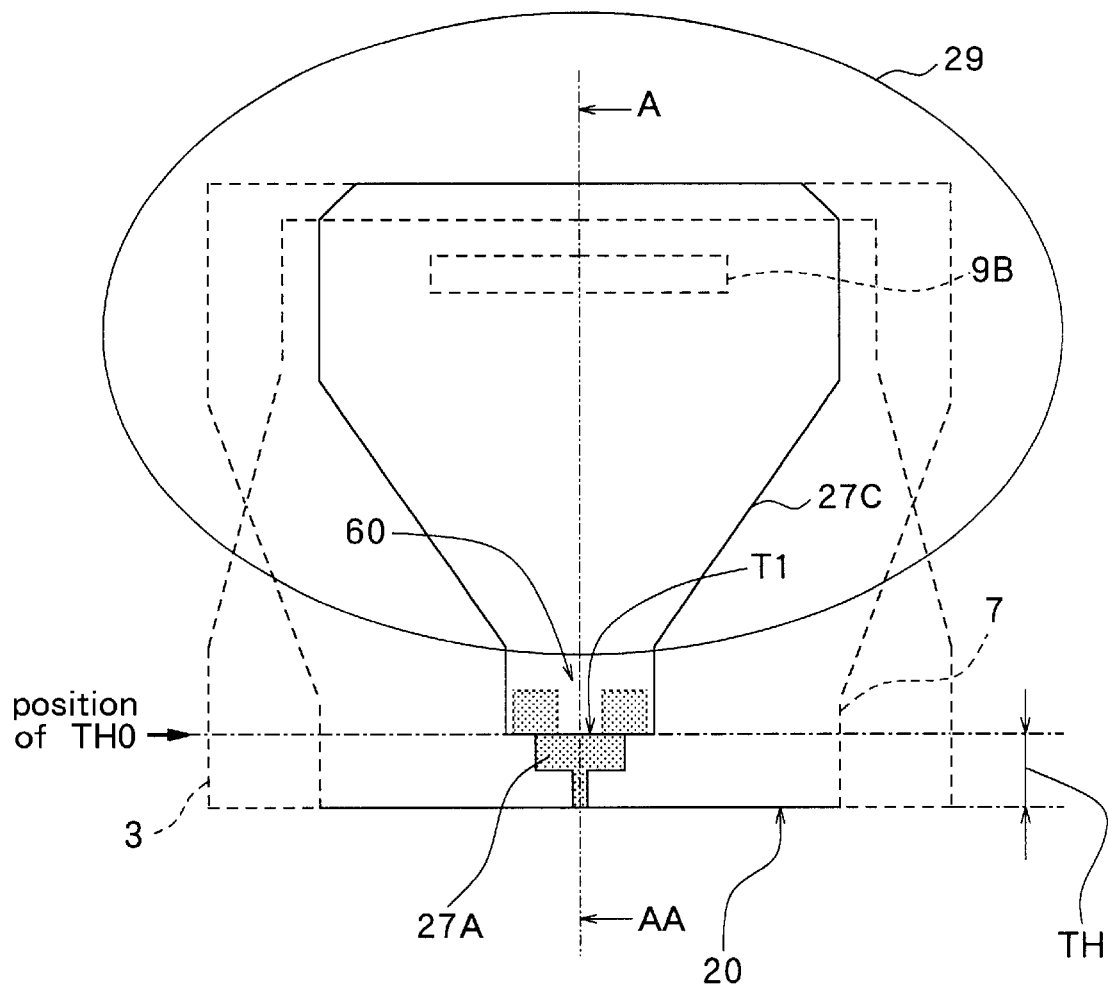
FIG. 7 is a plan view showing the structure of the thin film magnetic head according to the first embodiment of the invention.

The shape in plan view of the top pole tip 27A is, for example, as shown in FIG. 7 which will be described hereinlater. As shown in FIGS. 2A and 2B and FIG. 5, the top pole tip 27A includes a front end portion 27A(1), an intermediate coupling portion 27A(2) and a connection portion 27A(3). The features of the shape of the top pole tip 27A will be described in detail by referring to FIG. 9. The top pole tip 27A is made of a Permalloy (NiFe) alloy or an iron nitride (FeN) alloy as a material having high saturated flux density. The top pole tip 27A corresponds to an example of "second magnetic layer portion" in the invention.

The top pole tip 27A and the magnetic path forming pattern 27B are formed, for example, as follows. First, an NiFe alloy as a material having high saturated magnetic flux density is deposited in thickness of about 70 nm by, for example, sputtering to thereby form an electrode film (not shown) serving as a seed layer in electrolytic plating. A photoresist is applied on the electrode film and is patterned by photolithography, thereby forming a photoresist pattern (not shown) by a frame plating method. Then, by using the photoresist pattern as a mask and the electrode film formed before as a seed layer, the top pole tip 27A and the magnetic path forming pattern 27B are formed in thickness of about 3 to 5 µm and, after that, the photoresist pattern is removed.

As shown in FIGS. 2A and 2B and FIG. 6, for example, by ion milling in RIE using a chlorine gas ($Cl_2$, $CF_4$, $BCl_2$, $SF_6$ or the like) with the top pole tip 27A as a mask, the write gap layer 9 and the bottom pole 7 around the front end portion 27A(1) and the intermediate coupling portion 27A(2) are etched about 0.5 µm in a self aligned manner, thereby forming a trim structure. FIG. 6 shows the stereoscopic structure at this time.

Referring again to FIGS. 2A and 2B, the process of manufacturing a thin film magnetic head according to the embodiment will be explained. After forming the top pole tip 27A, an insulating film 28 such as an alumina film is formed in thickness of about 0.5 to 1.5 µm on the whole surface.

As shown in FIGS. 3A and 3B, the thin film coil 29 for an inductive recording head made of copper (Cu) or the like is formed in thickness of 2 to 3 µm by, for example, electrolytic plating in a region which is positioned between the top pole tip 27A and the magnetic path forming pattern 27B and has a recessed shape surrounded by the insulating film 28. Then, an insulating film 30 such as an alumina film is formed in thickness of about 3 to 4 µm on the whole surface. After that, the whole is polished and planarized by, for example, CMP (Chemical Mechanical Polishing) to expose the surface of the top pole tip 27A and the magnetic path forming pattern 27B.

Figure 8:
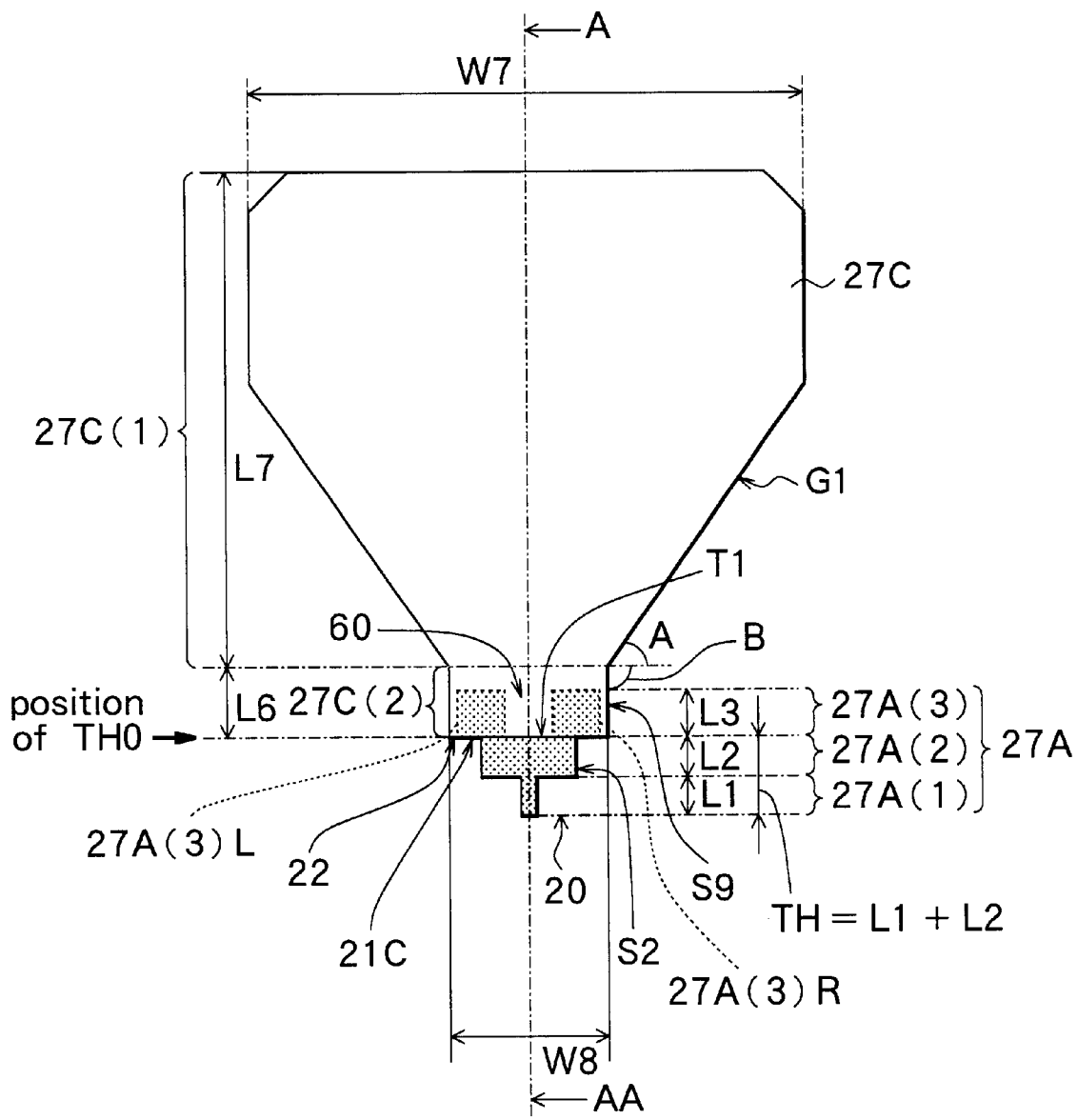
FIG. 8 is a plan view showing the structure of a top pole and a top pole tip of the thin film magnetic head according to the first embodiment of the invention.

As shown in FIGS. 4A and 4B, by electrolytic plating similar to that in the case of the top pole tip 27A and the magnetic path forming pattern 27B, a top yoke-cum-top pole (hereinbelow, called a top pole) 27C is formed in thickness of about 3 to 5 µm. The top pole 27C has a shape in plane, for example, as shown in FIG. 8. The characteristics of the shape of the top pole 27C will be described hereinlater. The top pole 27C is magnetically coupled to the bottom pole 7 via the magnetic path forming pattern 27B in the opening 9B and is in contact with and magnetically coupled to the connection portion 27A(3) in the top pole tip 27A which will be described hereinlater. The top pole 27C is made of, for example, Permalloy (NiFe) or iron nitride (FeN) as a magnetic material having high saturated magnetic flux density. The top pole 27C corresponds to an example of "first magnetic layer portion" in the invention.

Subsequently, an overcoat layer 31 made of alumina is formed so as to cover the whole surface. Finally, a slider is machined to thereby form an air bearing surface (track surface) 20. In such a manner, a thin film magnetic head is completed.

<<Construction of Main Portion of Thin Film Magnetic Head>>

A characteristic part of the thin film magnetic head according to the embodiment will be mainly explained.

FIG. 7 schematically shows the structure in plane of a thin film magnetic head manufactured by a manufacturing method according to the embodiment. In the drawing, the insulating layer 30, the overcoat layer 31 and the like are not shown. With respect to the thin film coil 29, only the outermost periphery is shown. As shown in FIG. 7, a throat height TH is defined as a length from the position of an edge face T1 which defines the position of an edge closest to the air bearing surface 20 in the insulating layer 30 formed on the rear side (side opposite to the air bearing surface) of the top pole tip 27A to the air bearing surface 20. That is, the position of the edge face T1 corresponds to a position where the throat height TH is zero (hereinbelow, called a "TH0 position"). The air bearing surface 20 and the edge face T1 are almost parallel to each other. FIG. 4A is a cross section taken along line A–AA in FIG. 7.

Figure 9:
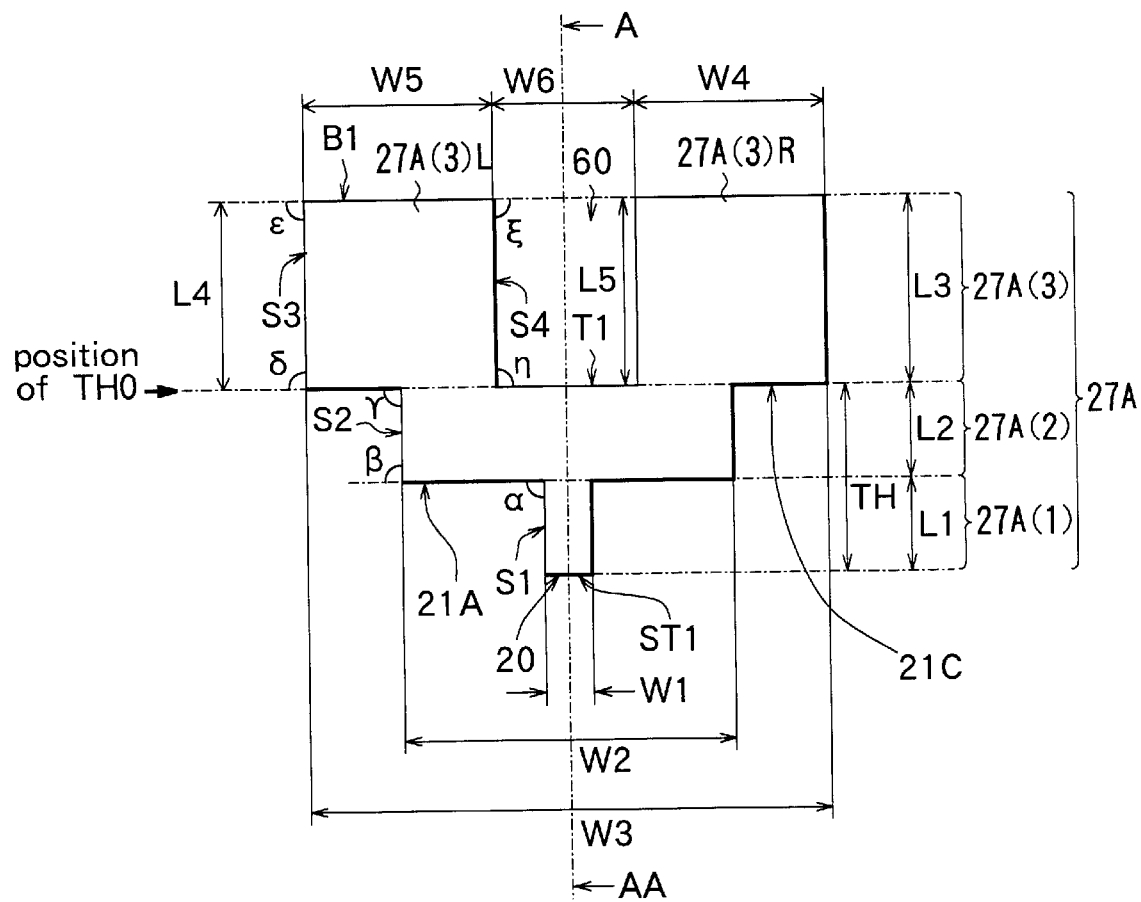
FIG. 9 is a plan view enlargedly showing the structure of the top pole tip in FIG. 8.

FIG. 8 shows a structure in plane of the top pole 27C and the top pole tip 27A and FIG. 9 enlargedly shows the structure in plane of the top pole tip 27A. In the following, distance in the direction parallel to the air bearing surface 20 is expressed as "width" and distance in the direction perpendicular to the air bearing surface 20 is expressed as "length". As shown in FIG. 8, the top pole 27C comprises a yoke 27C(1) which has width W7 and length L7 and occupies the majority of the top pole 27C and a connection portion 27C(2) which has width W8 and length L6 and is connected to the top pole tip 27A so as to be partially overlapped with each other. The width W7 of the yoke 27C(1) is wider than the width W8 of the connection portion 27C(2) (W7>W8). The center in the width direction of the yoke 27C(1) and that of the connection portion 27C(2) coincide with each other. The width W8 of the connection portion 27C(2) hardly varies according to positions. The outer edge G1 of the yoke 27C(1) and a plane parallel to the air bearing surface 20 form an angle (A). A side face S9 of the connection portion 27C(2) forms an angle (B) to a plane parallel to the air bearing surface 20. In the embodiment, the angle (A) is preferably, for example, 30 to 60 degrees. More preferably, the angle (A) is 45 degrees. The angle (B) is preferably, for example, 90 degrees.

As shown in FIG. 9, the top pole tip 27A comprises the front end portion 27A(1) which has the width W1 and defines the write track width on a recording medium, the intermediate coupling portion 27A(2) having a width W2 which is wider than W1 and is almost constant, and the connection portion 27A(3) having a width W3 which is wider than W2 and is almost constant (W3>W2>W1). The length of the front end portion 27A(1) is L1 and the length of the intermediate coupling portion 27A(2) is L2. The center in the width direction of the front end portion 27A(1) and that of the intermediate coupling portion 27A(2) coincide with each other.

The connection portion 27A(3) is comprised of, for example, a connection portion 27A(3)R and a connect ion portion 27A(3)L which are positioned symmetrically with respect to a line segment (A–AA line) extending the center of the front end portion 27A(1) and the intermediate coupling portion 27A(2) on the rear side (side opposite to the air bearing surface 20) of the intermediate portion 27A(2). The connection portion 27A(3)R has a width W4 and a length L3. The connection portion 27A(3)L has a width W5 and a length L4. Preferably, W4=W5 and L3=L4 so that the area of the connection portion 27A(3)R and that of the connection portion 27A(3)L are equal to each other. In the following, description will be given on the assumption that W4=W5 and L3=L4. The length of the connection portion 27A(3) will be referred to as L3. The center in the width direction of the connection portion 27A(3) and that of each of the front end portion 27A(1) and the intermediate coupling portion 27A(2) coincide with each other.

The top pole tip 27A shown in FIG. 9 has a region which is recessed in the longitudinal direction (hereinbelow, simply called a "recess 60") in a portion surrounded by the edge face T1 and the connection portions 27A(3)R and 27A(3)L. The recess 60 has a shape constructed by straight lines and is, for example, a part of a rectangle. The width of the recess 60 is W6 and the length is L5. In the top pole tip 27A shown in FIG. 9, for example, the length L5 of the recess 60 and the length L3 of the connection portion 27A(3) are equal to each other (L3=L5). The width W3 of the connection portion 27A(3) is equal to the sum of the width W4 of the connection portion 27A(3)R, the width W6 of the recess 60, and the width W5 of the connection portion 27A(3)L (W4+W6+W5=W3). As described above, the position of the edge face T1 corresponds to the TH0 position. The position of the edge face T1 is determined by changing and adjusting the shape of the recess 60 when the top pole tip 27A is formed. Consequently, at the time of formation of the top pole tip 27A, the length from the edge face T1 to the air bearing surface 20, that is, the throat height TH can be freely set.

In the position where the front end portion 27A(1) and the intermediate coupling portion 27A(2) are coupled to each other (hereinbelow, called "first coupling position"), the width of the front end portion 27A(2) is W1 and the width of the intermediate coupling portion 27A(2) is W2 which is wider than W1. That is, a step in the width direction exists in the first coupling position. A side face on the intermediate coupling portion 27A(2) in the step (hereinbelow, referred to as "step face") 21A and a side face SI of the front end portion 27A(1) form an angle α and a side face S2 of the intermediate coupling portion 27A(2) and an extending direction of the step face 21A form an angle β. In the embodiment, each of the angles α and β is equal to, for example, 90 degrees. That is, the step face 21A between the front end portion 27A(1) and the intermediate coupling portion 27A(2) is substantially perpendicular to the side face S1 of the front end portion 27A(1). "Substantially perpendicular" denotes here that the angle α formed between the main portion of the side face S1 of the front end portion 27A(1) and the main portion of the step face 21A is almost 90 degrees and also denotes not only the case where the corner formed by the side face S1 of the front end portion 27A(1) and the step face 21A is a sharp edge but also the case where the corner is rounded (for example, the corner has a shape shown by broken lines in FIG. 11 which will be described hereinlater). Preferably, the angle α lies within the range from, for example, 75 to 120 degrees.

The corner formed by the side face S1 of the front end portion 27A(1) in the top pole tip 27A and the step face 21A can be rounded even when the portion corresponding to the corner in a mask for forming a photoresist pattern has a sharp edge. Even if the angle of the portion corresponding to the first corner portion in the mask for forming a photoresist pattern is set to accurately 90 degrees, when an exposure amount in the photolithography process is increased, there is a case such that the angle α of the top pole tip 27A formed with the increased exposure a mount is increased to 110 to 120 degrees.

In a position where the intermediate coupling portion 27A(2) and the connection portion 27A(3) are coupled to each other (hereinbelow, called "second coupling position"), the width W3 of the connection portion 27A(3) is wider than the width W2 of the intermediate coupling portion 27A(2). That is, a step in the width direction exists in the second coupling position. A side face 21C on the connection portion 27A(3) side in the step and the side face S2 of the intermediate coupling portion 27A(2) form an angle γ, and a side face S3 of the connection portion 27A(3) and an extending direction of the step face 21C form an angle δ. In the embodiment, each of the angles γ and δ is equal to, for example, 90 degrees. Further, the side face S3 of the connection portion 27A(3) and an extending direction of an edge face (edge face at the rearmost side of the top pole tip 27A, which will be called hereinbelow "rear face") B1 on the rear side (side opposite to the air bearing surface 20) of the connection portion 27A(3) form an angle ε. In the embodiment, the angle ε is, for example, 90 degrees.

In the recess 60 of the top pole tip 27A, an inner side face S4 of the recess 60 and the extending direction of the rear face B1 form an angle ξ, and the inner side face S4 of the recess 60 and the edge face T1 form an angle η. In the embodiment, each of the angles ξ and η is, for example, 90 degrees.

In the top pole tip 27A shown in FIG. 9, the edge face T1 is in parallel with the front end face ST1 of the front end portion 27A(1) which faces a recording medium, the step faces 21A and 21C and the rear face B1. The front end face ST1 is a part of the air bearing surface 20. The edge face T1 is perpendicular to the side face S1 of the front end portion 27A(3), the side face S2 of the intermediate coupling portion 27A(2), the side face S3 of the connection portion 27A(3), and the inner face S4 of the recess 60. In the top pole tip 27A shown in FIG. 9, the position of the edge face T1 corresponds to, for example, the position of the step face 21C between the intermediate coupling portion 27A(2) and the connection portion 27A(3). The front end portion 27A(1) of the top pole tip 27A corresponds to an example of "track width defining portion" in the invention. The intermediate coupling portion 27A(2) corresponds to an example of "intermediate coupling portion" in the invention. Further, the connection portion 27A(3) corresponds to an example of "connection portion" in the invention.

Referring again to FIG. 8, the positional relation between the top pole 27C and the top pole tip 27A will be explained. In the embodiment, as obviously understood from FIG. 4A, the top pole tip 27A extends on the flat write gap layer 9 and, similarly, the top pole 27C extends on a flat insulating layer 30. The connection portion 27C(2) of the top pole 27C is connected to the connection portion 27A(3) of the top pole tip 27A so as to overlap each other (in the portion indicated by a broke line in FIG. 4A). In FIG. 4A and FIG. 8, the position of a front edge face 22 of the connection portion 27C(2) in the top pole 27C coincides with, for example, the position of the edge face T1. The edge face 22 is parallel to the air bearing surface 20. As shown in FIG. 8, it is preferable to set the length L6 of the connection portion 27C(2) of the top pole 27C, for example, to be equal to or longer than the length L3 of the connection portion 27A(3) of the top pole tip 27A (L6≧L3). It is preferable to set the width W8 of the connection portion 27C(2), for example, to be equal to or wider than the width W3 of the connection portion 27A(3) of the top pole tip 27A (W8≧W3).

For example, the following dimensions of the portions shown in FIGS. 8 and 9 are suitable. It is preferable to set the width W1 of the front end portion 27A(1), the width W2 of the intermediate coupling portion 27A(2) and the width W3 of the connection portion 27A(3) so as to satisfy the relation of W3>W2>W1 and to set the connection portions 27A(3)R and 27A(3)L to have the same shape. The lengths of the portions are preferably set to satisfy L3>L1 and L3>L2.

width W1 of the front end portion 27A(1)=0.2 to 0.5 μm width W2 of the intermediate coupling portion 27A(2)= 1.2 to 3.5 μm width W4 (W5) of the connection portion 27A(3)R (connection portion 27A(3)L)=0.5 to 3.0 μm width W6 of the recess 60=0.5 to 2.0 μm width W7 of the yoke 27C(1)=15.0 to 40.0 μm width W8 of the connection portion 27C(2)=1.2 to 3.5 μm length L1 of the front end portion 27A(1)=0.3 to 0.8 μm length L2 of the intermediate coupling portion 27A(2)= 0.3 to 3.0 μm length L3 (=L4) of the connection portion 27A(3)=1.0 to 4.0 μm length L5 of the inner face S4 of the recess 60=2.0 to 3.0 μm <<Action of Thin Film Magnetic Head>>

The action of the thin film magnetic head with the construction as described above will now be explained.

In a thin film magnetic head according to the invention, a magnetic flux generated by the thin film coil 29 in the information recording operation propagates the top pole 27C and flows almost uniformly into the connection portions 27A(3)R and 27A(3)L which construct the connection portion 27A(3) in the top pole tip 27A. The magnetic flux which flowed in the connection portions 27A(3)R and 27A(3)L of the connection portion 27A(3) flows into the intermediate coupling portion 27A(2) in the top pole tip 27A and is merged. The magnetic flux further flows in the front end portion 27A(1). The magnetic flux flowed in the front end portion 27A(1) reaches the tip of the front end portion 27A(1) and generates a signal magnetic field on the outside of the tip. By the signal magnetic field, information is recorded on a recording medium (not shown).

As described above, in the thin film magnetic head of the embodiment, the edge face T1 of the top pole tip 27A specifies the TH0 position as the reference of the throat height TH. That is, the TH0 position is determined simultaneously with the formation of the top pole tip 27A. Moreover, since the top pole tip 27A is formed on a flat face (top face of the write gap film 9), as compared with the case where the top pole tip 27A is formed on an inclined face, the edge face T1 can be more accurately positioned.

An allowable volume of the magnetic flux (hereinbelow, called "magnetic volume") of each of the front end portion 27A(1), the intermediate coupling portion 27A(2) and the connection portion 27A(3) exerts a large influence on the propagating state of the magnetic flux flowing through the portions of the top pole tip 27A. When it is assumed that magnetic volumes of the front end portion 27A(1), the intermediate coupling portion 27A(2) and the connection portion 27A(3) are V1, V2 and V3, respectively, and the portions are constructed so as to satisfy the relation of, for example, V3>V2>V1, the magnetic flux generated by the thin film magnetic coil 29 is reduced step by step as it passes through the connection portion 27A(3), the intermediate coupling portion 27A(2) and the front end portion 27A(1). In this case, the top pole tip 27A and the top pole 27C are overlapped in the two connection portions 27A(3)R and 27A(3)L which are separated from each other in the width direction, and are magnetically coupled to each other with a sufficient contact area in the overlapped regions. Consequently, the concentration of the magnetic flux in the region can be avoided and the occurrence of a magnetic flux saturation phenomenon at the time of the flow of a magnetic flux from a region of a large magnetic volume to a region of a small magnetic volume can be prevented. That is, propagation loss of the magnetic flux caused by the magnetic flux saturating phenomenon can be reduced and a magnetic flux of a sufficient volume can be smoothly supplied to the front end portion 27A(1) of the top pole tip 27A.

Figure 10:
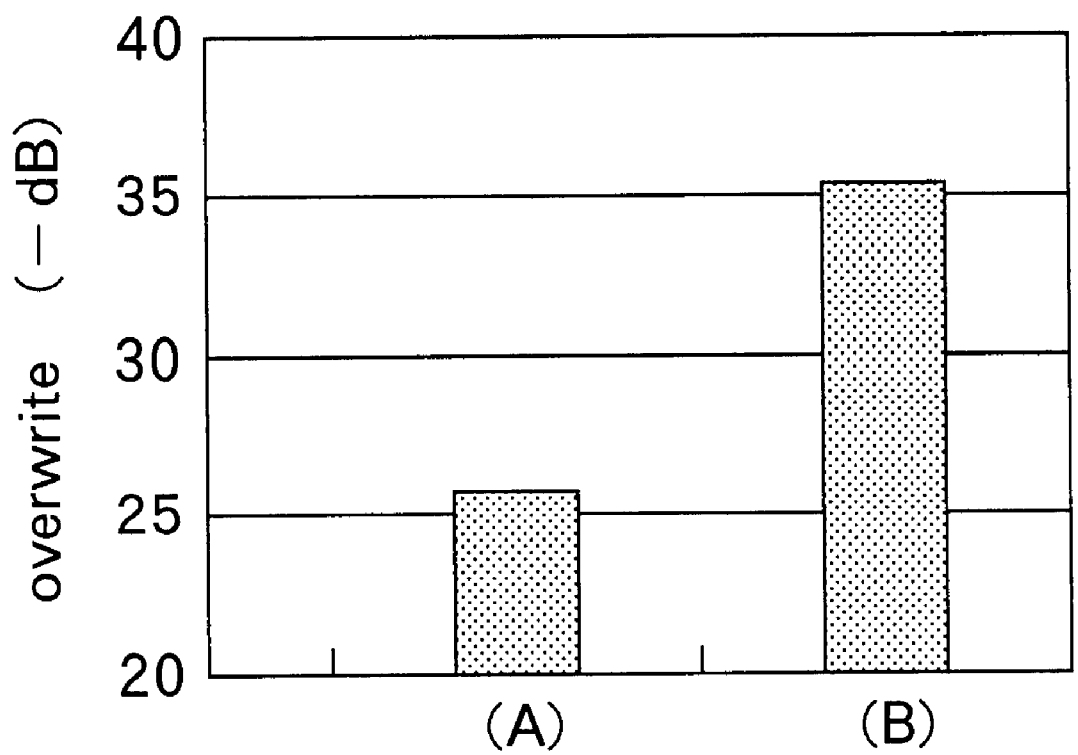
FIG. 10 is a diagram showing overwrite characteristics of the thin film magnetic head in FIG. 7 and a conventional thin film magnetic head.
Figure 63:
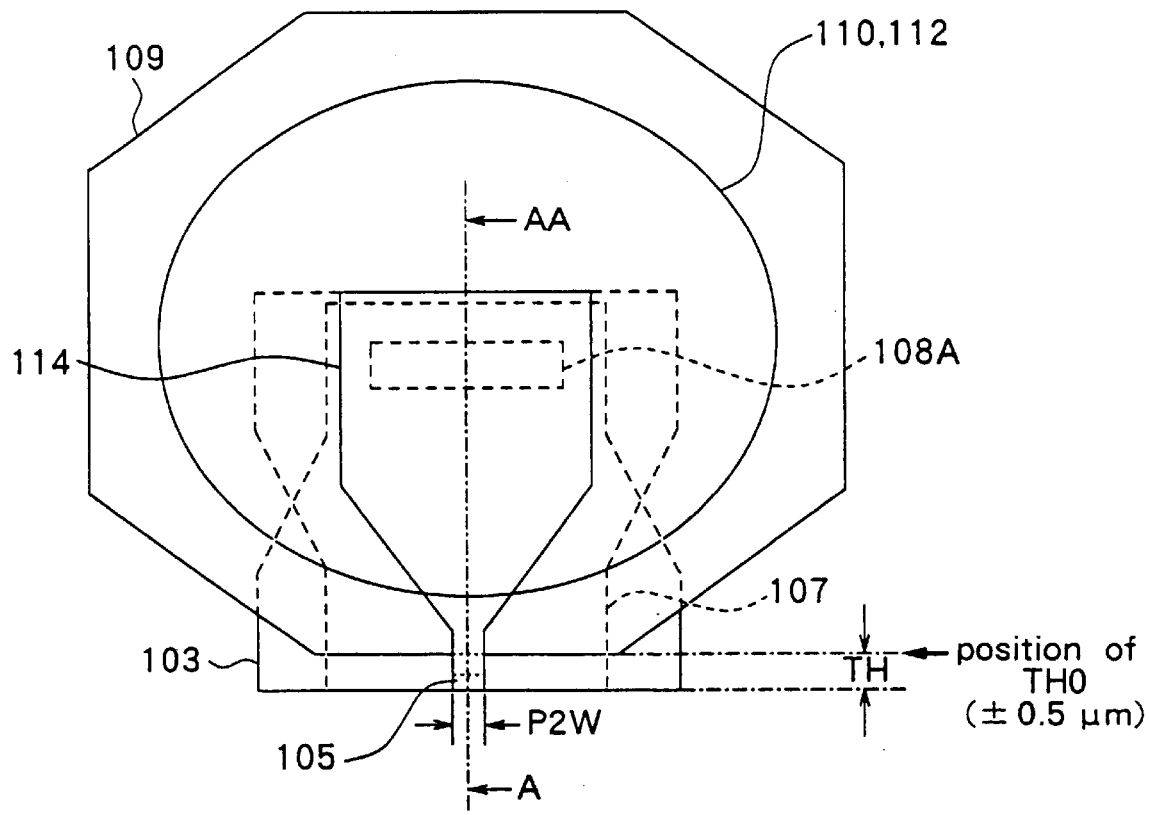
FIG. 63 is a plan view showing the structure of the conventional thin film magnetic head.
Figure 64:
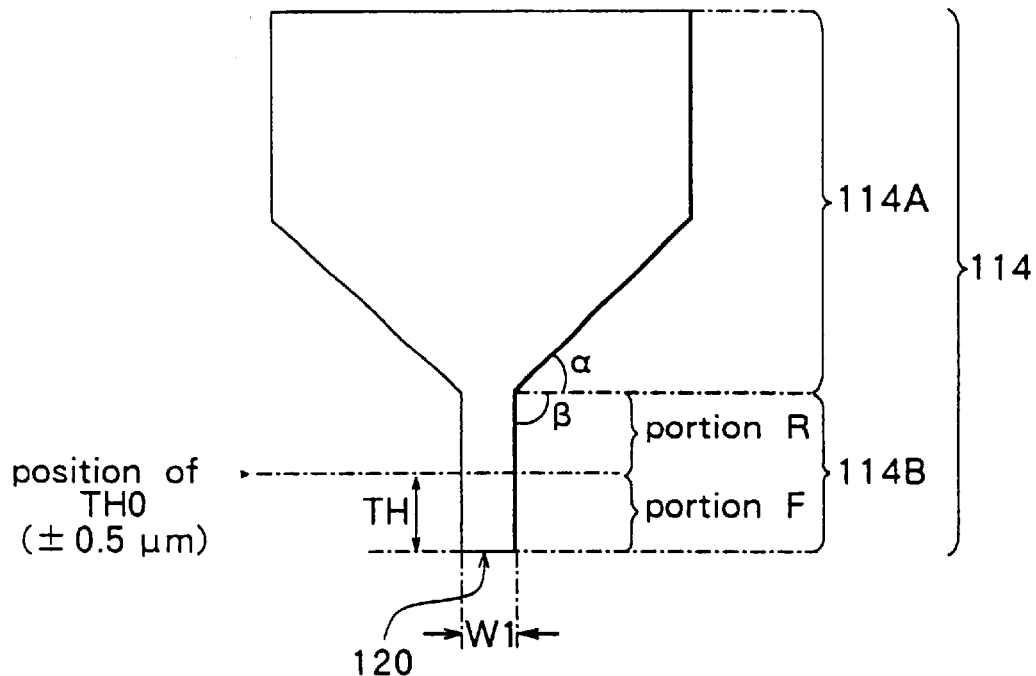
FIG. 64 is a plan view showing the structure of the top pole in the conventional thin film magnetic head.
Figure 65:
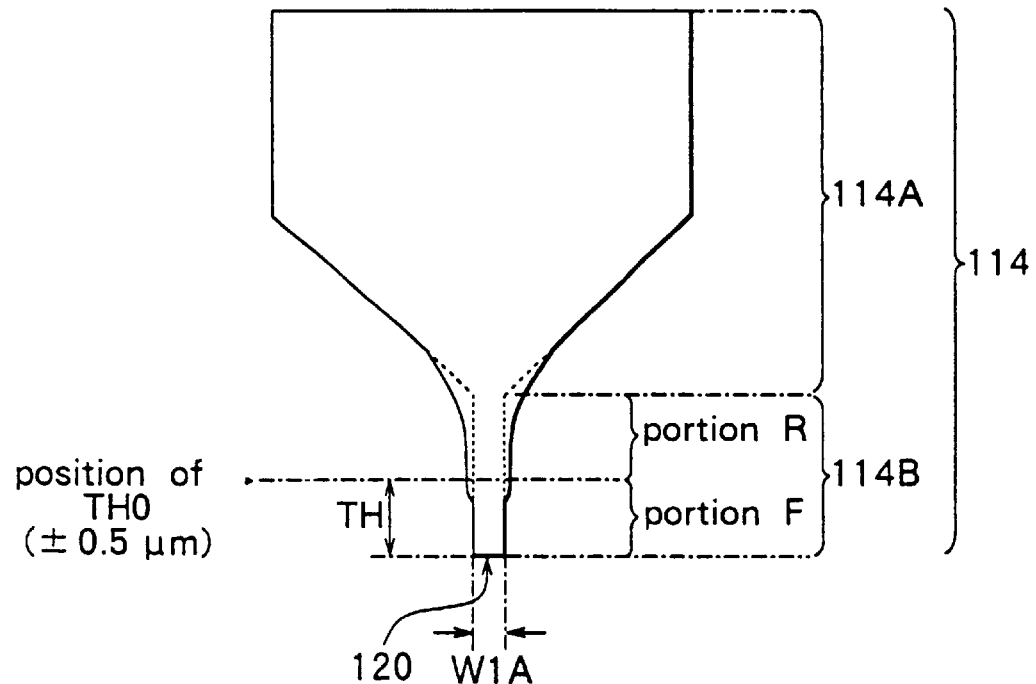
FIG. 65 is a plan view of the top pole for explaining problems which occur when manufacturing a minute top pole in the conventional thin film magnetic head is made finer.

FIG. 10 shows the overwrite characteristic of the conventional thin film magnetic head and that of the thin film magnetic head of the embodiment so as to compare with each other. (A) in the drawing shows the overwrite characteristic of the conventional thin film magnetic head having the top pole 114 of a shape as shown in FIG. 63. (B) shows the overwrite characteristics of the thin film magnetic head according to the embodiment having the top pole 27C and the top pole tip 27A of the shapes shown in FIG. 8. As shown in the drawing, the thin film magnetic head of the embodiment obtains a high value of 35.5 dB in contrast to a value 26.0 dB of the conventional thin film magnetic head, so that the overwrite characteristic is improved.

Further, the thin film magnetic head including the top pole tip 27A having the shape as described above has the following advantages also with respect to the accuracy of manufacture.

Figure 12:
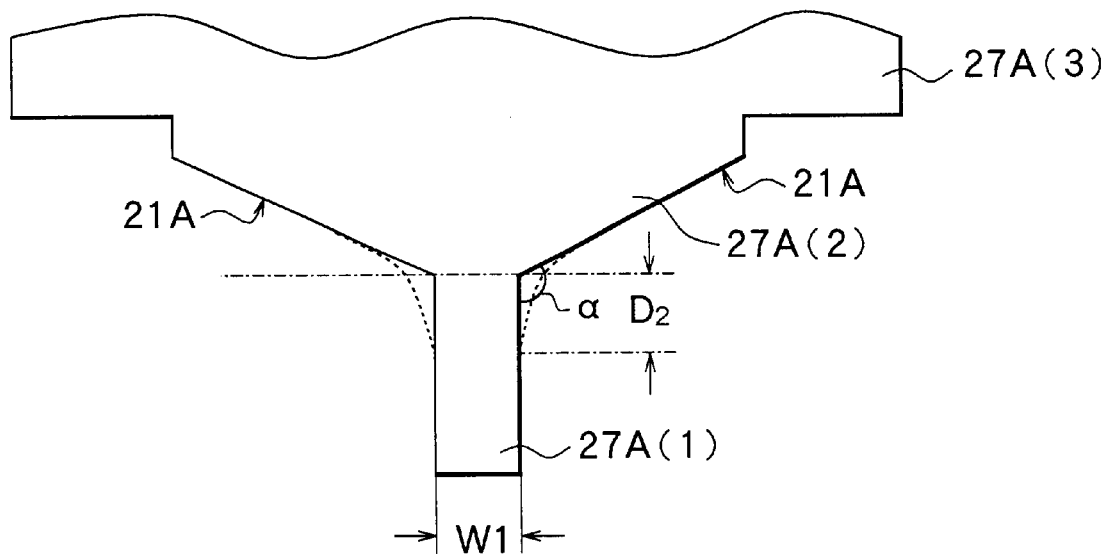
FIG. 12 is an enlarged plan view of a top pole for explaining the action in a comparative example of the thin film magnetic head shown in FIG. 7.

Specifically, when the angle α formed by the step face 21A in the first coupling position and the side face of the front end portion 27A(1) is much larger than 90 degrees (for example, 130 degrees or more) as shown in FIG. 12 as a comparative example, in the case of selectively exposing and patterning the photoresist by using a mask in the photolithography process, the region in which the pattern width increases in the photoresist region becomes very large. To be specific, in the front end portion 27A(1), the length D2 of a portion (shown by broken lines in the drawing) which becomes wider than an expected target width W1 becomes considerably long. As a result, the length of a portion having the constant target width W1 becomes short.

Figure 11:
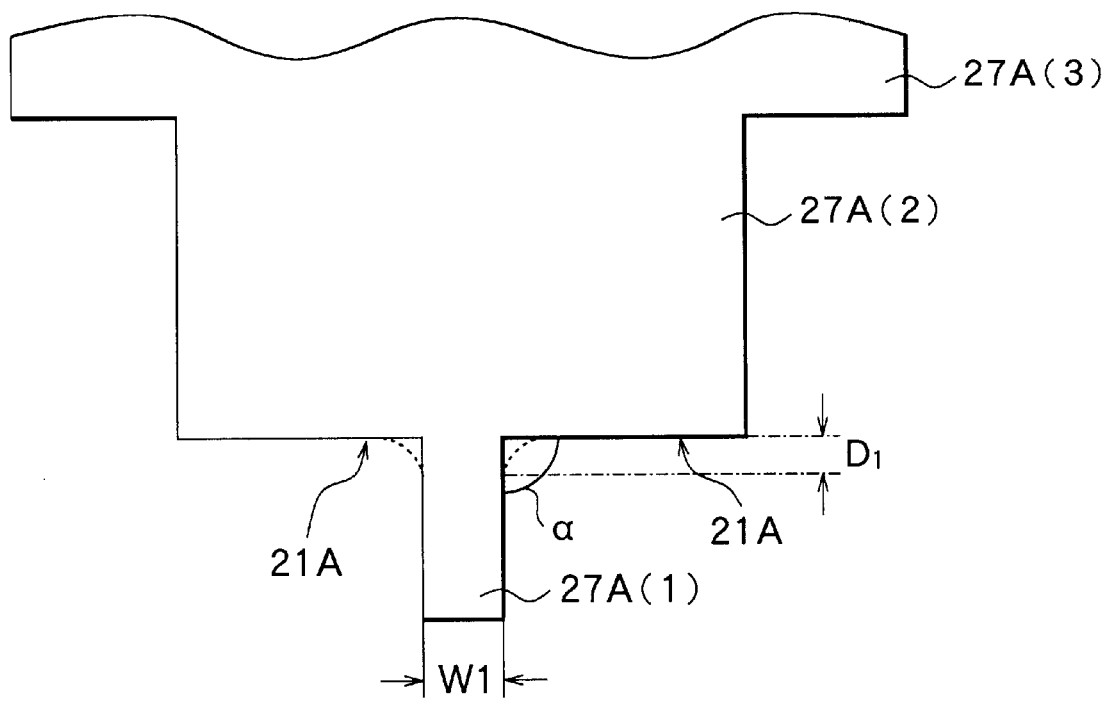
FIG. 11 is an enlarged plan view of the top pole tip for explaining the action in the thin film magnetic head shown in FIG. 7.

On the contrary, in the top pole tip 27A in the thin film magnetic head of the embodiment, as shown in FIG. 11, the angle α formed by the step face 21A in the first coupling position and the side face S1 of the front end portion 27A(1) is almost 90 degrees. Consequently, when the photoresist is selectively exposed and patterned by using a mask in the photolithography process, widening of the pattern width in the photoresist region can be effectively suppressed. Specifically, as shown in FIG. 11, the length D1 of a portion (shown by broken lines) in which the front end portion 27A(1) is formed wider than the expected target width W1 can be extremely reduced.

As described above, according to the thin film magnetic head of the embodiment, since the TH0 position is defined by the edge face T1 of the top pole tip 27A formed on the flat face, the TH0 position can be accurately determined upon formation of the top pole tip 27A and the throat height TH which contributes to the recording characteristic of the thin film magnetic head can be formed with high accuracy.

Since the top pole tip 27A and the top pole 27C are magnetically coupled to each other with a sufficient contact area in the two connection portions 27A(3)R and 27A(3)L which are separated from each other in the width direction, the magnetic flux propagation loss caused by the magnetic flux saturation which occurs when the magnetic flux flows from the region of a large magnetic volume to the region of a small magnetic volume can be reduced and the magnetic flux of a sufficient volume can reach the front end portion 27A(1) of the top pole tip 27A. Even in the case where the width W1 of the front end portion 27A(1) is narrowed to, for example, the order of submicrons, an excellent overwrite characteristic can be therefore assured.

In the embodiment, in the first coupling position of the top pole tip 27A, a step in the width direction which changes to have a substantially right angle is provided between the front end portion 27A(1) and the intermediate coupling portion 27A(2). Thus, the increase in the pattern width of the photoresist used for forming the front end portion 27A(1) can be prevented and the region in which the width of the front end portion 27A(1) defining the write track width on a recording medium is almost the target value W1 can be sufficiently assured. As a result, the write track width on a recording medium can be narrowed.

Since the top pole 27C is formed on the flat portion subjected to the CMP in the embodiment, the photoresist pattern can be formed by the photolithography with high accuracy. As a result, the top pole 27C can be also formed with high accuracy.

Since the thick insulating film 28 made of alumina or the like is formed between the write gap layer 9 and the thin film coil 10 in the embodiment, the dielectric withstand voltage between the thin film coil 29 and the bottom pole 7 can be increased and leakage of the magnetic flux from the thin film coil 29 can be reduced.

Although the top pole 27C is made of, for example, NiFe or iron nitride (FeN) in the embodiment, a material having a high saturated magnetic flux density such as an amorphous Fe—Co—Zr material may be used. Two or more kinds of such materials may be also used. The top pole 7 may be also made of a magnetic material obtained by stacking NiFe and the material having a high saturated magnetic flux density. ps <<Modifications of First Embodiment>>

Some modifications of the embodiment will now be described.

<Modification 1-1>

In the thin film magnetic head according to the embodiment, only the shapes of the top pole 27C and the top pole tip 27A are devised to control the magnetic volume. In addition, as shown in FIG. 13, the magnetic volume of the top pole 7 can be also controlled by changing the shape of the bottom pole 7.

Figure 13:
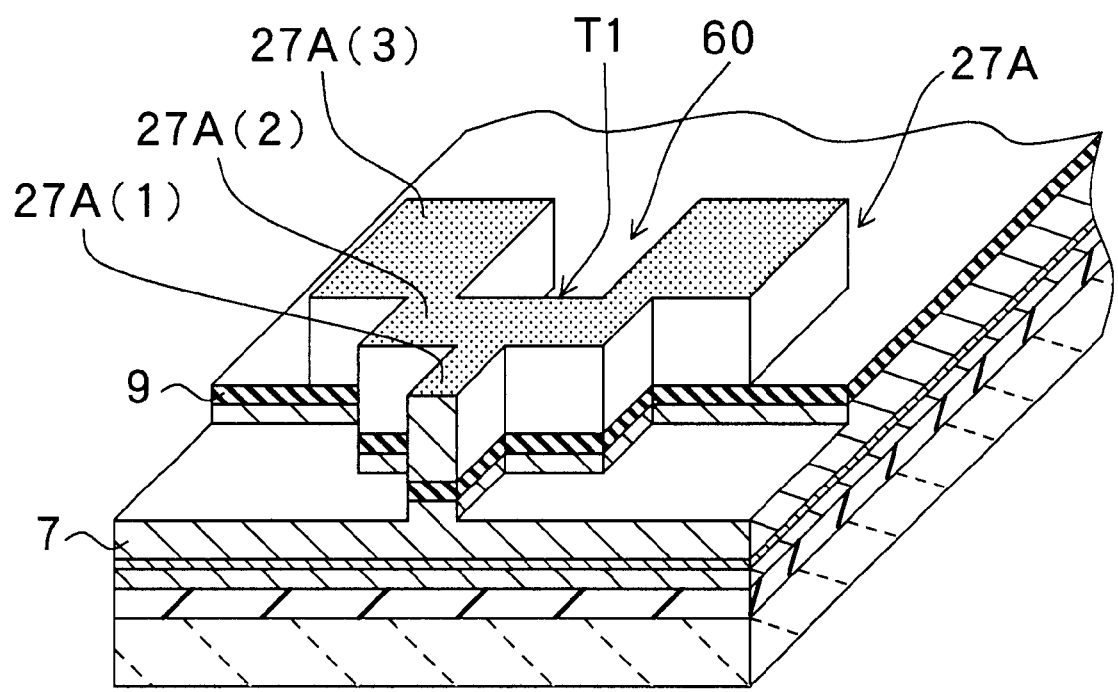
FIG. 13 is a perspective view showing a modification of the structure of the thin film magnetic head according to the first embodiment of the invention illustrated in FIG. 6.

FIG. 13 shows the modification of the trim structure in the thin film magnetic head. Specifically, FIG. 13 shows a state just after the top pole tip 27A is formed and the trim structure is formed by an etching process. FIG. 13 corresponds to the perspective view of FIG. 6. In FIG. 13, the same components as those of the thin film magnetic head shown in FIG. 6 are designated by the same reference numerals and their description is properly omitted here.

As shown in FIG. 13, in the modification, different from the case of FIG. 6 in which the range of forming the trim structure (etching region) is the entire region of the bottom pole 7, the range of forming the trim structure is limited to a region forward of the edge face T1 of the top pole tip 27A. For example, when the position of the edge face T1 of the top pole tip 27A and the position of the step face 21C match with each other as in the above case, the border on the rear side of the range of forming the trim structure also matches the position of the step face 21C. Such a structure can be formed by selectively depositing a photoresist (not shown) in the region rearward of the edge face T1 and etching a part of each of the write gap layer 9 and the bottom pole 7 in a self alignment manner by using the photoresist, and the front end portion 27A(1) and the intermediate coupling portion 27A(2) in the top pole tip 27A as a mask.

In the modification, although a sufficient magnetic volume is assured in the bottom pole 7 in the region rearward of the edge face T1, on the region forward of the edge face T1, the magnetic volume of the bottom pole 7 is decreased step by step in accordance with the order of the connection portion 27A(3), the intermediate coupling portion 27A(2) and the front end portion 27A(l) in the top pole tip 27A. As a result, the magnetic flux propagated to the bottom pole 7 is reduced step by step as it passes through the connection portion 27A(3), the intermediate coupling portion 27A(2) and the front end portion 27A(1) in the top pole tip 27A. By the bottom pole 7 as well, an effect similar to that in the case where the magnetic flux is gradually reduced by the shape of the top pole tip 27A can be obtained.

Although the border on the rear side of the range of forming the trim structure matches with the position of the edge face T1 of the top pole tip 27A in the modification, the invention is not limited to the arrangement. Since the partial etching of the bottom pole 7 by the etching process at the time of forming the trim structure partially reduces the magnetic volume of the bottom pole 7, when the range of forming the trim structure extends too much to the rear side, it is unpreferable since the magnetic volume becomes too small.

<Modification 1-2>

Figure 14:
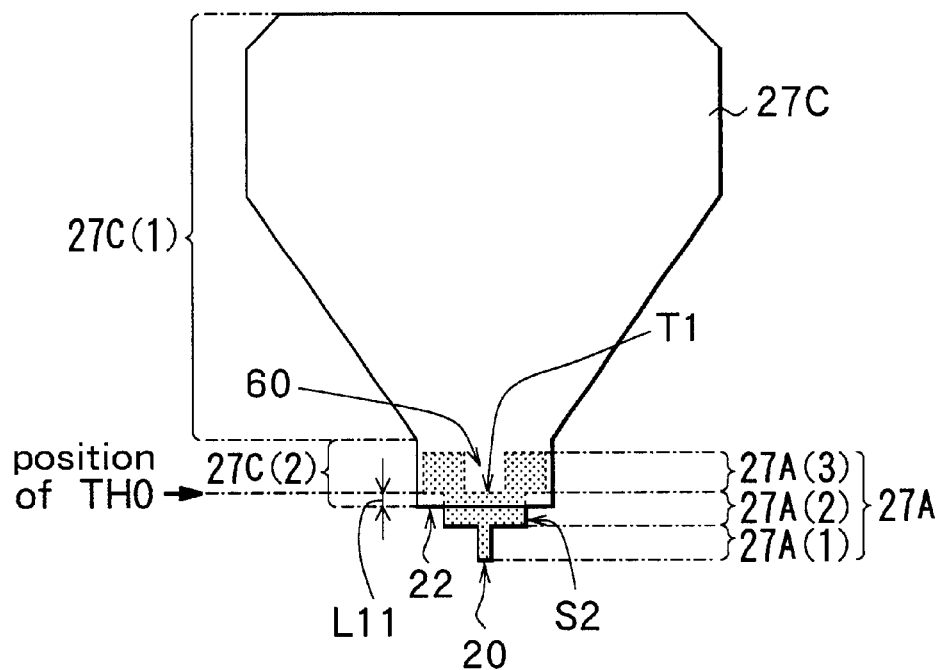
FIG. 14 is a plan view showing a modification of the top pole and the top pole tip illustrated in FIG. 8.
Figure 15:
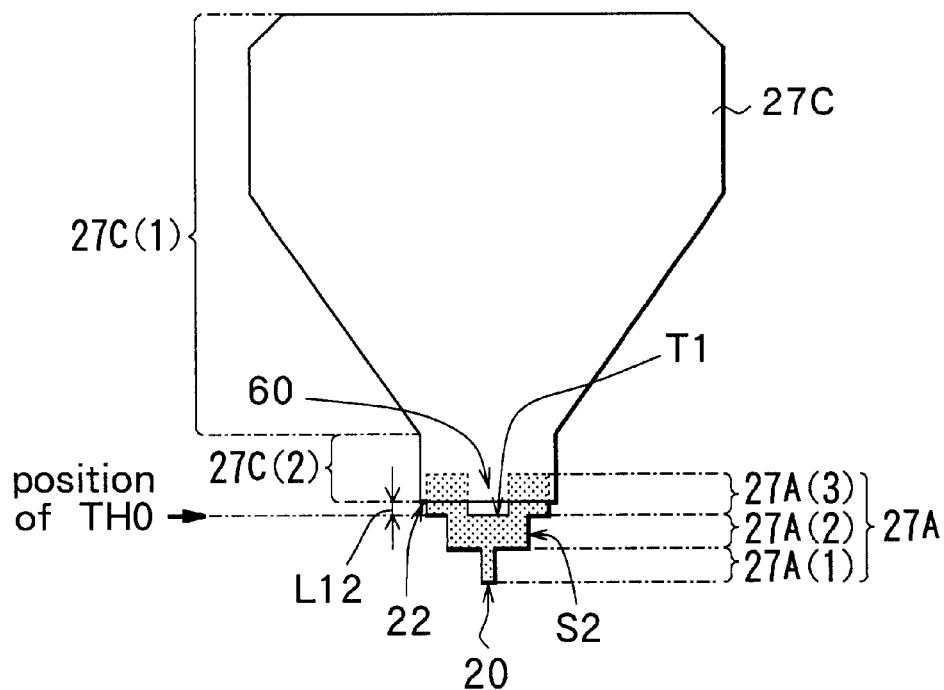
FIG. 15 is a plan view showing another modification of the top pole and the top pole tip illustrated in FIG. 8.

Although the case where the position of the edge face 22 of the connection portion 27C(2) in the top pole 27C matches with the position of the edge face T1 which determines the TH0 position has been described above in the embodiment, the invention is not limited to the case. For example, as shown in FIG. 14, the position of the edge face 22 on the front side (air bearing surface side) in the connection portion 27C(2) of the top pole 27C may cross the position of the edge face T1 and extend so as to overlap a part of the intermediate coupling portion 27A(2). In this case, it is preferable to set length L11 of a deviation from the edge face 22 of the connection portion 27C(2) in the top pole 27C to the edge face T1, for example, within a range from 0.5 to 1.5 $\mu$m. As shown in FIG. 15, the position of the edge face 22 in the connection portion 27C(2) of the top pole 27C may be deviated to the rear ward (side opposite to the air bearing surface) of the position of the edge face T1. It is preferable to set the length L12 of the deviation in this case also within the range from 0.5 to 1.5 $\mu$m.

<Modification 1-3>

Figure 16:
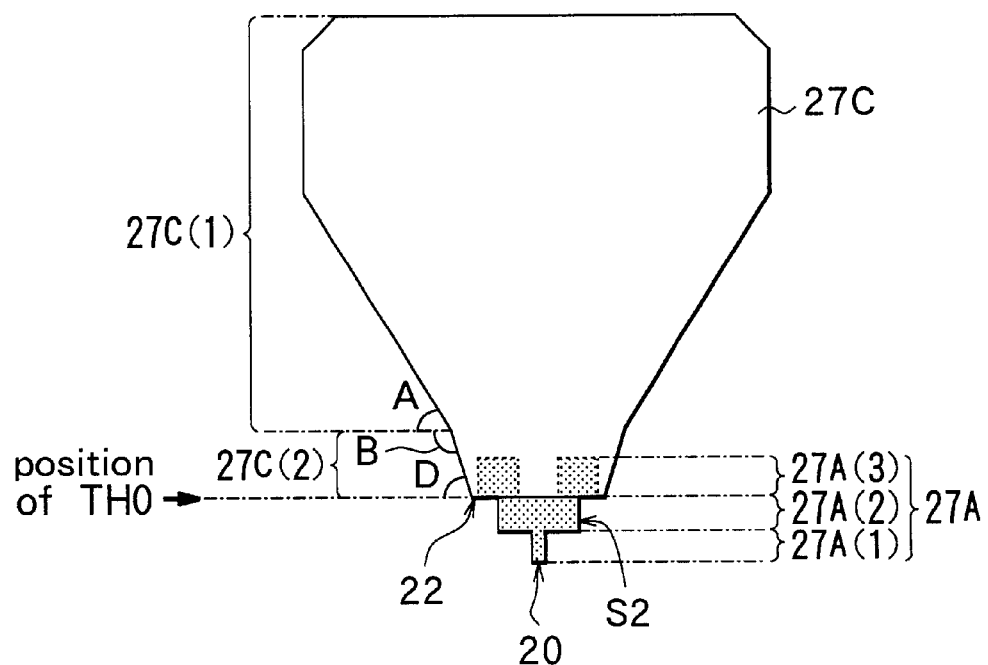
FIG. 16 is a plan view showing further another modification of the top pole and the top pole tip illustrated in FIG. 8.

The connection portion 27C(2) in the top pole 27C does not always have to have a constant width irrespective of the position as shown in FIG. 8 but may have a tapered shape such that the width is reduced towards the front side as shown in FIG. 16. In FIG. 16, it is preferable to set the taper angle (d) formed between a side face of the connection portion 27C(2) in the top pole 27C and the edge face 22 of the connection portion 27C(2), for example, within a range from 45 to 60 degrees. In this case as well, the position of the edge face 22 of the connection portion 27C(2) in the top pole 27C does not always have to accurately match with the position of the edge face T1. A positional relation such that the edge face s 22 and T1 are deviated from each other may be also employed.

<Modification 1-4>

Figure 17:
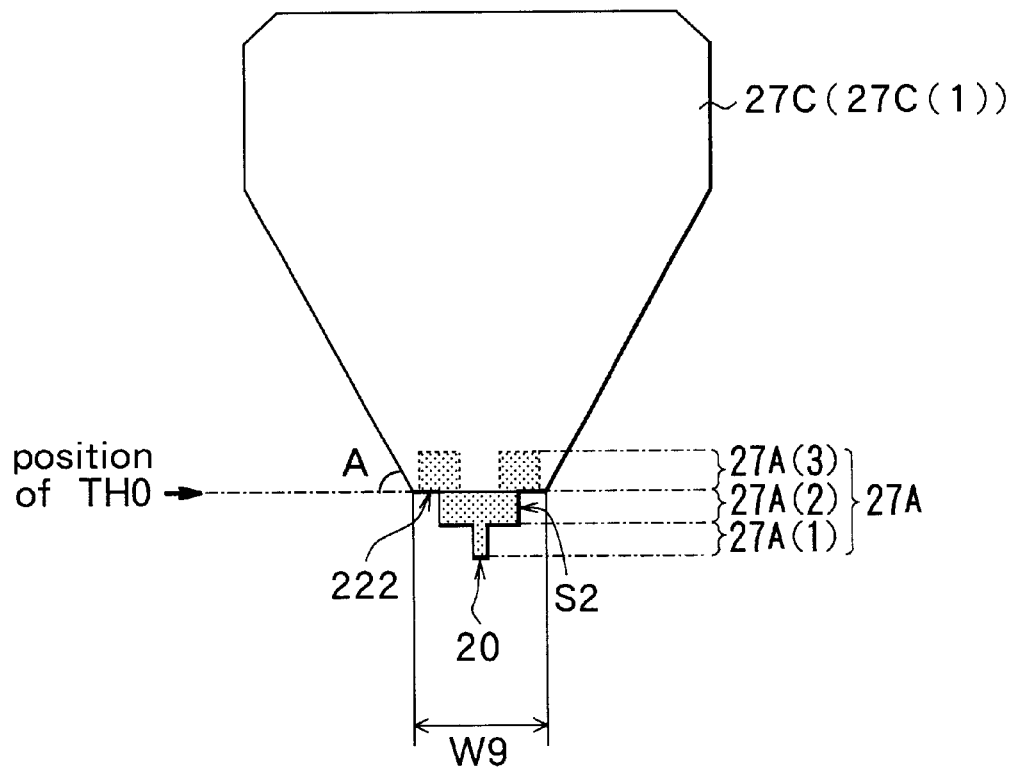
FIG. 17 is a plan view showing further another modification of the top pole and the top pole tip illustrated in FIG. 8.

The connection portion 27C(2) in the top pole 27C shown in the embodiment and the modifications is not indispensable. For example, as shown in FIG. 17, it is also possible to construct the top pole 27C only by the yoke 27C(1) and overlap a part of the yoke 27C(1) with the connection portion 27A(3) in the top pole tip 27A. In the example shown in FIG. 16, the position of an edge face 222 on the front side of the yoke 27C(1) in the top pole 27C matches with the position of the edge face T1. It is preferable to make the width W9 of the edge face 222 on the front side of the yoke 27C(1) match with, for example, the width W8 of the connection portion 27C(2). In this case as well, the position of the edge face 222 of the yoke 27C(1) of the top pole 27C does not always have to accurately match with the position of the edge face T1 but may be deviated from each other.

The shape of the top pole tip 27A is not limited to that shown in FIG. 9. Shapes shown in FIGS. 18 to 38 may be also used. Each of the modifications will be described hereinbelow.

First, by referring to FIGS. 18 to 24, modifications regarding the shape of the connection portion 27A(3) in the top pole tip 27A will be described.

<Modification 1-5>

Figure 18:
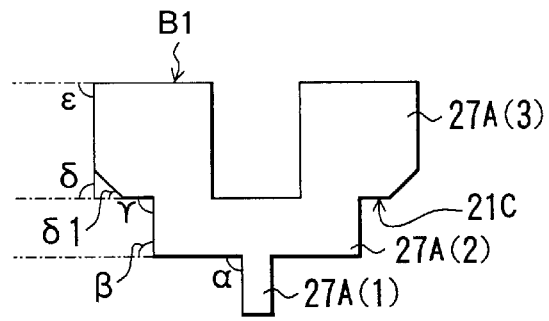
FIG. 18 is a plan view showing a modification of the top pole tip illustrated in FIG. 9.

FIG. 18 is a plan view of the top pole tip 27A in the case where corners on both sides of the step face 21C between the intermediate coupling portion 27A(2) and the connection portion 27A(3) in the second coupling position are chamfered slightly. The structure of the portion other than the chamfered portions (the shapes of the front end portion 27A(1), the intermediate coupling portion 27A(2) and the recess 60 in the connection portion 27A(3)) is similar to the case of FIG. 9. It is preferable to set a chamfering angle δ1 to the step face 21C to, for example, 30 to 60 degrees.

<Modification 1-6>

Figure 19:
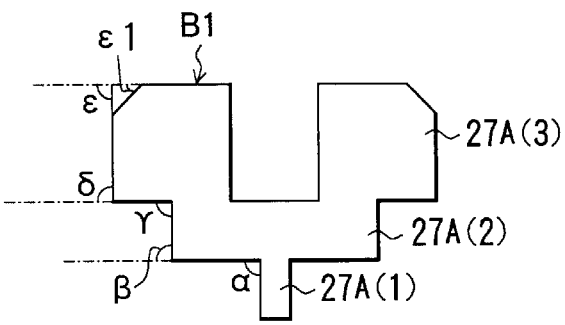
FIG. 19 is a plan view showing another modification of the top pole tip illustrated in FIG. 9.

FIG. 19 is a plan view of the top pole tip 27A in the case where corners on both sides of the rear face B1 of the top pole tip 27A are chamfered slightly. The structure of the portion other than the chamfered portions is similar to the case of FIG. 9. It is preferable to set a chamfering angle ε1 to rear face B1 to, for example, 30 to 60 degrees.

<Modification 1-7>

Figure 20:
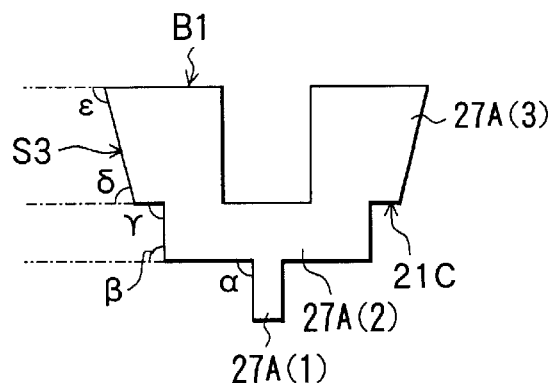
FIG. 20 is a plan view showing further another modification of the top pole tip illustrated in FIG. 9.

FIG. 20 is a plan view of the top pole tip 27A in the case where the connection portion 27A(3) has a taper shape which becomes wider towards the rear side. In FIG. 20, it is preferable to set a taper angle δ of the connection portion 27A(3) in the top pole tip 27A (angle formed by the step face 21C and the side face S3 of the connection portion 27A(3) in the second coupling position), for example, in a range from 60 to 80 degrees. At this time, an angle ε formed by the rear face B1 of the top pole tip 27A and the side face S3 of the connection portion 27A(3) is larger than 90 degrees. The structure of the portion other than the taper portion is similar to the case of FIG. 9.

<Modification 1-8>

Figure 21:
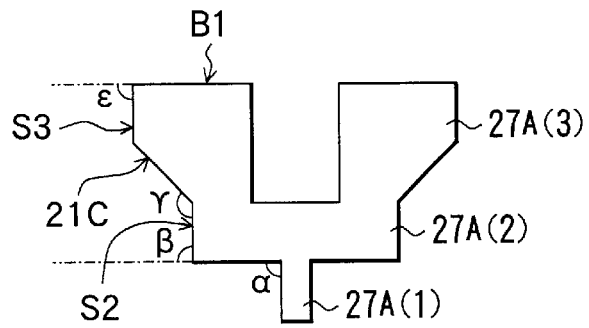
FIG. 21 is a plan view showing further another modification of the top pole tip illustrated in FIG. 9.

FIG. 21 is a plan view of the top pole tip 27A in the case where an angle γ formed by the step face 21C between the intermediate coupling portion 27A(2) and the connection portion 27A(3) and the side face S2 of the intermediate coupling portion 27A(2) in the second coupling position is larger than 90 degrees. It is preferable to set the angle γ to, for example, about 135 degrees. The other structure is similar to the case shown in FIG. 9.

<Modification 1-9>

Figure 22:
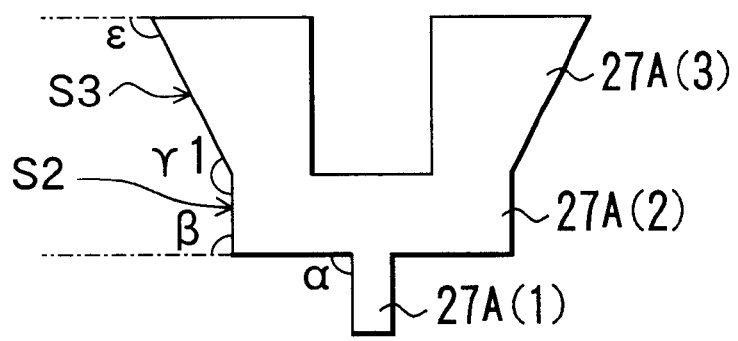
FIG. 22 is a plan view showing further another modification of the top pole tip illustrated in FIG. 9.

FIG. 22 is a plan view of the top pole tip 27A in the case where the step face 21C between the intermediate coupling portion 27A(2) and the connection portion 27A(3) in the second coupling position is eliminated. In the modification, each of an angle γ1 formed between the side face S2 of the intermediate coupling portion 27A(2) and the side face S3 of the connection portion 27A(3) and an angle ε formed between the rear face B1 of the top pole tip 27A and the side face S3 of the connection portion 27A(3) is set to be larger than 90 degrees. The other structure is similar to the case shown in FIG. 9.

<Modification 1-10>

Figure 23:
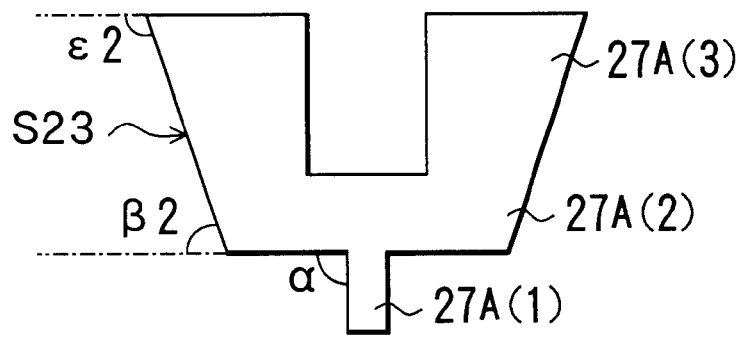
FIG. 23 is a plan view showing further another modification of the top pole tip illustrated in FIG. 9.

FIG. 23 is a plan view of the top pole tip 27A in the case where the step face 21C between the intermediate coupling portion 27A(2) and the connection portion 27A(3) in the second coupling position is eliminated and the side face of the intermediate coupling portion 27A(2) and the side face of the connection portion 27A(3) construct the same side face S23. In the modification, an angle β2 formed between the side face S23 of the top pole tip 27A and the step face 21A is smaller than 90 degrees, and an angle ε2 formed between the side face S23 of the top pole tip 27A and the rear face B1 is set to be larger than 90 degrees. The other structure is similar to the case shown in FIG. 9.

<Modification 1-11>

Figure 24:
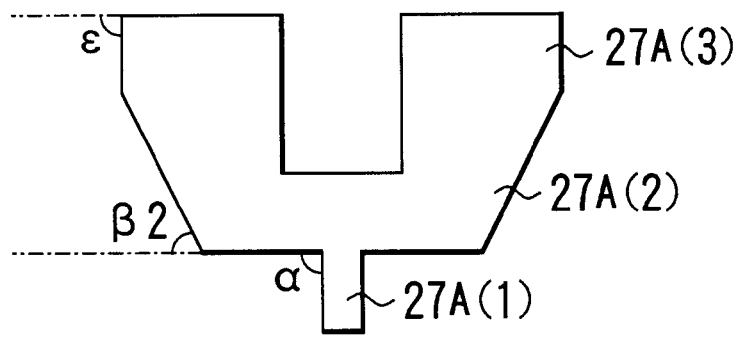
FIG. 24 is a plan view showing further another modification of the top pole tip illustrated in FIG. 9.

FIG. 24 is a plan view of the top pole tip 27A in the case where an angle γ formed by the step face 21C between the intermediate coupling portion 27A(2) and the connection portion 27A(3) and the side face S2 of the intermediate coupling portion 27A(2) in the second coupling position is larger than 180 degrees. The other structure is similar to the case shown in FIG. 9.

Referring now to FIGS. 25 to 30, modifications in the case where the shape of the recess 60 in the top pole tip 27A is variously modified will be explained.

<Modification 1-12>

Figure 25:
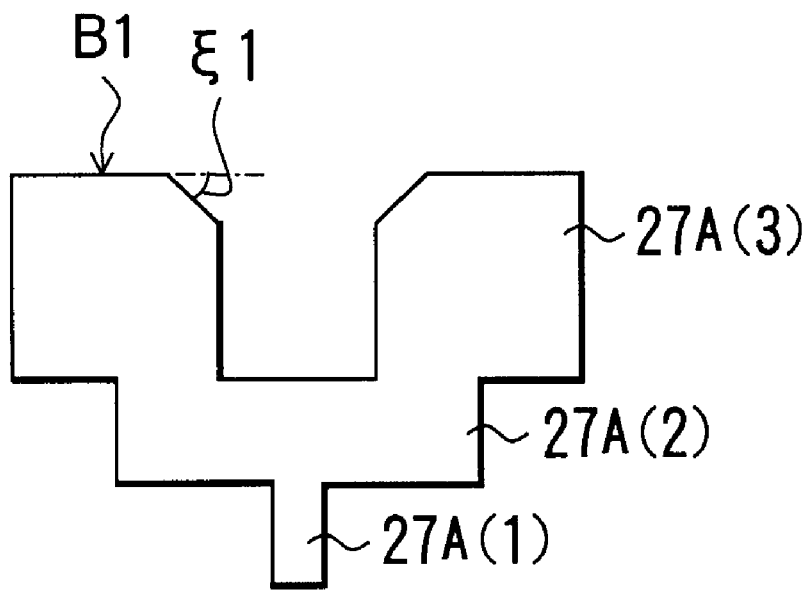
FIG. 25 is a plan view showing further another modification of the top pole tip illustrated in FIG. 9.

FIG. 25 is a plan view of the top pole tip 27A in the case where corners on both sides of the rear face B1 of the top pole tip 27A are chamfered slightly. The structure of the portion other than the chamfered portions is similar to the case of FIG. 9. It is preferable to set a chamfering angle ξ1 with respect to the rear face B1 to, for example, 30 to 60 degrees <Modification 1-13>

Figure 26:
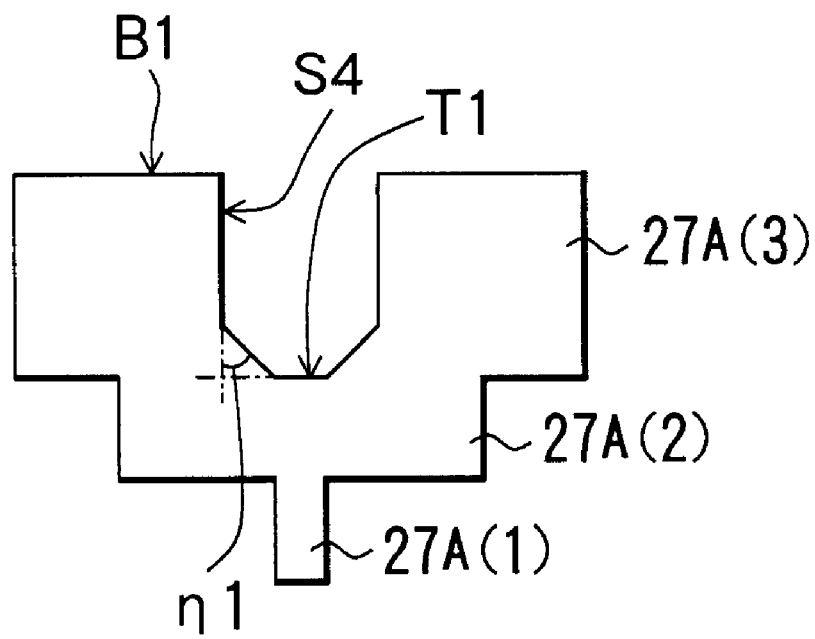
FIG. 26 is a plan view showing further another modification of the top pole tip illustrated in FIG. 9.

FIG. 26 is a plan view of the top pole tip 27A in the case where inner corners of the recess 60 are chamfered slightly. The structure of the portion other than the chamfered portions is similar to the case of FIG. 9. It is preferable to set a chamfering angle η1 with respect to the inner face S4 to, for example, 30 to 60 degrees.

<Modification 1-14>

As described above, the volume of the magnetic flux propagating from the connection portion 27C(2) in the top pole 27C to the connection portion 27A(3) in the top pole tip 27A depends on the contact area of the connection portions. That is, by changing the contact area of the connection portion 27C(2) in the top pole 27C and the connection portion 27A(3), the propagation of the actual magnetic flux from the connection portion 27C(2) to the connection portion 27A(3) with respect to the absolute volume of the magnetic flux can be controlled. A modification based on this viewpoint will be explained b y referring to FIGS. 27A to 27C.

Figure 27A:
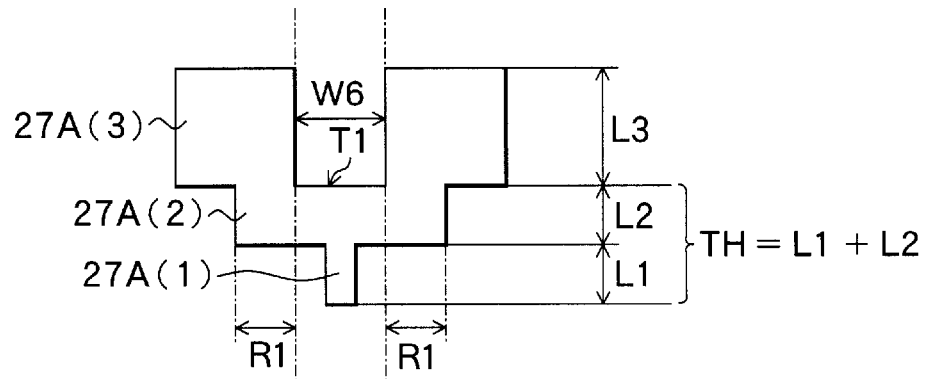
FIG. 27 is a plan view showing further another modification of the top pole tip illustrated in FIG. 9.
Figure 27B:
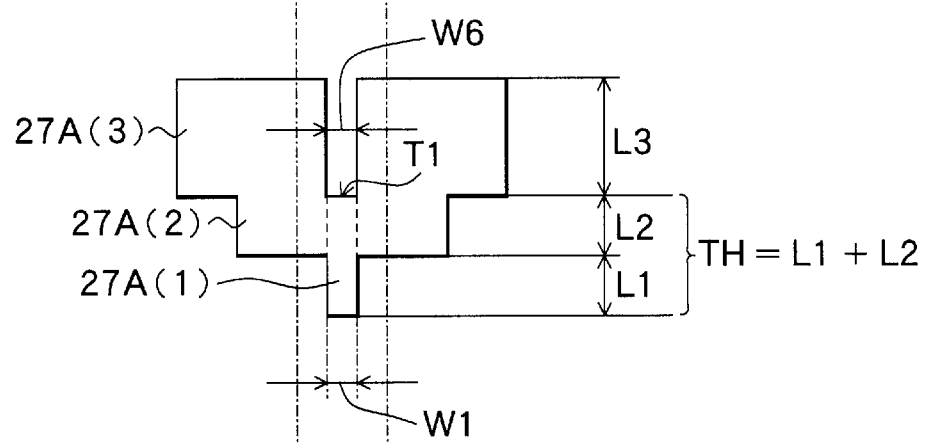
Figure 27C:
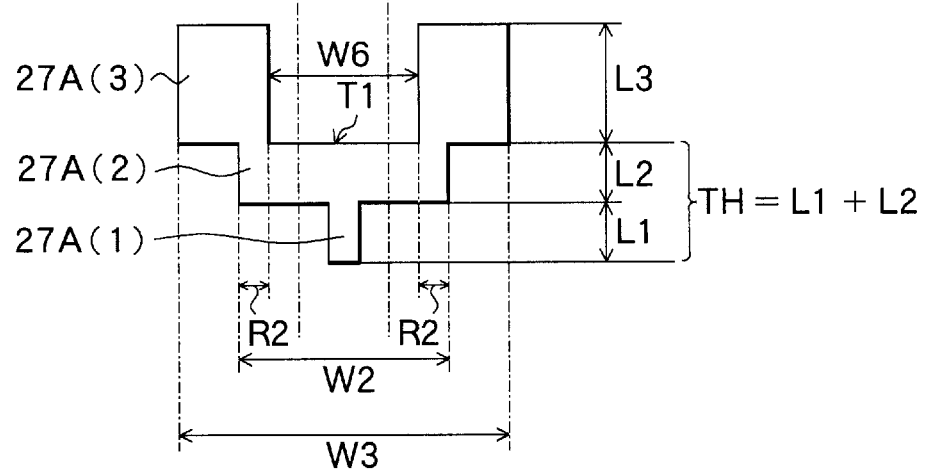

FIGS. 27A to 27C are plan views of the top pole tip 27A in the case of variously changing the width W6 of the recess 60 in the top pole tip 27A. FIG. 27A shows the case where the width W6 of the recess 60 in the top pole tip 27A is slightly wider than the width W1 of the front end portion 27A(1) (similar to the case of FIG. 9). FIG. 27B shows a case where the width W6 is equal to the width WI. FIG. 27C shows a case where the width W6 is sufficiently wider than the width W1. In FIGS. 27B and 27C, the structure of the part except for the recess 60 is similar to that of the top pole tip 27A shown in FIG. 27A.

The width W6 of the recess 60 can be freely set in accordance with the shape of a photomask used in a photolithography process. By changing the width W6, the contact area of the top pole tip 27A and the top pole 27C can be optimized. Specifically, when the width W6 of the recess 60 is reduced, the area of the connection portion 27A(3) increases and the contact area with the top pole 27C increases. On the contrary, when the width W6 of the recess 60 is increased, the area of the contact portion 27A(3) decreases and the contact area with the top pole 27C decreases.

It is preferable to set the width W6 of the recess 60 in the top pole tip 27A to be equal to or wider than the width W1 of the front end portion 27A(1) as shown in FIG. 27B. When the width W6 of the recess 60 is smaller than the width W1 of the front end portion 27A(1), the edge face T1 is rounded due to exposure in the photolithography process and there is the possibility that the TH0 position cannot be accurately defined. Specifically, as described above, it is preferable to set the width W6 to about 0.4 $\mu$m or wider similar to the width W1 of the front end portion 27A(1).

On the other hand, as shown in FIG. 27C, when the width W6 of the recess 60 in the top pole tip 27A is increased, the width of the magnetic flux propagation path from the connection portion 27A(3) to the intermediate coupling portion 27A(2) is reduced (=R2). Consequently, a magnetic flux saturation phenomenon easily occurs in the position. There is the possibility that the sufficient magnetic flux propagation to the front end portion 27A(1) is checked. In this case, it is preferable to expand the width W6 of the recess 60 and, simultaneously, the width W2 of the intermediate coupling portion 27A(2). Specifically, when the width W2 of the intermediate coupling portion 27A(2) is set to, for example, about 1.0 to 3.0 $\mu$m, it is preferable to set the width W6 to, for example, about 1.0 to 3.0 $\mu$m on condition that W2>W6.

<Modification 1-15>

FIGS. 28A to 28C are plan views of the top pole tip 27A when the length L5 of the inner face S4 of the recess 60 in the top pole tip 27A is variously changed. FIG. 28A shows the case where the length L5 of the inner face S4 of the recess 60 in the top pole tip 27A is equal to the length L3 of the connection portion 27A(3) (same as the case of FIG. 9). FIG. 28B shows the case where L5 is longer than L3. FIG. 28C shows the case where L5 is shorter than L3. In FIGS. 28B and 28C, the structure except for the recess 60 is similar to that of the top pole tip 27A shown in FIG. 28A.

In FIGS. 28A to 28C, the position of the edge face T1 corresponds to the TH0 position. That is, the length from the edge face T1 to the front end face ST1 of the front end portion 27A(1) corresponds to the throat height TH. By changing the length L5 of the inner face S4 of the recess 60 in the top pole tip 27A, the throat height TH can be freely set. By changing the length L5 of the inner face S4 of the recess 60, the contact area of the connection portion 27C(2) of the top pole 27C and the top pole tip 27A can be changed.

Specifically, as shown in FIG. 28B, the length L5 of the inner face S4 of the recess 60 can be set within the range of L3<L5<L2+L3. In this case, the throat height TH can be reduced more than the case of FIG. 28A. On the other hand, as shown in FIG. 28C, the length L5 of the inner face S4 of the recess 60 can be set within the range of 0<L5<L3. In this case, while extending the throat height TH, the contact area of the connection portion 27C(2) (not shown) in the top pole 27C and the top pole tip 27A can be enlarged. Specifically, it is preferable to set the length L5 to, for example, about 1.0 $\mu$m to 3.0 $\mu$m.

<Modification 1-16>

Figure 29:
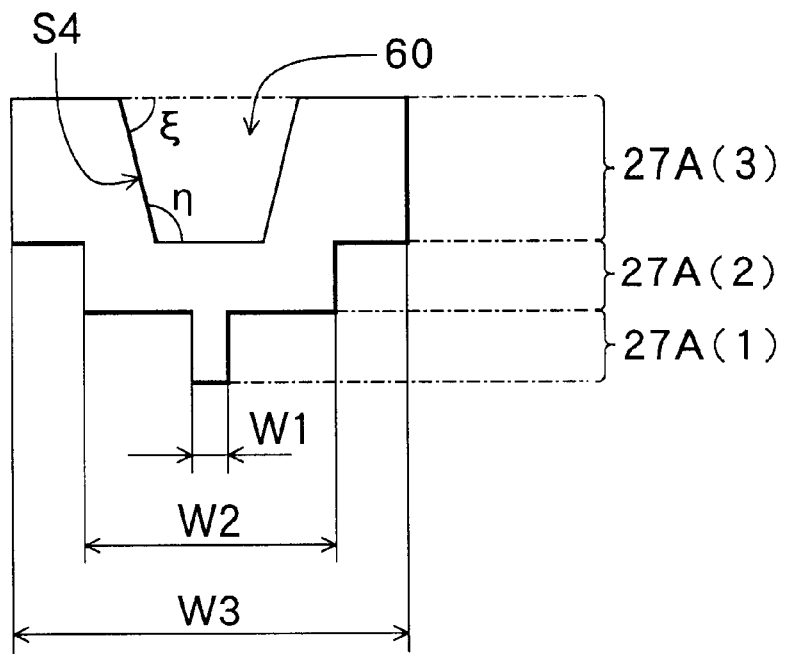
FIG. 29 is a plan view showing further another modification of the top pole tip illustrated in FIG. 9.
Figure 30:
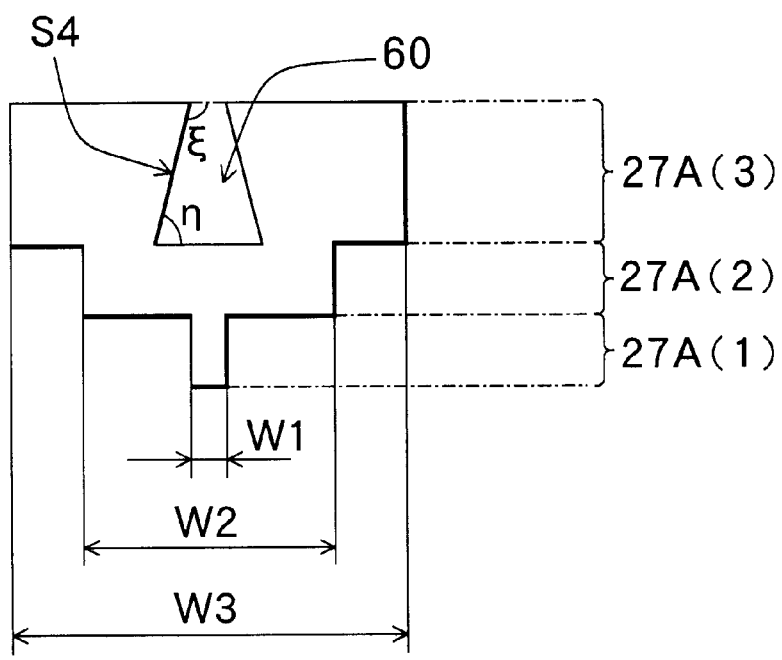
FIG. 30 is a plan view showing further another modification of the top pole tip illustrated in FIG. 9.

Each of FIGS. 29 and 30 is a plan view of the top pole tip 27A in the case of changing the width W6 of the recess 60 in the top pole tip 27A in accordance with the position in the direction perpendicular to the air bearing surface 20. FIG. 29 shows a case where an angle $\zeta$ formed by the rear face B1 of the top pole tip 27A and the inner face S4 of the recess 60 is smaller than 90 degrees and an angle $\eta$ formed by the edge face T1 and the inner face S4 of the recess 60 is larger than 90 degrees, that is, the case where the width W6 of the recess 60 decreases towards the edge face T1. FIG. 30 shows the case where the angle $\zeta$ is larger than 90 degrees and the angle $\eta$ is smaller than 90 degrees, that is, the case where the width W6 of the recess 60 increases towards the edge face T1. The structure other than the recess 60 is similar to the case of FIG. 9.

As shown in the drawings, also by changing the angles $\zeta$ and $\eta$ of the recess 60 in the top pole tip 27A, the contact area between the connection portion 27C(2) in the top pole 27C and the top pole tip 27A can be changed.

Figure 31:
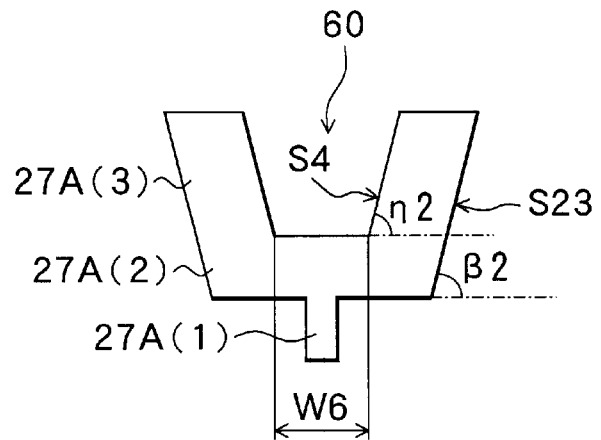
FIG. 31 is a plan view showing further another modification of the top pole tip illustrated in FIG. 9.
Figure 32:
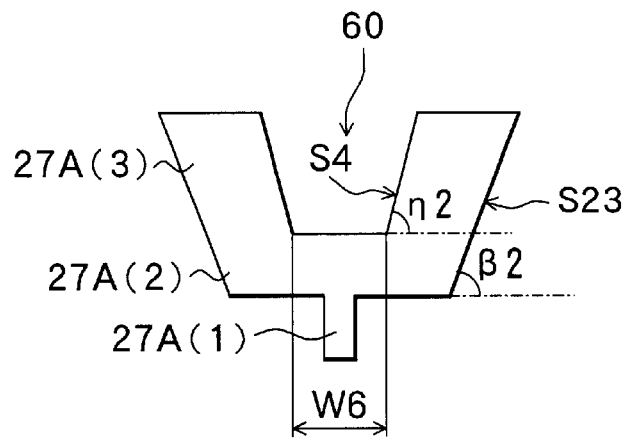
FIG. 32 is a plan view showing further another modification of the top pole tip illustrated in FIG. 9.
Figure 33:
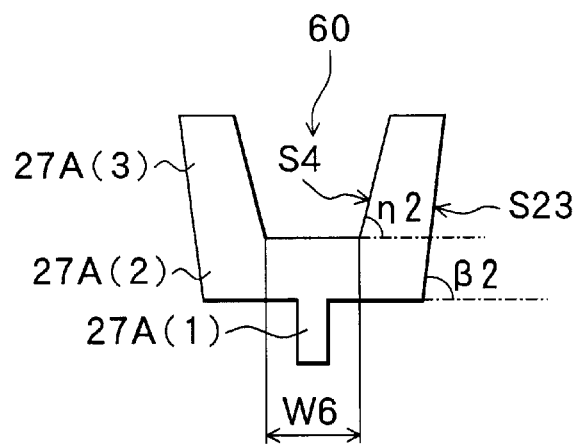
FIG. 33 is a plan view showing further another modification of the top pole tip illustrated in FIG. 9.

Referring now to FIGS. 31 to 33, other modifications of the top pole tip 27A shown in FIG. 23 will be described.

Each of FIGS. 31 to 33 shows the case where an edge width W3 in the connection portion 27A(3) in the top pole tip 27A is reduced toward the edge face T1 and width W6 of the recess 60 is also reduced toward the edge face T1. FIG. 31 shows a case where the angle of expansion (180°–$\beta$2) of the edge width W3 of the connection portion 27A(3) and the angle of expansion (180°–$\eta$2) of the width W6 of the recess 60 are equal to each other, that is, the case where the side face S23 of the top pole tip 27A and the inner face S4 of the recess 60 are parallel to each other. FIG. 32 shows a case where the angle of expansion (180°–$\beta$2) of the edge width W3 of the connection portion 27A(3) is larger than the angle of expansion (180°–$\eta$2) of the width W6 of the recess 60. FIG. 33 shows a case where the angle of expansion (180°–$\beta$2) of the edge width W3 of the connection portion 27A(3) is smaller than the angle of expansion (180°–$\eta$2) of the width W6 of the recess 60. The shape of the front end portion 27A(1), the width W2 of the step face 21A and the width W6 of the edge face T1 in FIG. 31, those in FIG. 32 and those in FIG. 33 are drawn to be the same.

In FIGS. 31 to 33, the angle $\beta$2 is, for example, preferably about 30 to 70 degrees and, more preferably, 45 degrees. The angle $\eta$2 is, for example, preferably about 30 to 70 degrees.

As shown in the drawings, also by changing the angle of expansion (180°–$\beta$2) of the edge width W3 of the connection portion 27A(3) and the angle of expansion (180°–$\eta$2) of the width W6 of the recess 60, the contact area of the connection portion 27C(2) in the top pole 27C and the top pole tip 27A can be changed.

Although the case of variously modifying the shape of each of the portions constructing the connection portion 27A(3) in the top pole tip 27A has been mainly described above, the shape of the intermediate coupling portion 27A(2) in the top pole tip 27A can be also variously changed as will be described hereinbelow. Referring now to FIGS. 34 to 37, modifications of the top pole tip 27A in the case of variously modifying the shape of the intermediate coupling portion 27A(2) in the top pole tip 27A will be described.

<Modification 1-17>

Figure 34:
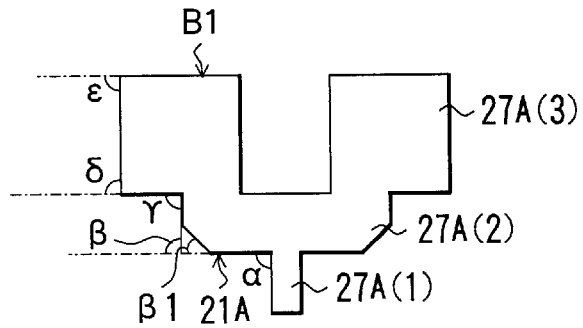
FIG. 34 is a plan view showing further another modification of the top pole tip illustrated in FIG. 9.

FIG. 34 is a plan view of the top pole tip 27A in the case where the corners on both sides of the step 21A between the front end portion 27A(1) and the intermediate coupling portion 27A(2) in the first coupling position are slightly chamfered. The structure of the portion other than the chamfered portions is similar to that of the case of FIG. 9. It is preferable to set the chamfering angle β1 to, for example, 30 to 60 degrees with respect to the step face 21A.

<Modification 1-18>

Figure 35:
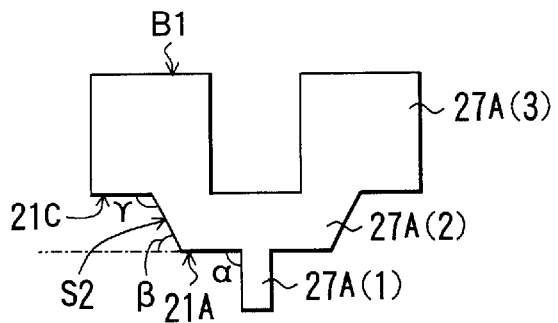
FIG. 35 is a plan view showing further another modification of the top pole tip illustrated in FIG. 9.

FIG. 35 is a plan view of the top pole tip 27A in the case where the intermediate coupling portion 27A(2) has a tapered shape. In FIG. 35, it is preferable to set a taper angle β of the intermediate coupling portion 27A(2) in the top pole tip 27A (angle formed by the step face 21A between the front end portion 27A(1) and the intermediate coupling portion 27A(2) and the side face S2 of the intermediate coupling portion 27A(2) in the first coupling position), for example, within a range from 60 to 80 degrees. An angle γ formed by the side face S2 of the intermediate coupling portion 27A(2) and the step face 21C between the intermediate coupling portion 27A(2) and the connection portion 27A(3) is larger than 90 degrees. The structure other than the tapered portion is similar to the case of FIG. 9.

<Modification 1-19>

Figure 36:
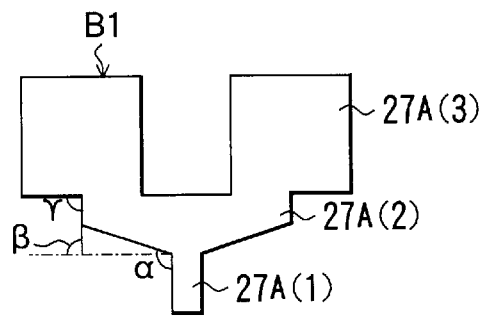
FIG. 36 is a plan view showing further another modification of the top pole tip illustrated in FIG. 9.

FIG. 36 is a plan view of the top pole tip 27A in the case where an angle α formed by the step face 21A between the front end portion 27A(1) and the intermediate coupling portion 27A(2) and the side face S1 of the front end portion 27A(1) in the first coupling position is larger than 90 degrees. It is preferable to set the angle α to, for example, about 135 degrees. The other structure is similar to the case of FIG. 9.

<Modification 1-20>

Figure 37:
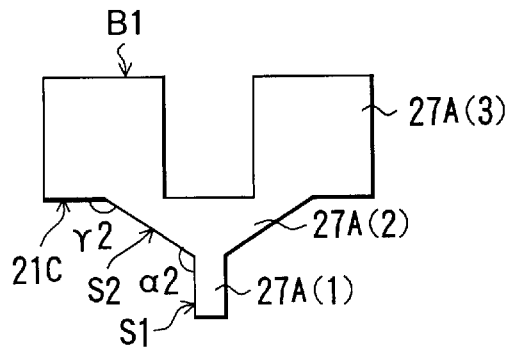
FIG. 37 is a plan view showing further another modification of the top pole tip illustrated in FIG. 9.

FIG. 37 is a plan view of the top pole tip 27A in the case where the step face 21A between the front end portion 27A(1) and the intermediate coupling portion 27A(2) in the first coupling position is eliminated. In this case, each of an angle α formed between the side face S1 of the front end portion 27A(1) and the side face S2 of the intermediate coupling portion 27A(2) and an angle γ2 formed between the side face S2 of the intermediate coupling portion 27A(2) and the step face 21C is set to be larger than 90 degrees. The other structure is similar to the case shown in FIG. 9.

<Modification 1-21>

Figure 38:
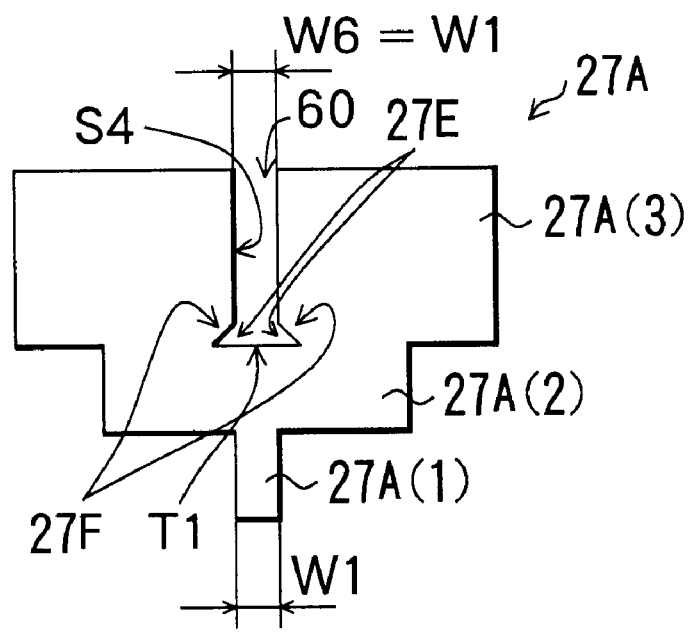
FIG. 38 is a plan view showing further another modification of the top pole tip illustrated in FIG. 9.

FIG. 38 is a plan view of the top pole tip 27A having, for example, a wedge-shaped recess 27F at each of corners 27E formed by the inner face S4 and the edge face T1. In the top pole tip 27A shown in FIG. 38, the width W6 of the recess 60 is equal to, for example, the width W1 of the front end portion 27A(1). The top pole tip 27A having the recesses 27F at the corners 27E shown in FIG. 38 is obtained by using a photomask having recesses or projections in positions corresponding to the recesses 27F. The structure of the portion except for a portion which will be described hereinbelow is similar to, for example, the case of FIG. 9.

Figure 40:
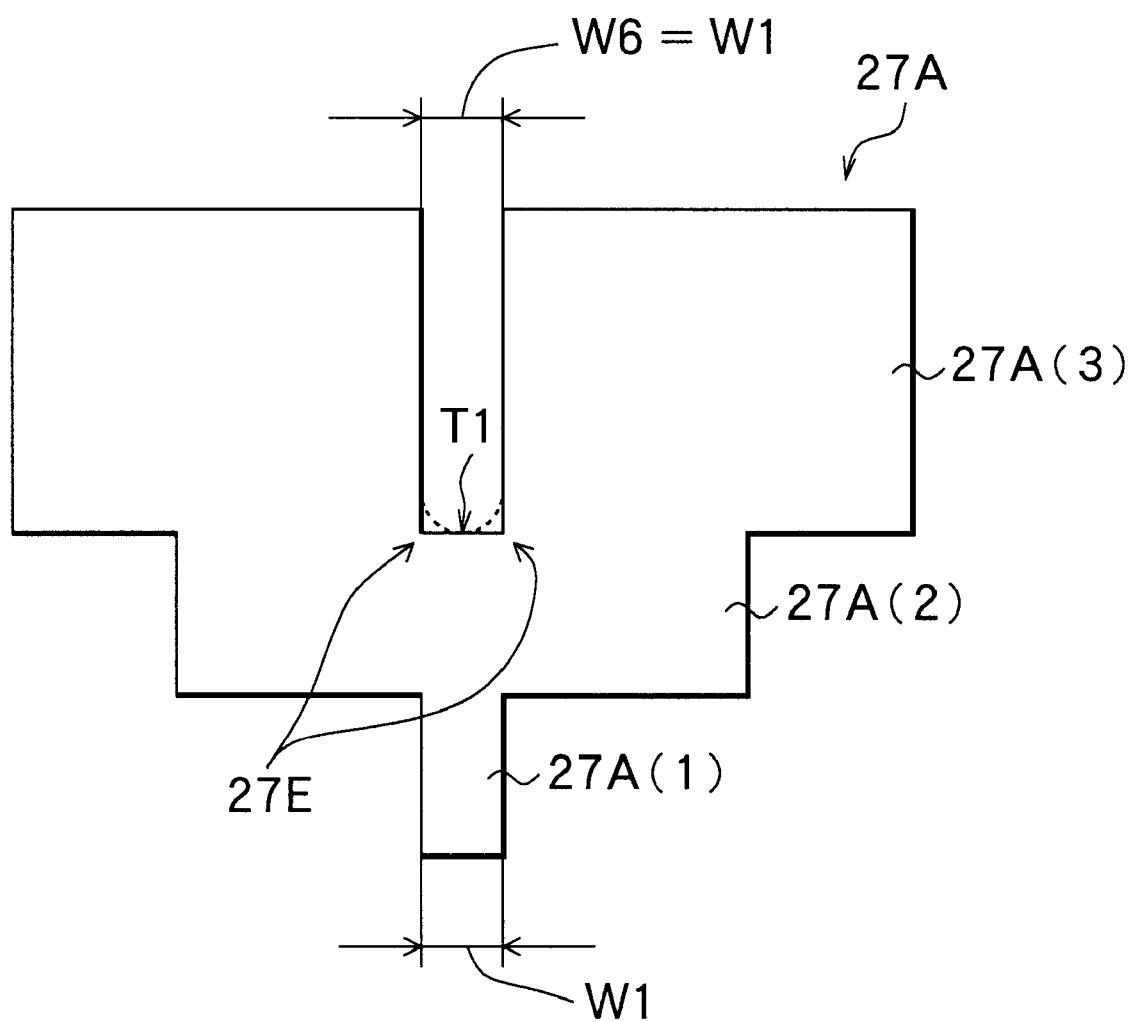
FIG. 40 is a plan view for explaining the action of the top pole tip 27A shown in FIG. 27B.

This modification has the following excellent point. Specifically, as described by referring to FIG. 9, the position of the edge face T1 of the top pole tip 27A is the position (TH0 position) as a reference of determining the throat height TH and is an important factor of determining the performance at the time of writing operation of a thin film magnetic head. In order to unconditionally determine the TH0 position, preferably, the edge face T1 has a linear shape and is in parallel with the front end face ST1 of the front end portion 27A(1). As shown in FIG. 27B, however, when the top pole tip 27A is formed so that the width W6 of the recess 60 is equal to, for instance, W1, the corners 27E are often rounded as shown by broken lines in the top pole tip 27A in FIG. 40 since the portions corresponding to the corners 27E are not exposed well in a photolithography process for forming the top pole tip 27A. When the edge face T1 displays a curved state as shown in FIG. 40, the TH0 position becomes unclear and, as a result, it is difficult to determine the throat height TH.

On the contrary, in the case where the recess 27F is formed in the corner 27E as shown in FIG. 38, the exposure amount to the corners 27E can be adjusted in the photolithography process for forming the top pole tip 27A. Since the rounding tendency around the corners 27E can be therefore suppressed, the edge face T1 displays a straight line state and is in parallel with the front end face ST1 of the front end portion 27A(1). The throat height TH can be therefore accurately determined.

<Modification 1-22>

Figure 39:
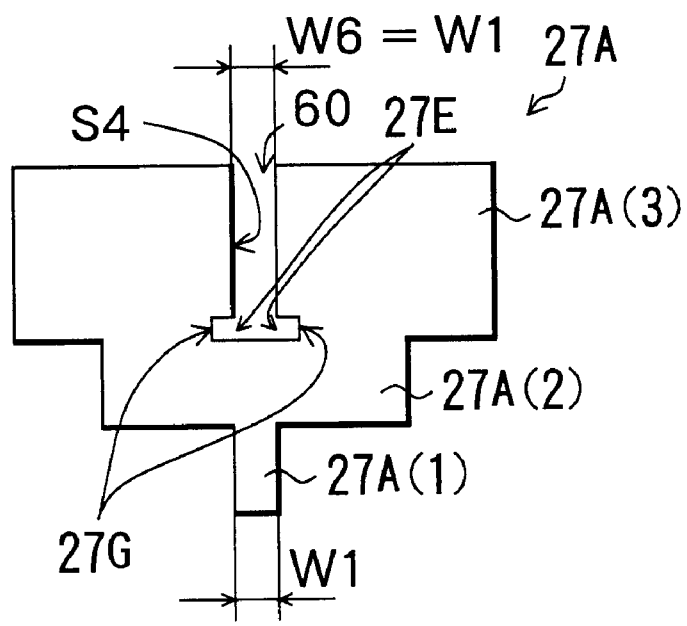
FIG. 39 is a plan view showing further another modification of the top pole tip illustrated in FIG. 9.

FIG. 39 is a plan view of the top pole tip 27A having, for example, a recess 27G of a rectangular shape at the corners 27E. Also in the case of using the top pole tip 27A shown in FIG. 39, effects similar to those of the case described by referring to FIG. 38 can be obtained. Since the method of forming the top pole tip 27A shown in FIG. 39 and the structure except for the recess are similar to those of the case shown in FIG. 38, the description is omitted here.

<Modification 1-23>

Figure 41:
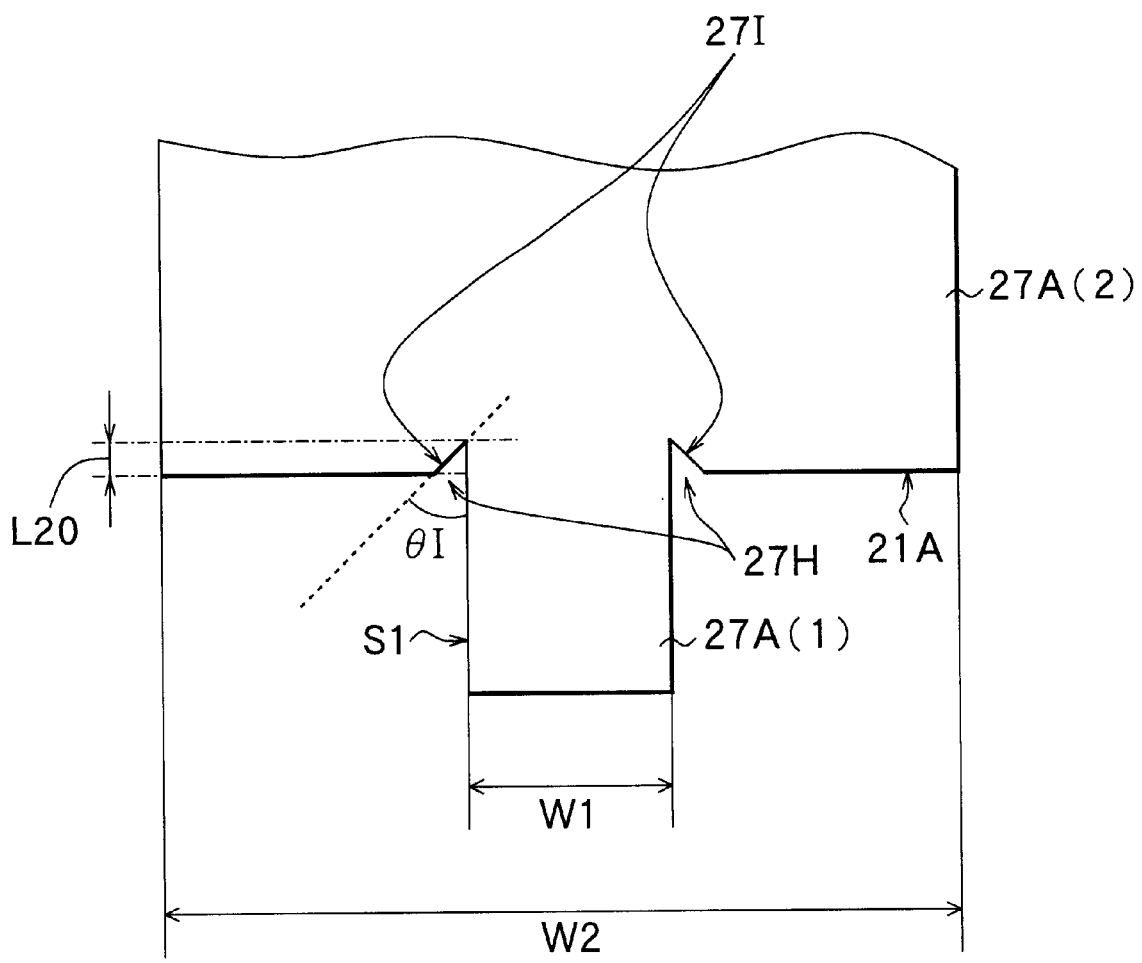
FIG. 41 is a plan view showing further another modification of the top pole tip illustrated in FIG. 9.

Although it has been described that the side face S1 of the front end portion 27A(1) in the top pole tip 27A and the step face 21A of the intermediate coupling portion 27A(2) form an almost right angle in the foregoing embodiment and its modifications, the invention is not limited to the arrangement. For example, as shown in FIG. 41, the intermediate coupling portion 27A(2) may have, for example, a wedge-shaped recess 27I at each of corners 27H formed by the side face S1 of the front end portion 27A(1) and the step face 21A of the intermediate coupling portion 27A(2). The structure of FIG. 41 except for the portions of the recesses 27I is similar to, for example, that of the top pole tip 27A shown in FIG. 9. It is preferable to set a tip angle θi of each of the recesses 27I, for example, within plus or minus 15 degrees with respect to 45 degrees. Preferably, a length L20 from the tip of the recess 27I to the step face 21A is 0.3 to 0.8 μm, more preferably, about 0.6 μm. The top pole tip 27A shown in FIG. 41 can be obtained by using a photomask preliminarily having a recess or projection of the shape substantially the same as that of the recess 27I, in the portion corresponding to the recess 27I.

In the case where the recess 27I is provided in the corners 27H formed by the side face S1 of the front end portion 27A(1) and the step face 21A of the intermediate coupling portion 27(2) as shown in FIG. 41, for the reason similar to that in the case described with respect to the recess 27F shown in FIG. 38, the rounding tendency around the corners 27H (tendency of displaying the shape shown by the broken line in FIG. 11) can be suppressed. Consequently, the tendency of expanding the width W1 of the front end portion 27A(1) is suppressed, and the top pole tip 27A having a uniform width W1 from the position of the step face 21A to the position of the front end face ST1 of the front end portion 27A(1) can be obtained. Also in the case of further narrowing the width W1 of the front end portion 27A(1) in the top pole tip 27A, therefore, the width can be maintained to be uniform in the region where the front end portion 27A(1) extends, so that stabilization of the recording track width at the time of writing can be assured.

<Modification 1-24>

The shape of the recess in the corners 27H formed by the side face S1 of the front end portion 27A(1) and the step face 21A of the intermediate coupling portion 27(2) is not limited to that shown in FIG. 41 but may be, for example, a rectangle (not shown). Also in the case of using the top pole tip 27A having such a shape, effects similar to those of the case shown in FIG. 41 can be obtained.

Although the modifications in which the portions of the top pole tip 27A are variously modified are shown in FIGS. 18 to 39 and FIG. 41, the top pole tip 27A in the embodiment is not limited to the modifications. For example, the top pole tip 27A may be formed by combining two or more modified portions.

<Modification 1-25>

Preferably, the connection portion 27A(3) of the top pole tip 27A has a shape corresponding to that of the portion of the top pole 27C which overlaps with the connection portion 27A(3). Specifically, for example, when the width between the sides of the connection portions 27A(3) of the top pole tip 27A expands to the rear side as shown in FIG. 31, preferably, the width between the sides of the yoke 27C(1) of the top pole 27C expands to the rear side in correspondence with the shape of the sides of the connection portion 27A(3).

Figure 42A:
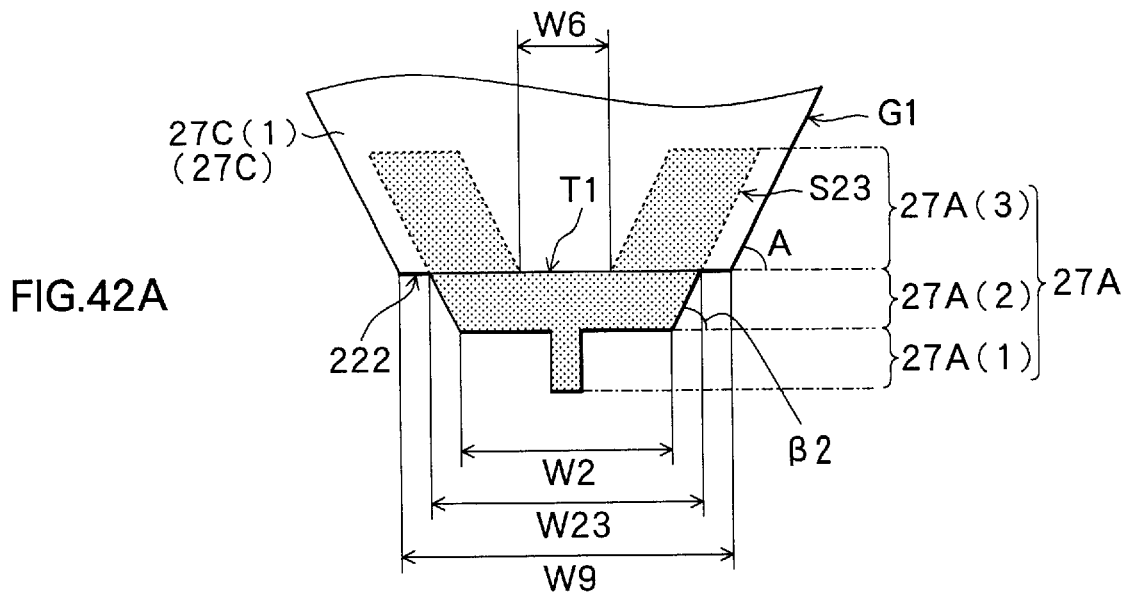
FIGS. 42A to 42C are plan views each showing the main part of the top pole illustrated in FIG. 17 and the shape of a modification of the top pole tip illustrated in FIG. 31.
Figure 42B:
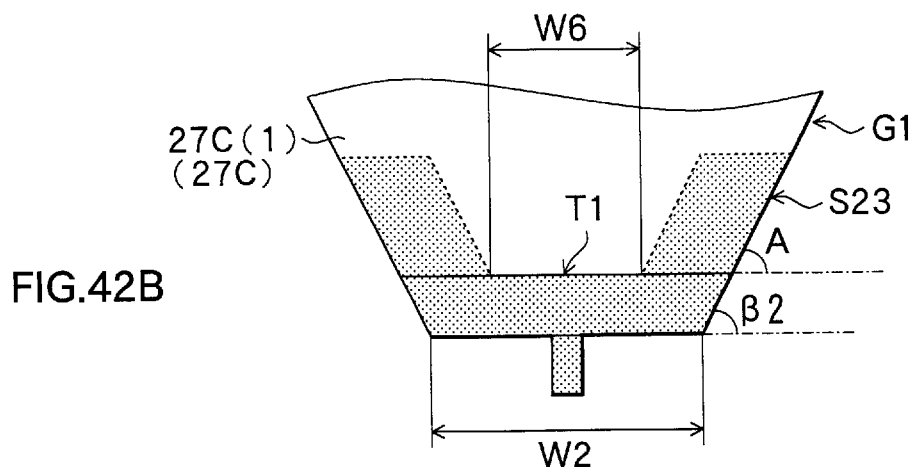
Figure 42C:
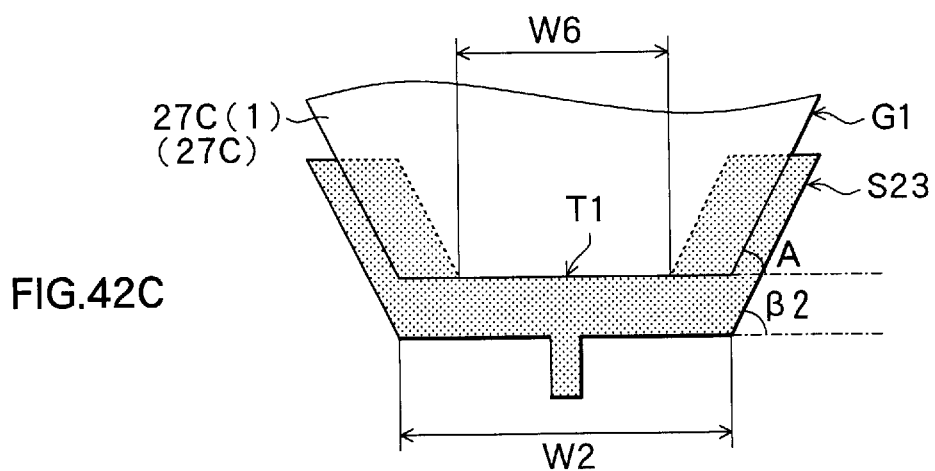

FIGS. 42A to 42C show the positional relation between the expansion angle of the width of the sides of the connection portion 27A(3) and that of the width of the sides of the yoke 27C(1) of the top pole 27C when the angles are equal to each other. FIG. 42A shows the case where the width W9 of the edge face 222 on the front side of the top pole 27C is wider than the width W23 at the second coupling position of the top pole tip 27A. FIG. 42B shows the case where the width W9 is equal to the width W23. FIG. 42C shows the case where the width W9 is narrower than the width W23. Each of the examples shows the case where the position of the edge face 222 on the front side of the top pole 27C and the position of the edge face T1 match with each other.

As understood from FIGS. 42B and 42C, by expanding the shape of the intermediate coupling portion 27A(2) in the lateral direction (to the right and left sides in the drawing) while maintaining the shape of each of the front end portion 27A(1) and the connection portion 27A(3), the contact area between the top pole 27C and the top pole tip 27A can be adjusted.

In FIG. 42, although it is preferable that the expansion angle (180°−β2) of the sides of the connection portion 27A(3) and that (180°−a) of the sides of the yoke 27C(1) of the top pole 27C are equal to each other, the angles do not always have to match with each other. It is also possible to satisfy the relation of a >β2 or β2>a.

<Modification 1-26>

Figure 43:
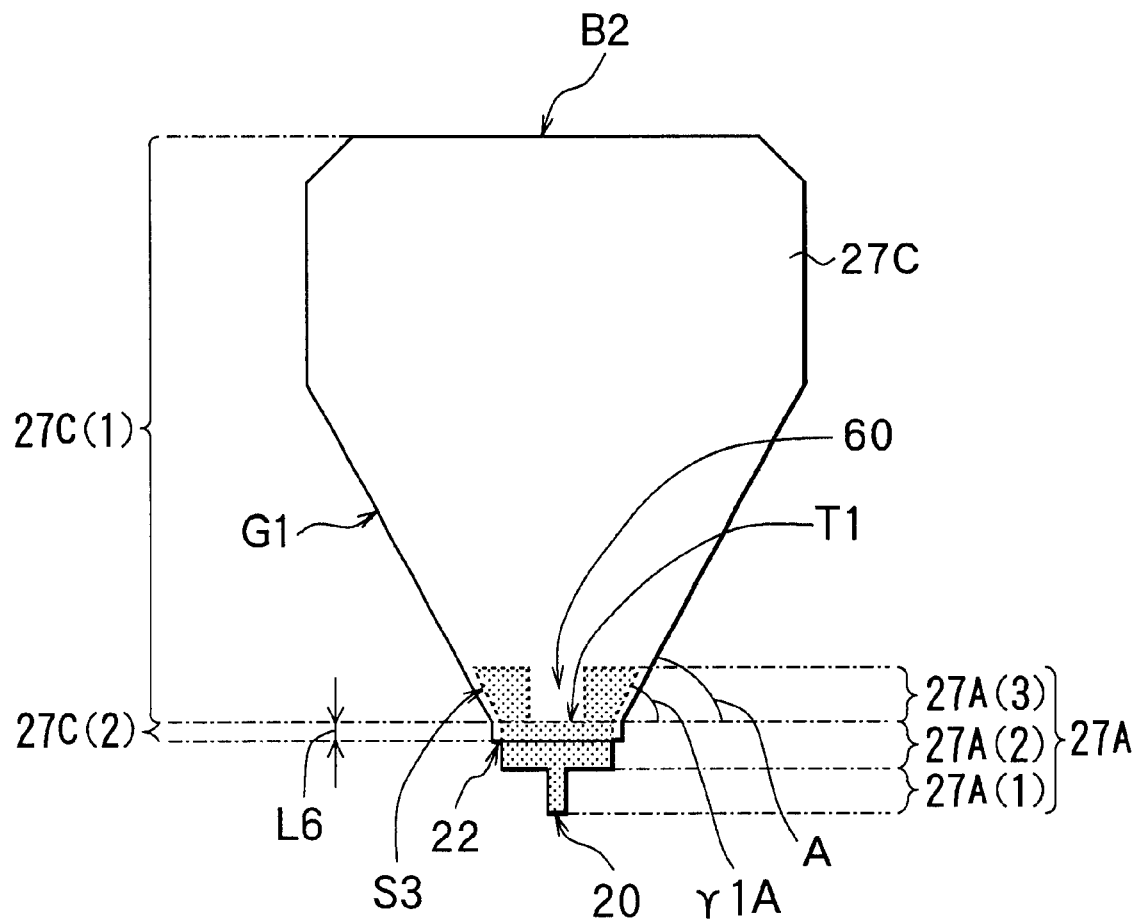
FIG. 43 is a plan view showing the shape of the top pole illustrated in FIG. 8 and the top pole tip illustrated in FIG. 22.

FIG. 43 shows an example of combining the top pole 27C and the top pole tip 27A shown in FIG. 22 when the length L6 of the connection portion 27C(2) of the top pole 27C is short. The drawing shows a case where an edge G1 of the yoke 27C(1) of the top pole 27C is in parallel with the side face S3 of the connection portion 27C(3) in the top pole tip 27A but they do not always have to be in parallel with each other.

In the example shown in FIG. 43, the yoke 27C(1) of the top pole 27C is in contact with the connection portion 27A(3) in the top pole tip 27A so as to overlap with each other and the connection portion 27C(2) in the top pole 27C is in contact with a part of the intermediate coupling portion 27A(2) in the top pole tip 27A so as to overlap with each other. The position of the edge face 22 on the front side of the connection portion 27C(2) in the top pole 27C is deviated to the forward of the position of the edge face T1 which determines the TH0 position (to the air bearing surface 20 side). The position of the edge face T1 matches with the position of the coupling portion of the yoke 27C(1) of the top pole 27C and the connection portion 27C(2). In the example shown in the drawing, a large contact area between the top pole 27C and the top pole tip 27A can be assured.

In the case of constructing a thin film magnetic head by selectively using the various top poles 27C and top pole tips 27A, it is preferable to select them in consideration of the following points.

First, it is important to set the throat height to a proper length. For example, in FIG. 8, it is generally preferable that the throat height TH is short because the shorter the throat height TH becomes, the more the volume of the magnetic flux reaching the front end face ST1 of the front end portion 27A(1) increases, so that the overwrite characteristic at the time of recording is improved. On the other hand, when the throat height TH is shortened, there is the possibility that a side write phenomenon at the time of recording is induced. When the throat height TH is shortened too much, the step face 21A (width W3) of the connection portion 27A(3) in the top pole tip 27A and the edge face 22 (width W8) on the front side of the connection portion 27C(2) in the top pole 27C are positioned too close to the air bearing surface 20. Consequently, it is feared that an excessive magnetic flux which cannot be converged to the width W1 of the front end portion 27A(1) is supplied to the front end portion 27A(1) or a magnetic flux is directly emitted from the step face 21A of the connection portion 27A(3) and the edge face 22 of the connection portion 27C(2) to the air bearing surface 20 side. In the case of setting the throat height TH, therefore, it is preferable to determine the shape and dimensions of each of the pole portions so as not to induce the side write phenomenon.

Second, for example, in FIG. 8, it is preferable to set a proper magnetic volume of each of the intermediate coupling portion 27A(2) and the connection portion 27A(3) positioning on the rear side of the front end portion 27A(1) of the top pole tip 27A. In this case, "a proper magnetic volume of the intermediate coupling portion 27A(2) and the connection portion 27A(3)" denotes that the intermediate coupling portion 27A(2) and the connection portion 27A(3) have the capacity of a magnetic flux such that the intermediate coupling portion 27A(2) and the connection portion 27A(3) can propagate a proper volume of the magnetic flux to the front end portion 27A(1). For example, when the magnetic volume of the intermediate coupling portion 27A(2) and the connection portion 27A(3) is too small, the volume of the magnetic flux passed to the front end portion 27A(1) becomes short and the overwrite characteristic at the time of recording deteriorates. The intermediate coupling portion 27A(2) and the connection portion 27A(3) have to therefore have a large area so as to assure a sufficient magnetic volume. On the other hand, when the magnetic volume of the intermediate coupling portion 27A(2) and the connection portion 27A(3) is larger than necessary, an excessive magnetic flux is passed into the front end portion 27A(1), so that there is the possibility that the side write phenomenon at the time of recording is induced. It is therefore preferable to determine the shapes and dimensions of the intermediate coupling portion 27A(2) and the connection portion 27A(3) so that the sufficient and proper volume of the magnetic flux can be supplied to the front end portion 27A(1) of the top pole tip 27A while converging the magnetic flux flowing from the top pole 27C step by step.

Second Embodiment

A second embodiment of the invention will now be described.

The case of integrally forming the front end portion 27A(1), the intermediate coupling portion 27A(2) and the connection portion 27A(3) of the top pole tip 27A by the same process, for example, as shown in FIG. 2 has been described in the first embodiment. In contrast to the above, in the second embodiment, a case of separately forming the portions constructing the top pole tip 27A will be described. According to the forming method, the portions of the top pole tip 27A are separately formed by a plurality of times of different processes so that the shape in plane of the portions formed separately finally becomes the top pole tip 27A (as shown in FIG. 9) which is integrally formed as explained in the first embodiment.

Referring to FIGS. 44 to 50, a method of manufacturing the thin film magnetic head according to the second embodiment of the invention will be described.

Figure 47:
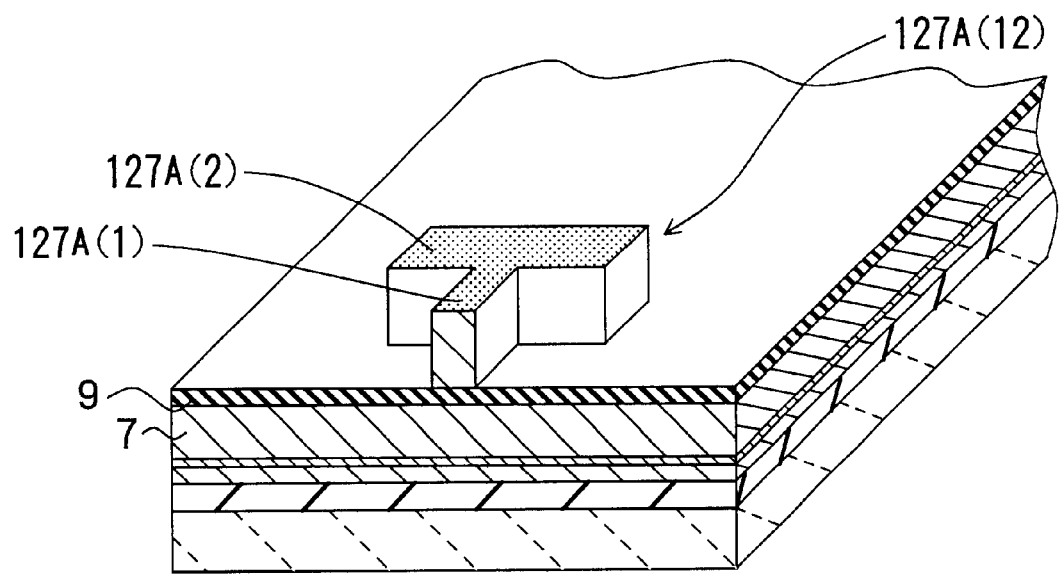
FIG. 47 is a perspective view corresponding to the cross sections of FIGS. 44A and 44B.
Figure 48:
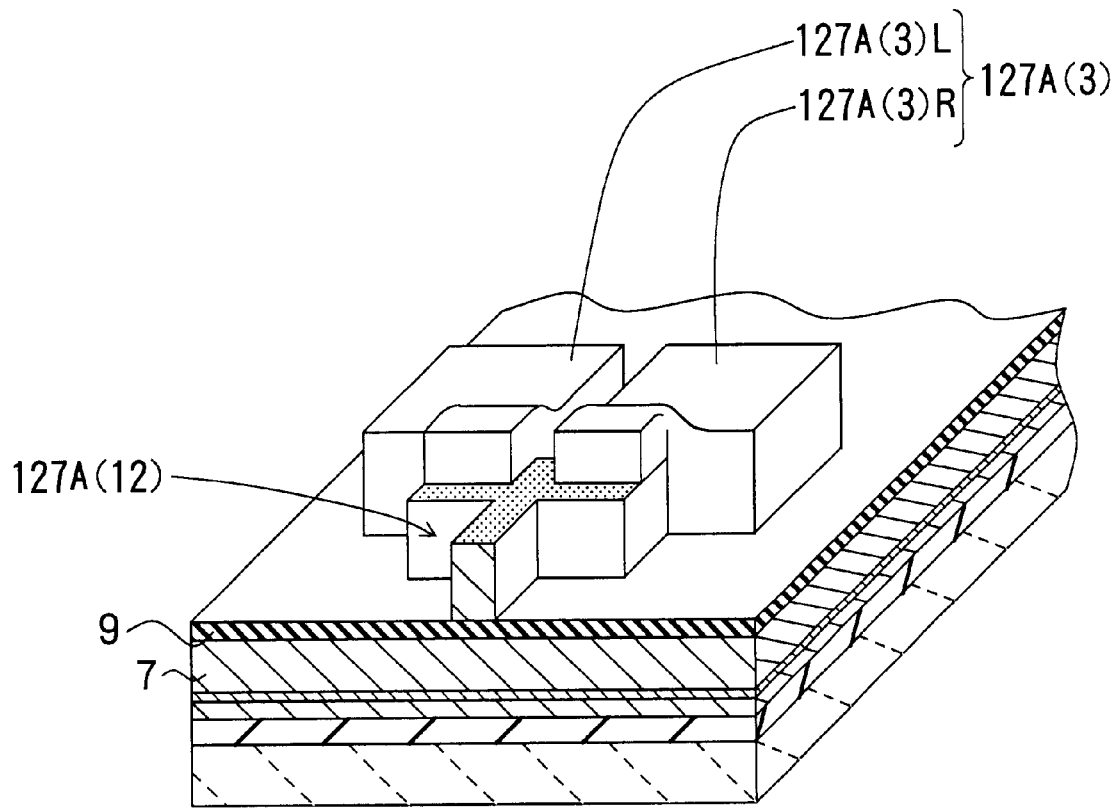
FIG. 48 is a perspective view corresponding to the cross sections of FIGS. 44A and 44B.
Figure 49:
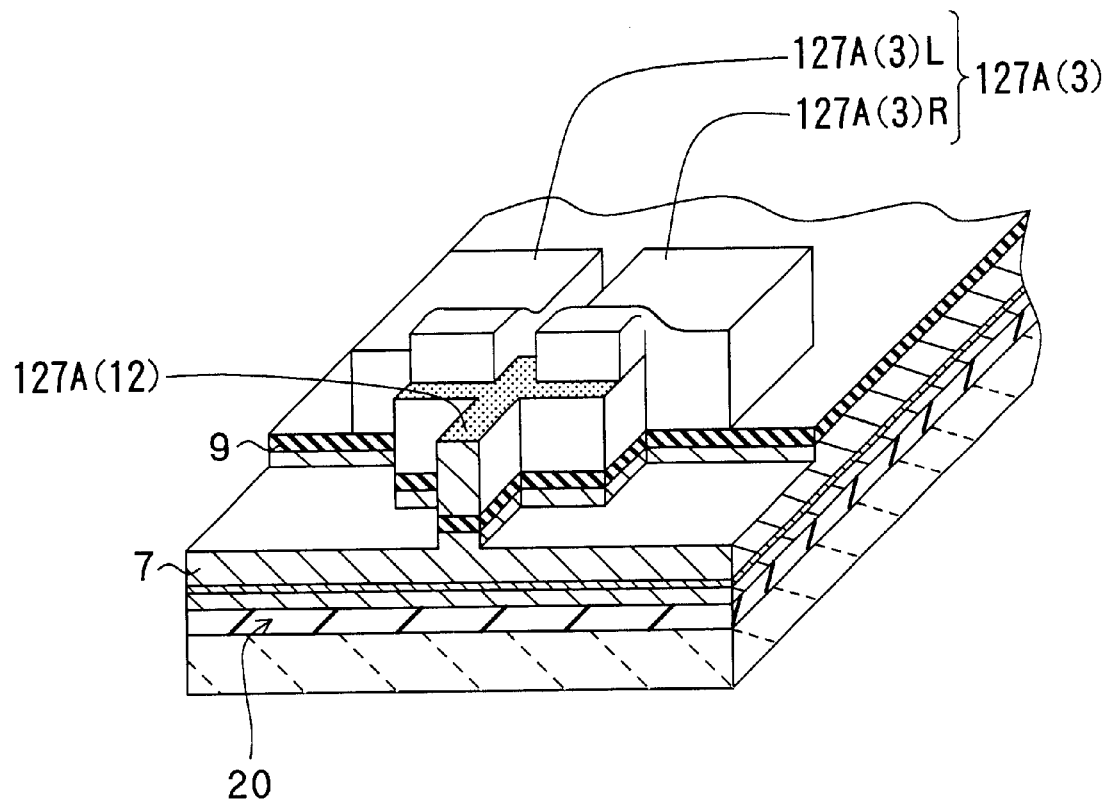
FIG. 49 is a perspective view corresponding to the cross sections of FIGS. 44A and 44B.
Figure 50:
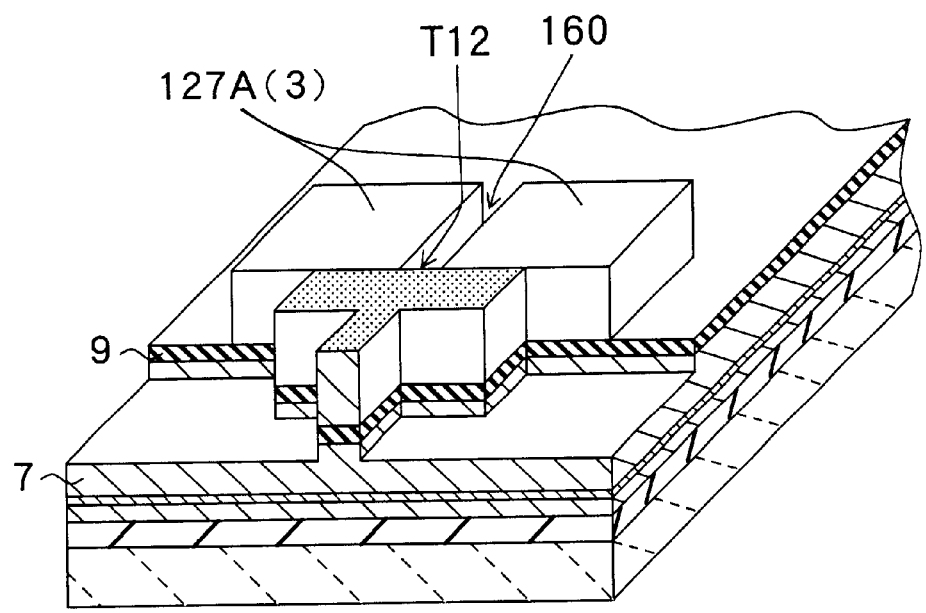
FIG. 50 is a perspective view corresponding to the cross sections of FIGS. 45A and 45B.

FIGS. 44A and 44B and FIGS. 45A and 45B show main processes in a manufacturing method of the embodiment. FIGS. 44A and 45A are cross sections perpendicular to the air bearing surface 20. FIGS. 44B and 45B are cross sections parallel to the air bearing surface 20 of the pole portion. Each of FIGS. 46A to 46C shows the structure in plane in a process of forming the top pole tip 127A. FIG. 46B corresponds to the state of FIGS. 44A and 44B. FIG. 46C corresponds to the state of FIGS. 45A and 45B. In FIGS. 46A to 46C, the portions other than the top pole tip 127A are omitted. FIGS. 47 to 50 are perspective views each in a process of forming the top pole tip 127A. FIG. 47 corresponds to the state of FIG. 46A. FIG. 48 corresponds to the state of FIG. 46B. FIG. 49 corresponds to the state of FIGS. 44A and 44B and FIG. 46B. FIG. 50 corresponds to the state of FIGS. 45A and 45B and FIG. 46C. In FIG. 50, the insulating films 28 and 30 are not shown. In those drawings, the same components as those in the first embodiment are designated by the same reference numerals. The shape in plan view of the top pole tip 127A (FIG. 46C) formed in the embodiment is similar to that of the top pole tip 27A, for example, shown in FIG. 27B.

In the method of manufacturing the thin film magnetic head according to the embodiment, since the processes until the bottom pole 7 shown in FIGS. 44A and 44B is formed are the same as those in FIGS. 1A and 1B in the first embodiment, the description is omitted here.

In the embodiment, when the formation of the bottom pole 7 is finished as shown in FIGS. 1A and 1B, as shown in FIGS. 44A and 44B, the write gap layer 9 is formed. Subsequently, in a position rearward of the region in which the thin film coil 29 will be formed in a following process (right side in FIG. 44A), the write gap layer 9 is partially etched to form the opening 9B to create a magnetic path.

Similarly, as shown in FIGS. 44A and 44B and FIG. 47, in a position forward of the region in which the thin film coil 29 will be formed in a following process (left side in FIG. 44A), a front end and intermediate portion 127A(12) serving as a part of a top pole tip 127A is selectively formed on the write gap layer 9 by, for example, electrolytic plating. The front end and intermediate portion 127A(12) is comprised of a front end portion 127A(1) and an intermediate coupling portion 127A(2). The entire front end and intermediate portion 127A(12) has a T shape in plane as shown in FIG. 46A. The front end portion 127A(1) and the intermediate coupling portion 127A(2) correspond to the front end portion 27A(1) and the intermediate coupling portion 27A(2) in the top pole tip 27A shown in FIG. 27B of the first embodiment, respectively.

In the case of forming the front end and intermediate portion 127A(12), simultaneously, the magnetic path forming pattern 27B is formed in the opening 9B. Since the materials and forming methods of the front end and intermediate portion 127A(12) and the magnetic path forming pattern 27B are similar to those in the first embodiment, the description is omitted here.

As shown in FIGS. 44A and 44B, FIG. 46B and FIG. 48, a connection portion 127A(3) whose part overlaps with a rear region (side opposite to the air bearing surface side) of the intermediate coupling portion 127A(2) in the front end and intermediate portion 127A(12) and whose other part extends so as to expand in the width direction in the region rearward of the intermediate coupling portion 127A(2) is formed. The connection portion 127A(3) has a shape in plane as shown in, for example, FIG. 46B and includes a right connection portion 127A(3)R and a left connection portion 127A(3)L which are separated from each other in the width direction. The right and left connection portions 127A(3)R and 127A(3)L are formed so that a part of each of them overlaps with the rear region of the intermediate coupling portion 127A(2) in the front end and intermediate portion 127A(12). The connection portion 127A(3) is formed so as to be thicker than the front end and intermediate portion 127A(12). The material and the forming method of the connection portion 127A(3) are similar to those of the front end and intermediate portion 127A(12).

In the embodiment, an angle η3 formed by an edge face B12 on the rear side of the front end and intermediate portion 127A(12) and the inner face S14 of the connection portion 127A(3) is set to 90 degrees. The width of separation between the right connection portion 127A(3) R and the left connection portion 127A(3)L (that is, spacing W6 of the inner face S14 of the connection portion 127A(3)) is equal to the width W1 of the front end portion 27A(1).

Subsequently, the write gap layer 9 and the bottom pole 7 are etched about 0.5 μm by, for example, ion milling by using the front end and intermediate portion 127A(12) and a photoresist (not shown) as a mask to thereby form a trim structure for suppressing the expansion of the effective track width at the time of writing as shown in FIGS. 44A and 44B and FIG. 49.

As shown in FIGS. 44A and 44B, the insulating film 28 such as an alumina film is formed in thickness of about 0.5 to 1.5 μm on the whole surface. Although not shown in FIGS. 44A and 44B, the insulating film 28 is formed also on the surface of the connection portion 127A(3).

As shown in FIGS. 45A and 45B, for example, by electrolytic plating, the thin film coil 29 for an inductive recording head made of copper (Cu) or the like is formed in thickness of 2 to 3 μm. After that, the insulating film 30 such as an alumina film is formed in thickness of about 3 to 4 μm on the whole.

As shown in FIGS. 45A and 45B, FIG. 46C and FIG. 50, the whole is polished by, for example, CMP (Chemical Mechanical Polishing) so as to be planarized. The whole is polished by the CMP until the surface of each of the front end and intermediate portion 127A(12) and the magnetic path forming pattern 27B is exposed. By the process, the overlapped portion on the front end and intermediate portion 127A(12) in the connection portion 127A(3) and the insulating film 28 on the front end and intermediate portion 127A(12) is removed by the polishing, thereby forming the top pole tip 127A in which the front end and intermediate portion 127A(12) and the connection portion 127A(3) are integrated. The level of the top face of the insulating film 30 becomes the same level of the top pole tip 127A. Since the subsequent manufacturing process is similar to that in the first embodiment, the description is omitted here.

The top pole tip 127A formed as mentioned above has a recess 160 on the rear side of the front end and intermediate portion 127A(12) (side opposite to the air bearing surface 20). The corners on the inside of the recess 160, that is, corners formed by a rear edge face T12 of the front end and intermediate portion 127A(12) and the inner face S14 of the connection portion 127A(3) are not rounded but are sharp right-angled corners. The edge face T12 defines the TH0 position as a reference of the throat height.

As described above, in the method of manufacturing the thin film magnetic head according to the embodiment, first, the front end and intermediate portion 127A(12) is integrally formed. After that, the connection portion 127A(3) is formed by a process different from that of the front end and intermediate portion 127A(12). Consequently, even in the case of considerably narrowing the width W6 of the recess 160, the corners on the inner side are not rounded so that the throat height TH can be accurately determined by using the edge face T12 as the TH0 position for the following reason.

As described above by referring to FIG. 40 in the first embodiment, in the case where the width W6 of the recess 60 is narrowed (for example, W6=W1) and the top pole tip 27A is integrally formed at once, the corners 27E are often rounded since the exposure is not partially sufficient in the photolithography process. Consequently, the edge face T1 shows a curved state, so that the TH0 position is not unconditionally determined.

On the contrary, in the embodiment, the front end and intermediate portion 127A(12) in the top pole tip 27A and the connection portion 127A(3) are formed by separate processes. Consequently, without requiring the adjustment of the exposure amount in the photolithography process described by referring to FIG. 38 or 39 in the first embodiment, it can be certainly avoided that the edge face T12 is rounded. Thus, the TH0 position can be accurately defined and, as a result, the throat height TH can be determined with high precision.

<Modification 2-1>

Figures 51A, 51B, 51C:
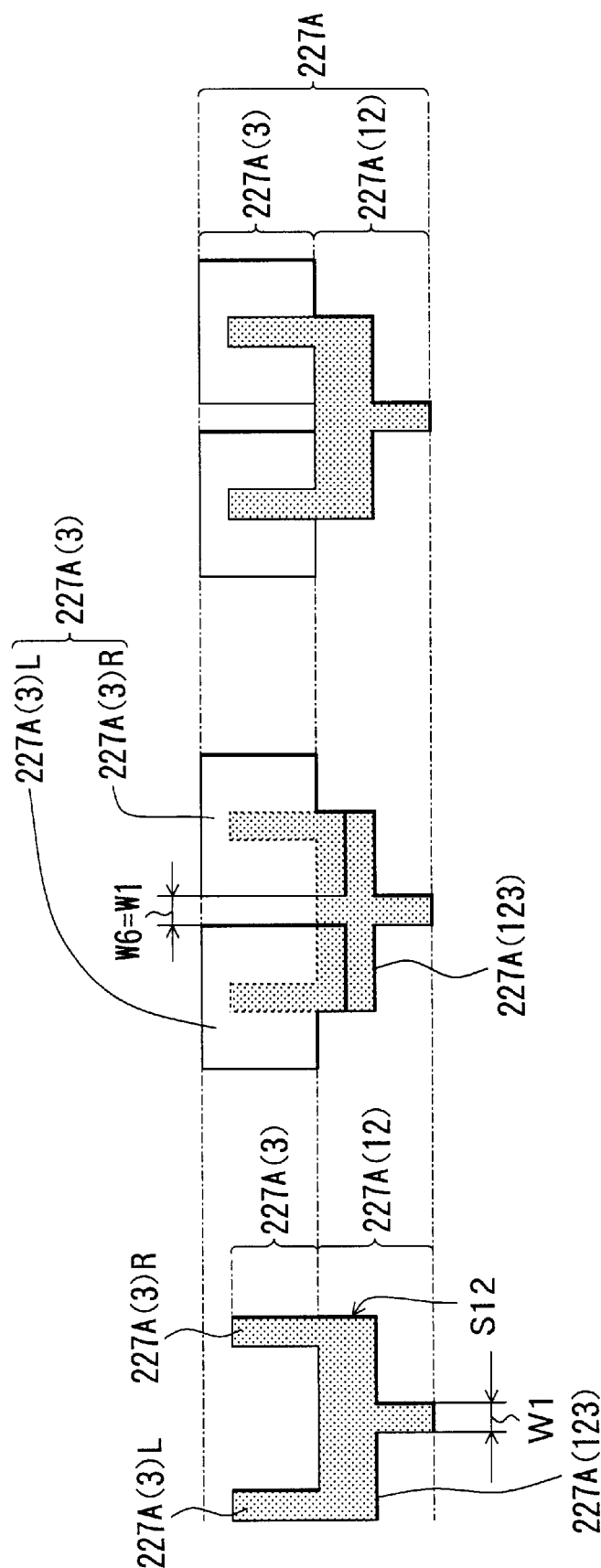
FIGS. 51A, 51B and 51C are plan views showing a process of forming a modification of the top pole tip in the thin film magnetic head according to the second embodiment of the invention.

The top pole tip can be formed not only by the forming methods shown in FIGS. 46 to 50 but also, for example, a method shown in FIGS. 51A to 51C. FIGS. 51A to 51C show main processes in a modification of the method of forming the thin film magnetic head according to the second embodiment. Each of the drawings shows, specifically, the shape in plane of a portion related to the top pole tip.

In the modification, in place of the front end and intermediate portion 127A(12) having the shape in plane shown in FIG. 46A, a front end, intermediate and connection portion 227A(123) having the shape in plane as shown in FIG. 51A is formed. The front end, intermediate and connection portion 227A(123) has a front end and intermediate portion 227A(12) of the same shape as that of the front end and intermediate portion 127A(12) and two partial connection portions 227A(3)L and 227A(3)R which extend to the rear side of the front end and intermediate portion 227A(12). Preferably, the partial connection portions 227A(3)L and 227A(3)R have the same size and shape.

As shown in FIG. 51B, a connection portion 227A(3) having almost the same shape in plane as that of the connection portion 127A(3) shown in FIG. 46B of the second embodiment is formed. The connection portion 227A(3) includes the right and left connection portions 227A(3)R and 227A(3)L which are separated from each other in the width direction. The right and left connection portions 227A(3)R and 227A(3)L are formed so that a part of each of them overlaps with the rear region of the front end and intermediate portion 127A(12) and the partial connection portions 227A(3)L and 227A(3)R in the front end, intermediate and connection portion 227A(123). Since the subsequent process is similar to that in the case of FIG. 46, the description is omitted here. By performing such a process, the top pole tip 227A shown in FIG. 51C can be obtained finally. The shape in plane of the top pole tip 227A is similar to that of the top pole tip 27A shown in FIG. 27B and that of the top pole tip 127A shown in FIG. 46C.

In the modification, as shown in FIG. 51C, the contact area at the boundary between the front end, intermediate and connection portion 227A(123) and the connection portion 227A(3) in the top pole tip 227A formed is larger than the contact area at the boundary between the front end and intermediate portion 127A(12) and the connection portion 127A(3) in the top pole tip 127A shown in FIG. 46C. A magnetic flux propagation loss in the boundary at which two portions (the front end, intermediate and connection portion 227A(123) and the connection portion 227A(3)) which are formed separately are in contact with each other in the top pole tip 227A shown in FIG. 51C is smaller as compared with that in the top pole tip 127A formed by the forming method according to the second embodiment.

In the second embodiment and its modifications, the case where the top pole tip which is made from separate parts serves as the top pole tip 127A (or 227A) having the shape in plane similar to that of the top pole tip 27A shown in FIG. 27B has been described. Except for the above, the method of forming the top pole tip from separate portions can be applied to top pole tips of various shapes in plane shown in, for example, FIGS. 18 to 26, FIGS. 29 to 39 and FIG. 41.

In the second embodiment, the front end and intermediate portion 127A(12) comprised of the front end portion 127A(1) and the intermediate coupling portion 127A(2) is formed by the same process in a lump and, after that, only the connection portion 127A(3) is formed by another process. Alternatively, the front end portion 127A(1) and the intermediate coupling portion 127A(2) may be formed by a separate process.

It is also possible to separately form the portions of the top pole tip as described above and, for example, as described by referring to FIGS. 38 or 39 in the first embodiment, to form the top pole tip so that the corner 27E formed by the edge face T1 and the inner face S4 has a recess in the width direction. Consequently, the rounding tendency around the corners 27E in the photolithography process can be more certainly avoided and the position of the edge face T1 which defines the TH0 position is unconditionally determined. Thus, the throat height TH can be accurately determined by using the position of the edge face T1 as a reference (TH0 position).

Third Embodiment

Referring to FIGS. 52A and 52B to FIG. 56, a method of manufacturing a composite thin film magnetic head as a method of manufacturing a thin film magnetic head according to the third embodiment of the invention will be described. Since a thin film magnetic head according to the embodiment will be embodied by the method of manufacturing the thin film magnetic head according to the embodiment, it will be also described hereinbelow. FIGS. 52A and 52B to FIGS. 54A and 54B show processes of manufacturing a thin film magnetic head according to the embodiment. FIGS. 52A, 53A and 54A are cross sections each of which is perpendicular to the air bearing surface and FIGS. 52B, 53B and 54B are cross sections each of which is parallel to the air bearing surface of the pole part. In the drawings, the same components as those in each of the foregoing embodiments are designated by the same reference numerals.

In the method of manufacturing the thin film magnetic head according to the embodiment, since the processes until the insulating film 28 in FIGS. 52A and 52B are similar to those in the first embodiment, the description is omitted here.

In the embodiment, as shown in FIGS. 52A and 52B, after forming the insulating film 28, the first thin film coil 29 for an inductive recording head is formed in thickness of, for example, 1.5 to 2.5 $\mu$m by electrolytic plating or the like in a recessed region formed between the top pole tip 27A and the magnetic path forming pattern 27B. Simultaneously, in the region rearward of the magnetic path forming pattern 27B (right side region in FIG. 52A), a coil connection portion 43C is formed. The coil connection portion 43C is used to connect the first thin film coil 29 to a second thin film coil which will be described hereinlater.

Then, after forming the insulating layer 30 having a thickness of 3.0 to 4.0 $\mu$m made of an insulating material such as alumina by sputtering on the whole surface, the surface is planarized by, for example, CMP to expose the surface of each of the top pole tip 27A and the magnetic path forming pattern 27B.

Figure 55:
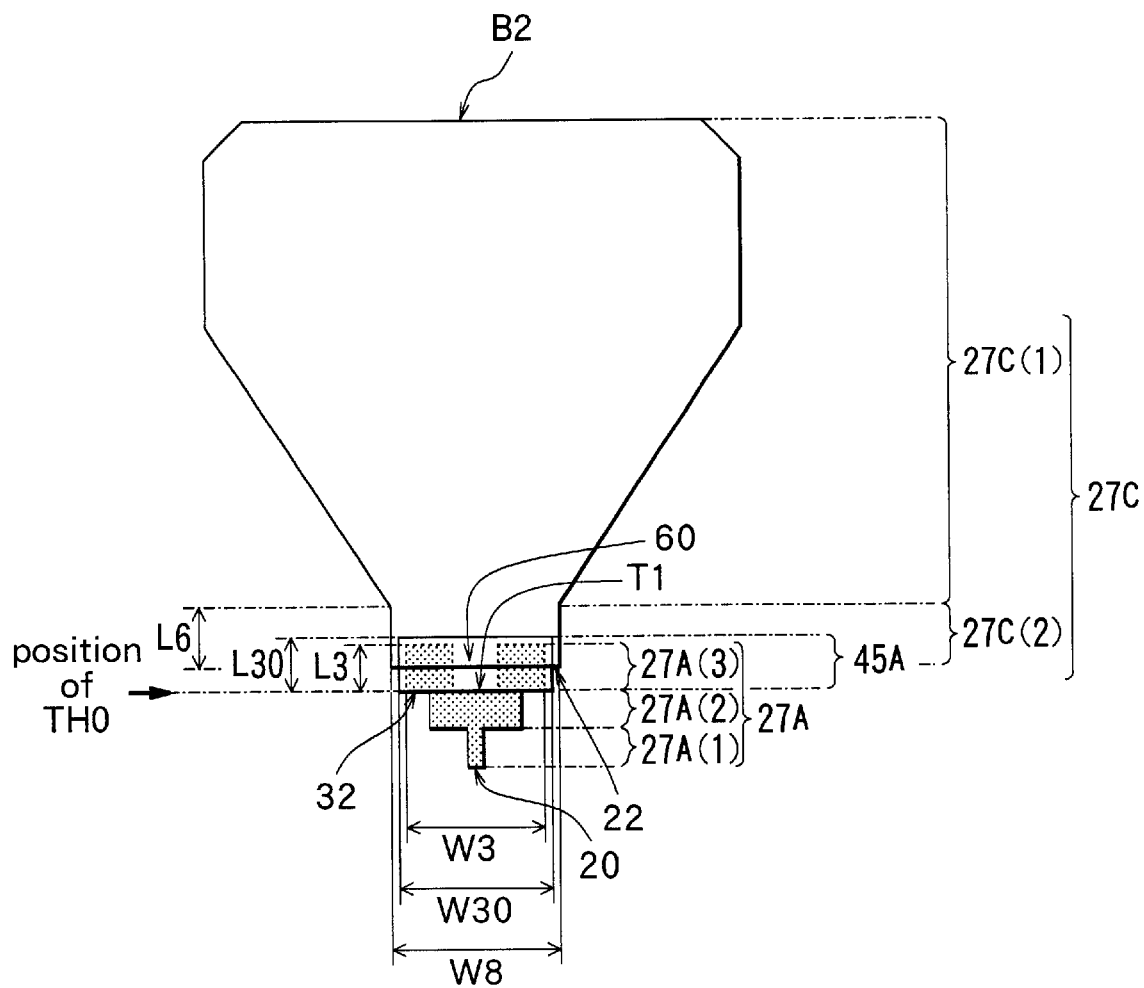
FIG. 55 is a plan view showing the structure of a top pole and a top pole tip of a thin film magnetic head according to a third embodiment of the invention.

As shown in FIG. 53A, on a flat surface in front of the insulating layer 30 in which the thin film coil 29 is buried (left side in FIG. 53), a top connection portion 45A for magnetically coupling to the connection portion 27A(3) in the top pole tip 27A is formed. At this time, the top connection portion 45A overlaps and is in contact with the connection portion 27A(3) in the top pole tip 27A and is formed so as to extend rearward, for example, from the air bearing surface 20 longer than the connection portion 27A (3) in the top pole tip 27A. The shape in plane of the top connection portion 45A is, for example, a rectangle as shown in FIG. 55 that will be described hereinlater. Further, in the top connection portion 45A, the position of the edge face 32 on the front side matches with, for example, the position of the edge face T1 (that is, the TH0 position). In the case of forming the top connection portion 45A, simultaneously, a top connection portion 45B for magnetically coupling to the magnetic path forming pattern 27B and for finally connecting the top pole and the low pole is formed. At this time, the top connection portion 45B overlaps and is in contact with the magnetic path forming pattern 27B and is formed, for example, so as to match with the length of the magnetic path forming pattern 27B. The material and the manufacturing method of the top connection portions 45A and 45B are similar to, for example, those of the top pole tip 27A. The top connection portion 45A corresponds to an example of "third magnetic portion" in the invention.

Subsequently, an insulating film 46 made of alumina or the like is formed on the whole surface in thickness of about 0.3 to 0.6 $\mu$m by, for example, sputtering or CVD. The insulating films 46 and 30 on the coil connection portion 43C are patterned by photolithography to form an opening 9C which reaches the coil connection portion 43C. On the insulating film 46 in the recess formed between the top connection portions 45A and 45B, a second thin film coil 47 for an inductive recording head made of copper (Cu) or the like is formed in thickness of about 1.5 to 2.5 $\mu$m by, for example, electrolytic plating. Simultaneously, a coil connection portion 47C which is in contact with the coil connection portion 43C via the opening 9c is formed.

An insulating layer 48 made of alumina or the like is formed in thickness of about 3 to 4 $\mu$m on the whole surface by, for example, sputtering and CVD. The material of the insulating layer 48 and the insulating film 46 is not limited to alumina but other insulating materials such as silicon dioxide ($SiO_2$) and silicon nitride (SiN) can be also used.

Subsequently, the insulating layer 48 and the insulating film 46 are polished so that the surface of each of the top connection portions 45A and 45B is exposed, and the surfaces of the insulating layer 48, the insulating film 46 and the top connection portions 45A and 45B are planarized so as to be flush with each other.

Figures 54A, 54B:
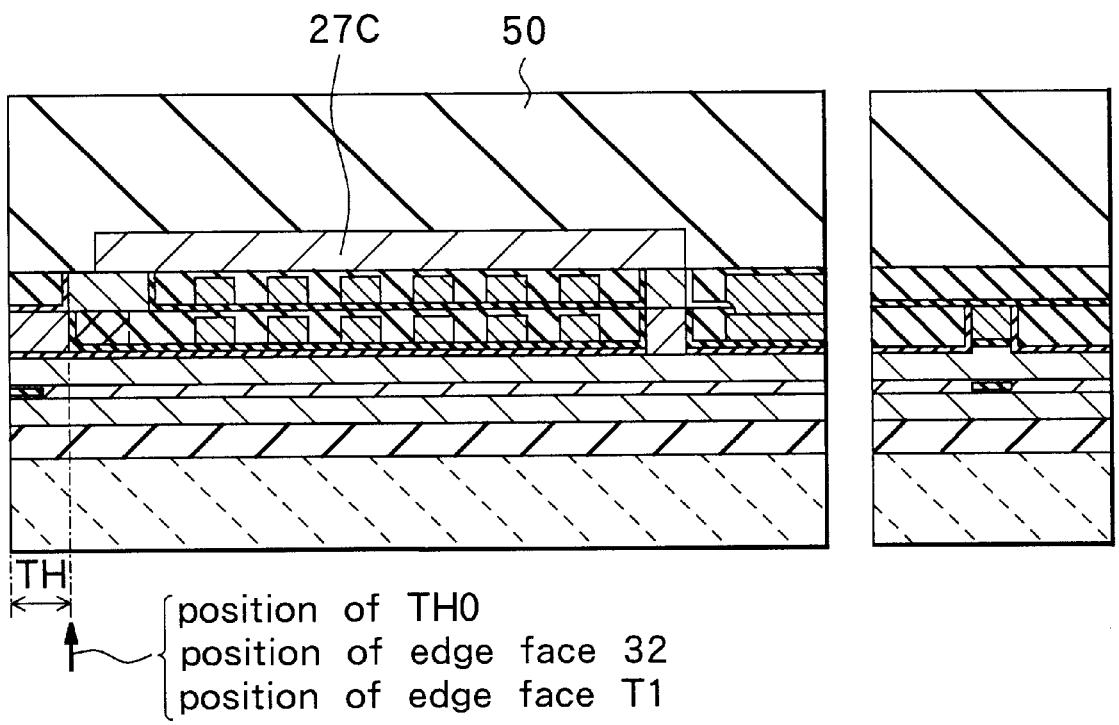
FIGS. 54A and 54B are cross sections for explaining a process subsequent to FIGS. 53A and 53B, respectively.

As shown in FIGS. 54A and 54B, the top pole is selectively formed in thickness of about 3 to 4 $\mu$m by electrolytic plating, sputtering or the like by using, for example, the same material as that of the top pole tip 27A. As the top pole, as shown in FIG. 55 which will be explained hereinlater, for example, the top pole 27C (FIG. 8) in each of the foregoing embodiments can be used. In this case, a part of the connection part 27C(2) in the front side in the top pole 27C overlaps with the top connection portion 45A and, for example, the position of the edge face 22 on the front side (air bearing surface side) of the connection portion 27C(2) is deviated rearward of the position of the edge face T1 (that is, the TH0 position) and the position of the edge face 32 on the front side of the top connection portion 45A (side opposite to the air bearing surface). A part of the yoke 27C(1) on the rear side of the top pole 27C overlaps with the top connection portion 45B and, for example, the position of the edge face B2 on the rear side of the yoke 27C(1) matches with the position of the edge face on the rear side of the magnetic path forming pattern 27B and the top connection portion 45B. The top pole 27C is thereby magnetically coupled to the top connection portion 45A and the top pole tip 27A and also magnetically coupled to the bottom pole 7 via the top connection portion 45B and the magnetic path forming pattern 27B.

Finally, an overcoat layer 50 having a thickness of about 30 $\mu$m made of alumina is formed by, for example, sputtering so as to cover the whole surface. After that, a slider is machined to thereby form the air bearing surface (ABS) of the recording head and the reproducing head. In such a manner, the thin film magnetic head is completed.

Figure 56:
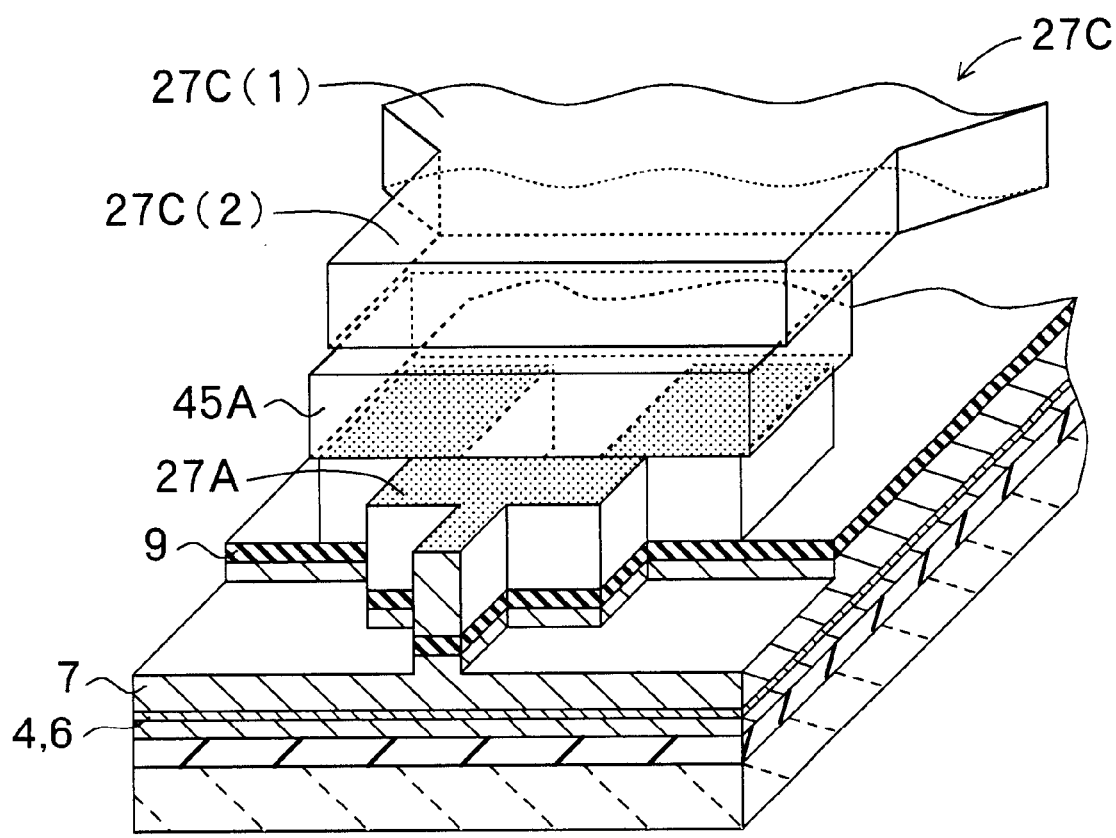
FIG. 56 is a perspective view showing a stereoscopic structure of the top pole and the top pole tip of the thin film magnetic head according to the third embodiment of the invention.

FIG. 55 is a plan view of the top pole 27C, the top connection portion 45A and the top pole tip 27A manufactured by the manufacturing method according to the embodiment. FIG. 56 is a perspective view showing the stereoscopic structure of the element shown in the cross sections of FIGS. 54A and 54B. In FIGS. 55 and 56, the same components as those in the foregoing embodiments are designated by the same reference numerals and the description is properly omitted. In FIG. 56, the overcoat layer 50, the thin film coils 29 and 47, the insulating layer 30 and the like are omitted.

As shown in FIG. 55, for example, the top connection portion 45A has a rectangular shape in plane and has a width of W30 and a length of L30. As shown in FIGS. 54A and 54B and FIG. 56, the top connection portion 45A is disposed so that a part of the under face is positioned in contact with and overlaps with the connection portion 27A(3) in the top pole tip 27A and the top face is in contact with a part of the connection portion 27C(2) of the top pole 27C. Consequently, the magnetic flux generated by the thin film coils 29 and 47 propagates from the yoke 27C(1) having a large area in the top pole 27C to the top pole tip 27A via the connection portion 27C(2) (width W8 and length L6), the top connection portion 45A (width W30 and length L30) and further the connection portion 27A(3) (width W3 and length L3).

In the embodiment, as shown in FIG. 55, the width of each of the connection portion 27C(2) in the top pole 27C, the top connection portion 45A and the top pole tip 27A is set so as to satisfy the relation of W8>W30>W3 and length is set so as to satisfy the relation of L6>L30>L3. The magnetic flux propagating from the top pole 27C to the top pole tip 27A via the portions is therefore converged step by step. The magnetic flux propagated to the connection portion 27A(3) in the top pole tip 27A is further converged in a process of propagation to the intermediate coupling portion 27A(2) and the front end portion 27A(1) of the top pole tip 27A.

Since the two thin film coils 27 and 49 are provided in the embodiment as described above, the absolute volume of the magnetic flux generated in the thin film coil portion can be increased. On the other hand, by forming the thin film coil in the two-layered structure, a space is created between the front end portion 27A(1) and the top pole 27C. In the embodiment, by using the space, the top connection portion 45A as a third magnetic layer portion is provided. Because of the existence of the top connection portion 45A, a magnetic volume is assured in the thickness direction in the region rearward of the front end portion 27A(1) in the top pole tip 27A. The magnetic volume serves as a space for storing a large amount of magnetic flux generated by the two thin film coils 27 and 49. Consequently, occurrence of magnetic saturation in the region rearward of the front end portion 27A(1) of the top pole tip 27A can be avoided and a sufficient volume of the magnetic flux is supplied to the front end portion 27A(1) of the top pole tip 27A. As a result, an excellent overwrite characteristic can be assured.

Since the top pole tip 27A, the top connection portion 45A and the top pole 27C can be formed on a flat portion in the embodiment, the photoresist pattern can be formed by photolithography with high precision, and the width of the front end portion 27A(1) of the top pole tip 27A can be narrowed with accuracy of 0.5 to 0.25 $\mu$m. The top connection portion 45A and the top pole 27C can be also formed on the flat portion subjected to the CMP. Thus, high precision patterning can be realized for a similar reason.

Effects produced by the characteristic shapes of the top pole 27C and the top pole tip 27A are similar to those in the first embodiment.

The position of the edge face 22 on the front side of the connection portion 27C(2) in the top pole 27C in the embodiment does not always have to be deviated rearward of the edge face T1 which determines the TH0 position. For example, the position of the edge face 22 may match with the position of the edge face T1 as shown in FIG. 8 in the first embodiment or may be deviated to the forward of the position of the edge face T1 as in FIG. 14. The position of the edge face 22 in the case where it is deviated to the forward of the position of the edge face T1 is, for example, preferably, set within the range from 0.5 to 1.0 $\mu$m by using the position of the edge face T1 as a reference. In this case, however, as described as the point to note at the time of selecting the top pole 27C and the top pole tip 27A from various shapes in the first embodiment, there is the possibility such that the side write phenomenon which occurs when the edge face 22 is positioned too close to the air bearing surface 20 is induced. The state shown in FIG. 55 (state where the position of the edge face 22 is deviated to the rearward of the position of the edge face T1) is, therefore, more preferable.

The position of the edge face 32 on the front side of the top connection portion 45A in the embodiment does not always have to match with the position of the edge face T1. The position of the edge face 32 may be set so as to be deviated to the forward or rearward within the range of 0.5 to 1.0 $\mu$m by using the position of the edge face T1 as a reference.

Figure 57A:
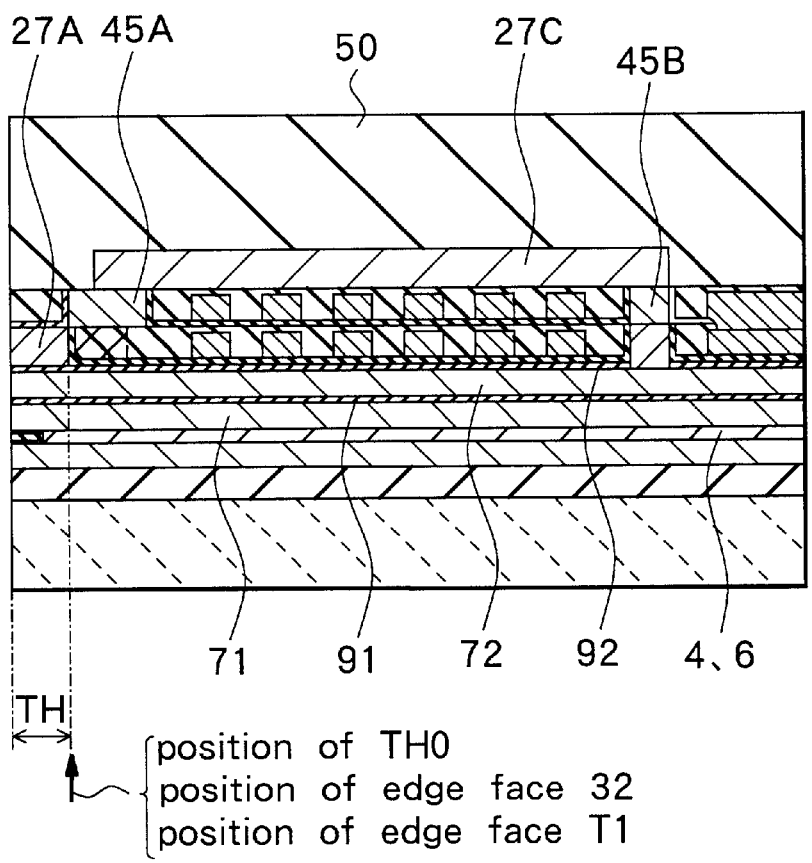
FIGS. 57A and 57B are cross sections showing a modification of the thin film magnetic head according to the third embodiment of the invention.
Figure 57B:
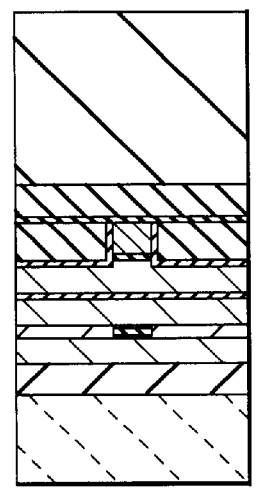
Figure 58:
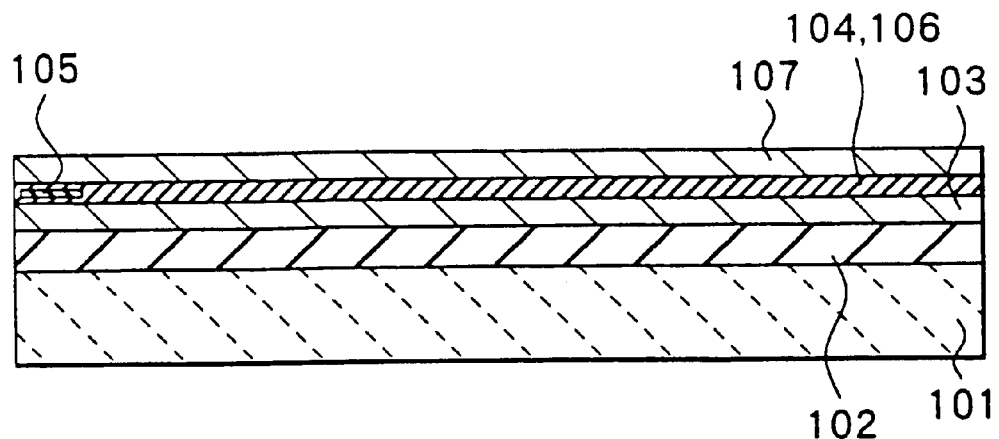
FIG. 58 is a cross section for explaining a process in a method of manufacturing a conventional thin film magnetic head.
Figure 59:
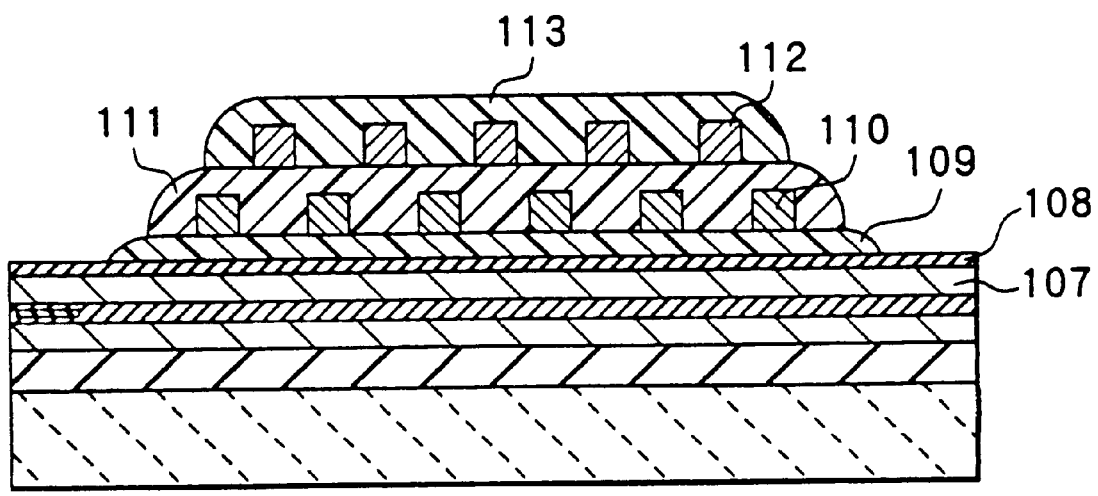
FIG. 59 is a cross section for explaining a process subsequent to FIG. 58.
Figure 60:
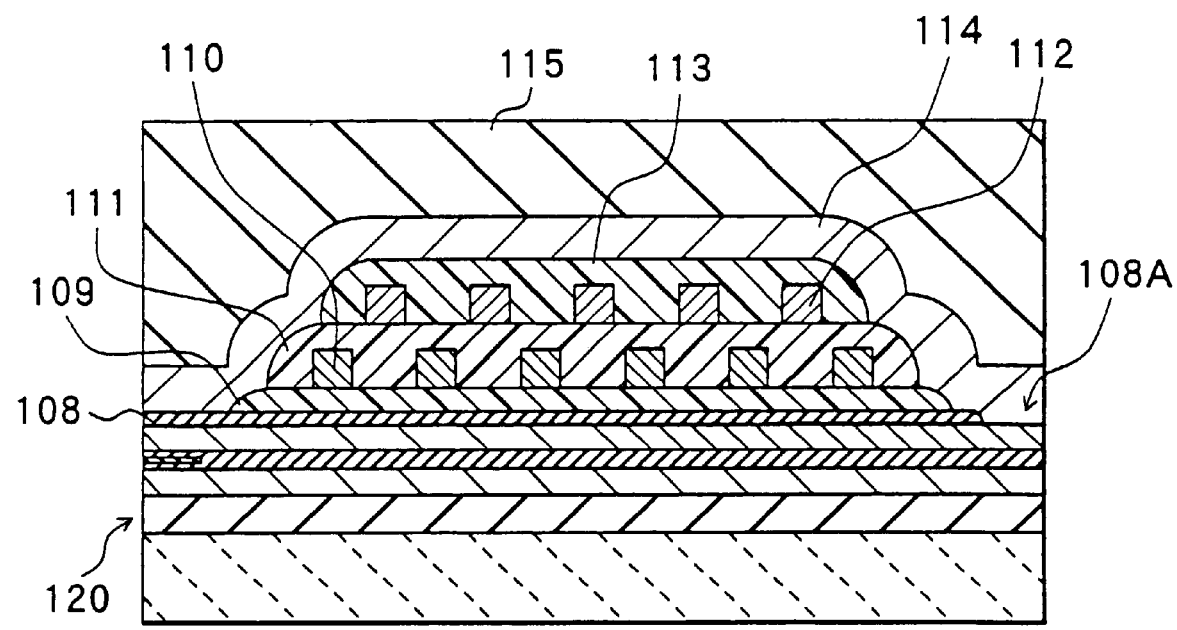
FIG. 60 is a cross section for explaining a process subsequent to FIG. 59.
Figure 61:
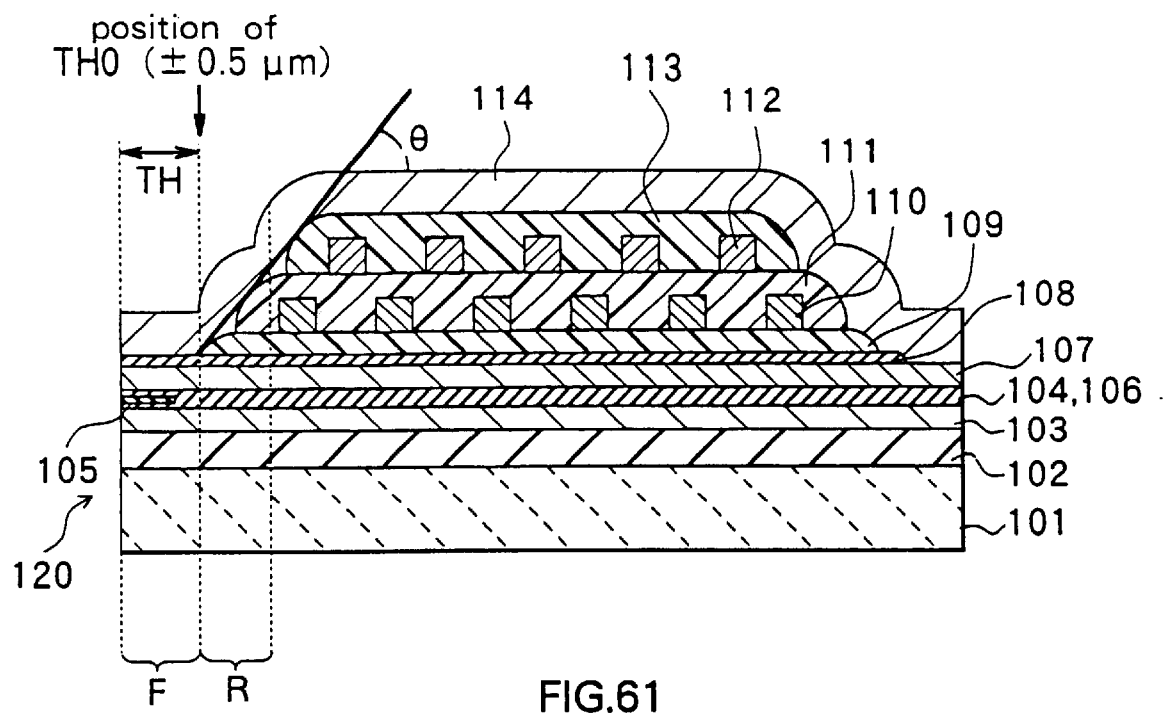
FIG. 61 is a cross section showing the structure of the conventional thin film magnetic head.
Figure 62:
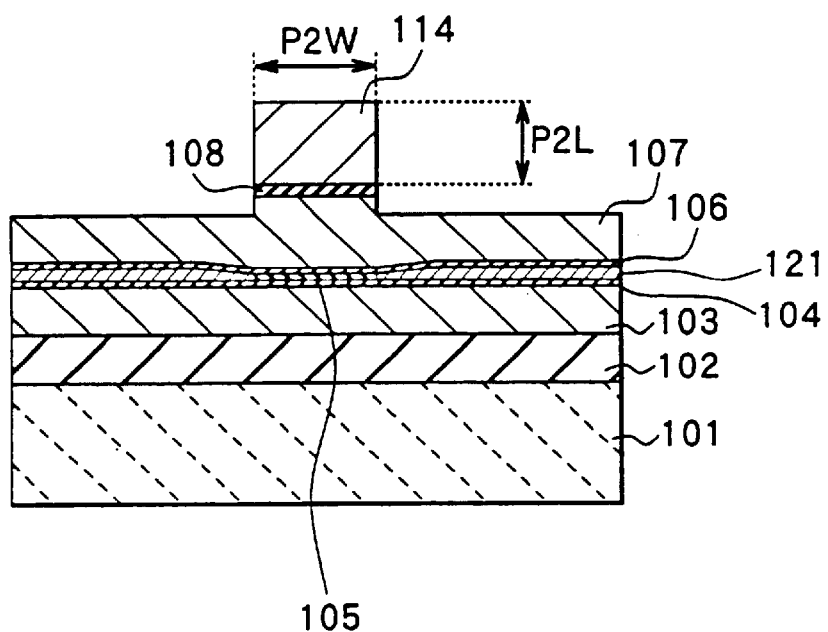
FIG. 62 is a cross section parallel to the air bearing surface in the conventional thin film magnetic head.

Although the invention has been described above by some embodiments, the invention is not limited to the embodiments but can be variously modified. For example, in the embodiments, as shown in FIGS. 4A and 4B and FIGS. 54A and 54B, the top shield layer on the reproducing head side and the bottom pole layer on the recording head side are realized by the single bottom pole 7. For example, as shown in FIGS. 57A and 57B, an insulating film 91 may be provided as an intermediate layer of the top pole 7. By providing the insulating film 91, it can be suppressed that a large volume of a magnetic flux generated in the thin film coil portion reaches the MR film 5 on the reproducing head side. Simultaneously, a propagation loss which occurs when the magnetic flux generated in the thin film coil portion propagates to the top pole 27C can be suppressed.

Although the method of manufacturing a composite thin film magnetic head has been described in the foregoing embodiments and their modifications, the invention can be also applied to a thin film magnetic head dedicated to recording having an inductive magnetic transducer for writing and a thin film magnetic head having an inductive magnetic transducer for recording and reproducing. The invention can be also applied to a thin film magnetic head in which the stacking order of an element for writing and an element for reading is reversed.

As described above, according to the thin film magnetic head or the method of manufacturing the same of the invention, the second magnetic portion includes: the track width defining portion extending with a constant width in the longitudinal direction so as to be apart from a recording-medium-facing surface and defines a recording track width of the recording medium; the two or more connection portions magnetically coupled to the first magnetic portion and arranged so as to be separated from each other in the direction of the recording track width; and the intermediate coupling portion having an edge that defines the edge on the recording-medium-facing surface side of the insulating layer and magnetically coupling the track width defining portion and the two or more connection portions. Consequently, on formation of the intermediate coupling portion, the position as a reference of the distance from the edge on the side of the recording-medium-facing surface in the insulating layer to the recording-medium-facing face, which exerts an influence on the recording characteristic is determined. As a result, the accurate control of the distance, that is, the throat height TH is facilitated, so that variations in the recording characteristic can be suppressed. The magnetic flux which is generated by the thin film coil and propagates from the first magnetic portion to the second magnetic portion passes though the two or more connection portions which are disposed so as to be separated from each other in the width direction. Thus, the magnetic flux saturation caused by a local concentration of the magnetic flux is avoided and the propagation of the magnetic flux is made smooth.

According to the thin film magnetic head of the invention or the method of manufacturing the same, in the second magnetic portion, a magnetic flux permissible volume of the intermediate coupling portion is smaller than that in the two or more connection portions and a magnetic flux permissible volume of the track width defining portion is smaller than that in the intermediate coupling portion. Consequently, a large volume of the magnetic flux generated by the thin film coil portion and propagated from the first magnetic portion to the second magnetic portion is converged step by step through a process of propagation from the two or more connection portion in the second magnetic portion to the track width defining portion via the intermediate coupling portion. A sufficient volume of the magnetic flux is therefore supplied to the tip of the track width defining portion in the second magnetic portion, so that the excellent overwrite characteristic can be assured.

According to the thin film magnetic head of the invention or the method of manufacturing the same, a step face of the intermediate coupling portion in the step which is provided in the position where the track width defining portion and the intermediate coupling portion are coupled to each other is substantially perpendicular to the extending direction of the track width defining portion. An action of suppressing an influence of unnecessary reflection light from the underlayer in the photolithography process for forming the track width defining portion can be expected and the width of the track width defining portion can be formed with higher precision.

According to the thin film magnetic head of the invention or the method of manufacturing the same, the edge is an edge face sandwiched by the two or more connection portions and the two or more connection portions have notches recessed in the width direction at both ends of the edge face. Consequently, the corners in the notch recessed are effectively prevented from being rounded due to poor exposure in the photolithography process for forming the second magnetic portion. In this case, the edge face in the intermediate coupling portion displays a straight line state and the position in the longitudinal direction can be accurately determined, so that the position of the edge on the side of a surface facing a recording medium of the insulating layer can be also accurately determined. Therefore, variations in the recording characteristic caused by variations in the position of the edge of the insulating layer can be effectively suppressed.

According to the thin film magnetic head of the invention or the method of manufacturing the same, the intermediate coupling portion has notches recessed in the longitudinal direction in the position where the track width defining portion and the intermediate coupling portion are coupled to each other. Consequently, the corners in the recess are effectively prevented from being rounded due to poor exposure in the photolithography process for forming the second magnetic portion. A situation such that the substantial width of the track width defining portion varies can be therefore avoided. The width of the entire track width defining portion becomes consequently constant and the recording track width of the recording medium can be more accurately controlled.

According to the thin film magnetic head of the invention or the method of manufacturing the same, the first magnetic portion includes a portion having a plane outline corresponding to that of at least either the intermediate coupling portion or the two or more connection portions of the second magnetic portion. Thus, the propagation of the magnetic flux from the first magnetic portion to the second magnetic portion is smoothed.

According to the thin film magnetic head of the invention, one of the magnetic layers further comprises a third magnetic portion sandwiched between the first and second magnetic portions and to make the first and second magnetic portions be magnetically coupled to each other. Consequently, the magnetic volume can be assured between the first and second magnetic portions when the magnetic flux propagates from the first magnetic portion to the second magnetic portion, so that the propagation of the magnetic flux from the first magnetic portion to the second magnetic portion is made more smoothly.

According to the method of manufacturing a thin film magnetic head of the invention, the track width defining portion and the intermediate coupling portion in the second magnetic portion are integrally formed by the same process and, on the other hand, the connection portions are formed by a process different from the process of forming the track width defining portion and the intermediate coupling portion. As compared with the case of forming the whole second magnetic portion in a lump by the same process, the formation accuracy can be therefore increased. For example, the corners formed by the side faces on the inside of the two or more connection portions of the top pole tip 27A and the edge face of the intermediate coupling portion can be more effectively prevented from being rounded due to poor exposure in the photolithography process for forming the second magnetic portion. Thus, the position of the edge face can be accurately determined, so that the throat height TH can be more stably and accurately determined.

Obviously many modifications and variations of the present invention are possible in the light of the above teachings. It is therefore to be understood that within the scope of the appended claims the invention may be practiced otherwise than as specifically described.

What is claimed is:

1. A thin film magnetic head including: two magnetic layers magnetically coupled to each other and having two magnetic poles which face each other with a gap layer in between in part close to a recording-medium-facing surface facing a recording medium; a thin film coil provided between the two magnetic layers; and an insulating layer for insulating the thin film coil from the two magnetic layers, wherein at least one of the two magnetic layers includes:
a first magnetic portion for propagating a magnetic flux generated in response to a current passing through the thin film coil, and
a second magnetic portion magnetically coupled to the first magnetic portion; and
the second magnetic portion includes:
a track width defining portion extending with a constant width in the longitudinal direction so as to be apart from a recording-medium-facing surface and defines a recording track width of the recording medium;
two or more connection portions magnetically coupled to the first magnetic portion and arranged so as to be separated from each other in the direction of the recording track width; and
an intermediate coupling portion having an edge that defines an edge of the recording-medium-facing surface side of the insulating layer and magnetically coupling the track width defining portion and the two or more connection portions.

2. A thin film magnetic head according to claim 1, wherein in the second magnetic portion a magnetic flux permissible volume of the intermediate coupling portion is smaller than that of the two or more connection portions and a magnetic flux permissible volume of the track width defining portion is smaller than that of the intermediate coupling portion.

3. A thin film magnetic head according to claim 1, wherein of the second magnetic portion, length in the longitudinal direction of the two or more connection portions is longer than that of the track width defining portion or the intermediate coupling portion.

4. A thin film magnetic head according to claim 1, wherein the second magnetic portion is formed so that the width of the intermediate coupling portion in the position where the intermediate coupling portion and the two or more connection portions are coupled to each other is narrower than the width of a connection region defined by the two or more connection portions.

5. A thin film magnetic head according to claim 1, wherein the intermediate coupling portion in the second magnetic portion includes at least one of a constant width portion and a varying width portion, the constant width portion having a constant width irrespective of positions, and the varying width portion having a width which varies according to positions.

6. A thin film magnetic head according to claim 1, wherein each of the two or more connection portions in the second magnetic portion includes at least one of a constant width portion and a varying width portion, the constant width portion having a constant width irrespective of positions, and the varying width portion having a width which varies according to positions.

7. A thin film magnetic head according to claim 1, wherein a step in the width direction is formed in a position where the track width defining portion and the intermediate coupling portion in the second magnetic portion are coupled to each other in such a manner that the width of the track width defining portion is narrower than the width of the intermediate coupling portion in the coupling position.

8. A thin film magnetic head according to claim 7, wherein the intermediate coupling portion has a step face in a position of the step, the step face being substantially perpendicular to the extending direction of the track width defining portion.

9. A thin film magnetic head according to claim 1, wherein of the second magnetic portion the width of a region surrounded by the edge of the intermediate coupling portion and the two or more connection portions is equal to or wider than the width of the track width defining portion.

10. A thin film magnetic head according to claim 1, wherein the edge is an edge face surrounded by the two or more connection portions; and the two or more connection portions have notches recessed in the width direction at both ends of the edge face.

11. A thin film magnetic head according to claim 1, wherein the intermediate coupling portion has notches recessed in the longitudinal direction in the position where the track width defining portion and the intermediate coupling portion are coupled to each other.

12. A thin film magnetic head according to claim 1, wherein the first magnetic portion includes a portion having a plane outline corresponding to that of at least either the intermediate coupling portion or the two or more connection portions of the second magnetic portion.

13. A thin film magnetic head according to claim 1, wherein a part of the first magnetic portion and a part of the second magnetic portion overlap one another.

14. A thin film magnetic head according to claim 1, wherein the first magnetic portion has:

a constant width portion which extends from an edge thereof close to the recording-medium-facing surface in a direction of going away from the recording-medium-facing surface, an almost constant width irrespective of positions; and a portion which is coupled to the constant width portion and expands in the width direction as going away from the recording-medium-facing surface.

15. A thin film magnetic head according to claim 1, wherein the first magnetic portion has a portion which extends from an edge thereof close to the recording-medium-facing surface in a direction of going away from the recording-medium-facing surface, and expands in the width direction as going away from the recording-medium-facing surface.

16. A thin film magnetic head according to claim 1, wherein the one of the magnetic layers further comprises:

a third magnetic portion sandwiched between the first and second magnetic portions to make the first and second magnetic portions be magnetically coupled to each other.

17. A thin film magnetic head according to claim 16, wherein the third magnetic portion is arranged so as to overlap with both a part of the first magnetic portion and a part of the second magnetic portion.

18. A thin film magnetic head according to claim 17, wherein an edge close to the recording-medium-facing surface of the third magnetic portion is closer to the recording-medium-facing surface rather than to an edge close to the recording-medium-facing surface of the first magnetic portion.

* * * * *

UNITED STATES PATENT AND TRADEMARK OFFICE
CERTIFICATE OF CORRECTION

PATENT NO. : 6,624,971 B1
DATED : September 23, 2003
INVENTOR(S) : Yoshitaka Sasaki It is certified that error appears in the above-identified patent and that said Letters Patent is hereby corrected as shown below:

<u>Title page,</u>
Item [54], change title from "THIN FILM MAGNETIC HEAD AND METHOD OF MANUFACTURING THE SAME" to -- THIN FILM MAGNETIC HEAD --.

<u>Column 36,</u>
Lines 64-65, please change "an edge of the recording-medium-facing surface" to
-- an edge on the recording-medium-facing surface --.

Signed and Sealed this

Twenty-third Day of March, 2004

JON W. DUDAS
*Acting Director of the United States Patent and Trademark Office*